(12) United States Patent
Okazawa et al.

(10) Patent No.: US 7,028,322 B2
(45) Date of Patent: *Apr. 11, 2006

(54) DISC CARTRIDGE

(75) Inventors: Hironori Okazawa, Osaka (JP); Teruyuki Takizawa, Osaka (JP); Yoshito Saji, Hyogo (JP); Kuniko Nakata, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/102,164

(22) Filed: Apr. 8, 2005

(65) Prior Publication Data

US 2005/0183108 A1 Aug. 18, 2005

Related U.S. Application Data

(62) Division of application No. 10/188,233, filed on Jul. 2, 2002, now Pat. No. 6,910,219.

(30) Foreign Application Priority Data

| Jul. 6, 2001 | (JP) | ............................ 2001-205845 |
| Sep. 12, 2001 | (JP) | ............................ 2001-276284 |
| Nov. 9, 2001 | (JP) | ............................ 2001-344030 |
| Nov. 29, 2001 | (JP) | ............................ 2001-364438 |
| Nov. 29, 2001 | (JP) | ............................ 2001-364463 |
| Jan. 10, 2002 | (WO) | ...................... PCT/JP02/00110 |

(51) Int. Cl.
*G11B 23/03* (2006.01)

(52) U.S. Cl. ...................... 720/725; 720/737
(58) Field of Classification Search ................ 720/741, 720/725, 737, 738; 360/133
See application file for complete search history.

(56) References Cited

U.S. PATENT DOCUMENTS

| 4,613,044 A | 9/1986 | Saito et al. |
| 4,617,655 A | 10/1986 | Aldenhoven |
| 4,722,439 A | 2/1988 | Grobecker et al. |
| 4,773,056 A | 9/1988 | Ito |
| 4,773,061 A | 9/1988 | Stark et al. |
| 4,862,448 A | 8/1989 | Tanaka et al. |
| 4,928,271 A | 5/1990 | Verhagen |
| 5,499,233 A | 3/1996 | Childers et al. |
| 5,850,384 A | 12/1998 | Ohmori et al. |

(Continued)

FOREIGN PATENT DOCUMENTS

EP 61104381 A 5/1986

(Continued)

*Primary Examiner*—William J. Klimowicz
(74) *Attorney, Agent, or Firm*—Akin Gump Strauss Hauer & Feld, LLP

(57) ABSTRACT

A disc cartridge includes: a cartridge body including a disc storage portion storing a disc, having first and second sides, therein so that the disc is rotatable there and that the first side is exposed and chucking and head opening formed on the bottom of the storage portion so as to get the disc chucked externally and allow a read/write head to access the second side, respectively; a shutter supported, and movable with respect to the cartridge body, between the second side of the disc and the bottom of the disc storage portion so as to expose or cover the chucking and head openings and defining a hole under a center hole of the disc while the shutter is closed; and a disc holder provided for the shutter and pressing the disc against the shutter and holding it thereon while the chucking and head openings are covered with the shutter.

11 Claims, 65 Drawing Sheets

U.S. PATENT DOCUMENTS

| | | |
|---|---|---|
| 5,991,261 A | 11/1999 | Maeda et al. |
| 5,995,482 A * | 11/1999 | Iwazawa ..................... 720/728 |
| 6,064,640 A | 5/2000 | Shinoda et al. |
| 6,172,962 B1 | 1/2001 | Goto et al. |
| 6,339,583 B1 * | 1/2002 | Watanabe et al. ........... 720/728 |
| 6,377,538 B1 | 4/2002 | d'Alayer de Costemore d'Arc |
| 6,414,928 B1 | 7/2002 | Aoki et al. |
| 6,418,114 B1 | 7/2002 | Yamashita |
| 6,463,028 B1 | 10/2002 | Koshiyouji |
| 6,463,029 B1 | 10/2002 | Nishino et al. |
| 6,583,956 B1 | 6/2003 | Kikuchi et al. |
| 6,910,219 B1 * | 6/2005 | Okazawa et al. ........... 720/741 |
| 2001/0036039 A1 * | 11/2001 | Yamamoto et al. ......... 360/133 |
| 2002/0071375 A1 | 6/2002 | Takahashi et al. |

FOREIGN PATENT DOCUMENTS

| | | |
|---|---|---|
| EP | 0 366 452 A2 | 5/1990 |
| EP | 10031856 A | 2/1998 |
| EP | 0 866 458 A1 | 9/1998 |
| JP | 61-16778 U | 1/1986 |
| JP | 61-31427 Y2 | 9/1986 |
| JP | 63-153373 U | 10/1988 |
| JP | 63-164863 | 10/1988 |
| JP | 01-078377 | 5/1989 |
| JP | 02053277 A * | 2/1990 |
| JP | 03-071465 | 7/1991 |
| JP | 04-067486 A | 3/1992 |
| JP | 04149877 A * | 5/1992 |
| JP | 05-015178 | 2/1993 |
| JP | 05-250838 | 9/1993 |
| JP | 05298856 A * | 11/1993 |
| JP | 06-028812 | 2/1994 |
| JP | 06-026070 | 4/1994 |
| JP | 06150603 A * | 5/1994 |
| JP | 7-10860 U | 2/1995 |
| JP | 08-335352 A | 12/1996 |
| JP | 09-153264 A | 6/1997 |
| JP | 11-238335 A | 8/1999 |
| JP | 11-339424 A | 12/1999 |
| JP | 2000-030399 | 1/2000 |
| JP | 2000-48520 A | 2/2000 |
| JP | 2000-048520 A | 2/2000 |
| JP | 2000-090628 A | 3/2000 |
| JP | 2000-113630 A | 4/2000 |
| JP | 2000113629 A * | 4/2000 |
| JP | 2001043652 A * | 2/2001 |
| JP | 2001-283558 A | 10/2001 |
| JP | 2003-178544 A | 6/2003 |

* cited by examiner

FIG.99
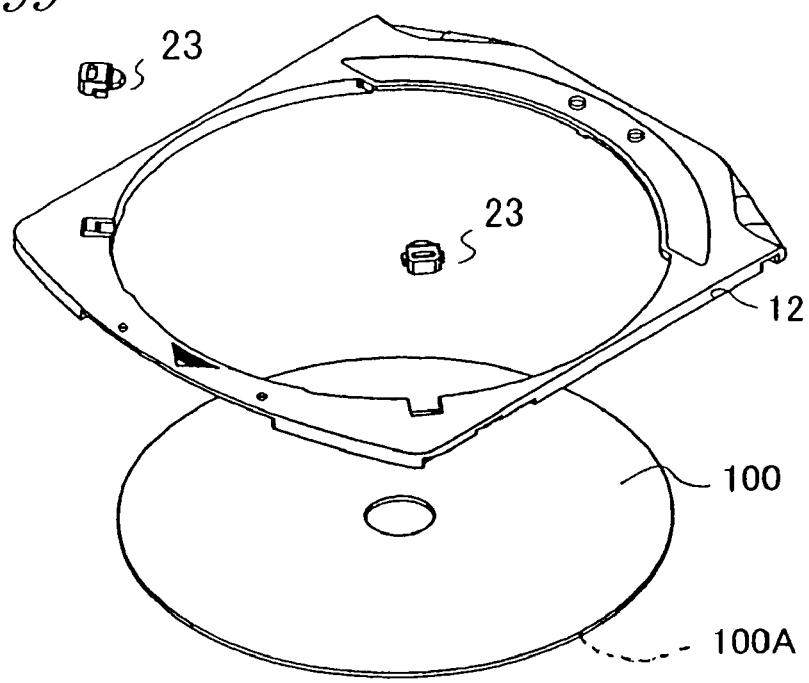
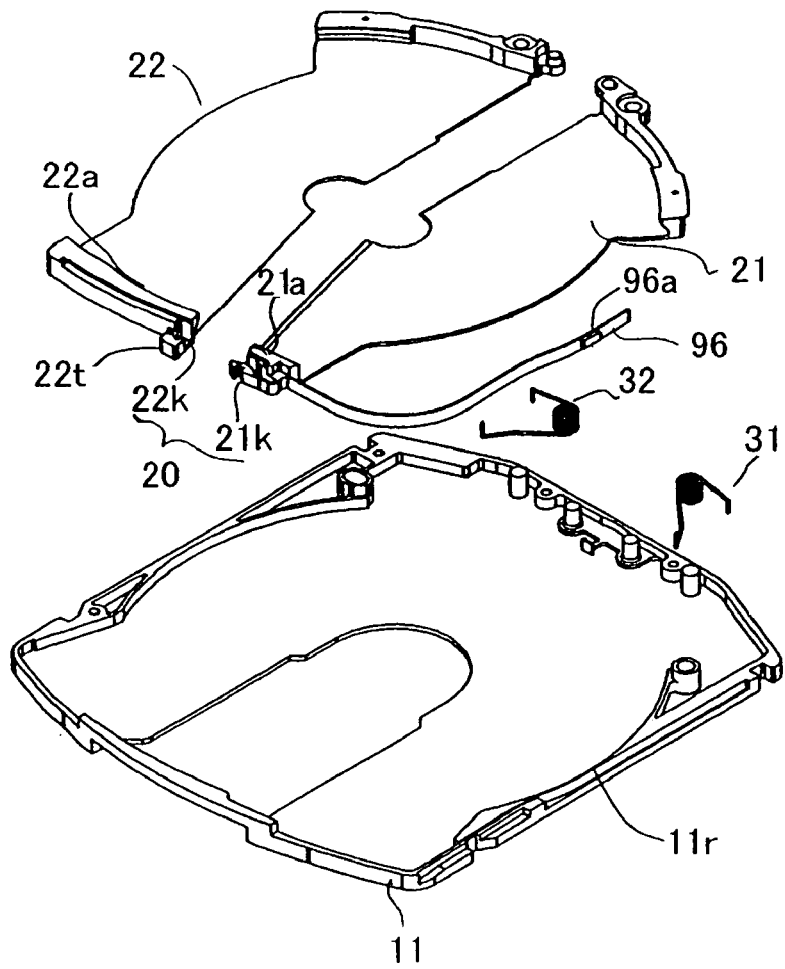

DISC CARTRIDGE

CROSS-REFERENCE TO RELATED APPLICATION

This application is a Divisional of U.S. patent application Ser. No. 10/188,233, filed Jul. 2, 2002, now U.S. Pat. No. 6,910,219 B2, the disclosure of which is incorporated herein by reference.

BACKGROUND OF THE INVENTION

1. Field of the Invention

The present invention relates to a disc cartridge for use to store a disk storage medium such as an optical disc or a magnetic disk therein in a rotatable state.

2. Description of the Related Art

Various disc cartridges have been proposed as protective cases for disc storage media.

For example, Japanese Laid-Open Publication No. 9-153264 discloses a disc cartridge in which a disk storage medium having a single or double signal recording sides (which will be herein referred to as a "disc" simply) is completely enclosed in a disc storage portion. The disc storage portion is defined inside a cartridge body that is made up of upper and lower halves. The cartridge body includes chucking openings and a head opening. The chucking openings allow the turntable of a spindle motor and a damper to chuck a disc inserted, while the head opening allows a read/write head to read and/or write a signal from/on the disc. The lower one of the chucking openings is continuous with the head opening. Accordingly, while the user carries such a cartridge, dust easily enters the inside of the cartridge through these openings and the disc is also easily soiled with finger marks. For that reason, the disc cartridge further includes a shutter for closing these openings up.

A disc cartridge having such a structure, however, has the following drawbacks. Firstly, such a disc cartridge cannot be so thin. This is because the disc storage space, defined between the upper and lower halves, should be thick enough to allow a disc drive to accurately read or write a signal (or information) from/onto the disc stored in such a disc cartridge. The reasons why the disc storage space should be relatively thick include the expected flutter or warp of the disc being rotated and an error that may occur in disposing the disc cartridge at a predetermined position inside the disc drive.

Secondly, the shutter for closing up these chucking and head openings at the same time cannot be formed at a low cost, thus increasing the overall manufacturing cost of such a disc cartridge. The reason is as follows. Specifically, the lower half of the disc cartridge is provided with a chucking opening for the turntable of the spindle motor and a head opening, while the upper half thereof is provided with another chucking opening for the clamper. Thus, to close these three openings up at a time, the shutter needs to be formed in a U-shape, which is not so cheap to make.

Thirdly, the disc stored inside such a disc cartridge is not fixed in many cases, thus possibly causing dust or fine particle deposition and scratching problems. Specifically, although a disc with a metal hub can be attracted and fixed in position via a magnetic force so as not to move inconstantly, an optical disc with no hub, e.g., a CD or a DVD, is normally not fixed, and movable freely, inside the disc cartridge. Accordingly, when the shutter of the disc cartridge is opened inside the disc drive, dust may enter the cartridge through its openings and be deposited on the disc easily. Also, if the disc is shaken so much as to contact with the inner walls of the disc cartridge, the signal recording side of the disc may get scratched or fine particles may be stirred up and deposited on the disc.

SUMMARY OF THE INVENTION

In order to overcome the problems described above, an object of the present invention is to provide a disc cartridge that has a reduced thickness and a simplified, much less expensive shutter for a single-sided disc, in particular.

Another object of the present invention is to provide a disc cartridge that can drastically reduce the dust to be deposited on the disc stored therein by getting the disc firmly held inside the disc cartridge and eliminating the inconstant movement of the disc.

A third object of the present invention is to provide a disc cartridge of a good design by displaying the label side of the disc stored therein.

A disc cartridge according to a preferred embodiment of the present invention includes a cartridge body, a shutter and a disc holder. The cartridge body includes a disc storage portion, a chucking opening and a head opening. The disc storage portion stores a disc, having first and second sides, therein so that the disc is rotatable in the disc storage portion and that the first side of the disc is exposed. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The shutter is supported, and movable with respect to the cartridge body, between the second side of the disc and the bottom of the disc storage portion so as to expose or cover the chucking and head openings, and defines a hole in a region corresponding to a center hole of the disc while the shutter is closed. The disc holder is provided for the shutter, presses the disc against the shutter, and holds the disc thereon while the chucking and head openings are covered with the shutter.

In one preferred embodiment of the present invention, the hole of the shutter preferably has a diameter that is approximately equal to that of the center hole of the disc.

A disc cartridge according to another preferred embodiment of the present invention includes a cartridge body, a shutter, a disc holder and a rim. The cartridge body includes a disc storage portion, a chucking opening and a head opening. The disc storage portion stores a disc, having first and second sides, therein so that the disc is rotatable in the disc storage portion and that the first side of the disc is exposed. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The shutter is supported, and movable with respect to the cartridge body, between the second side of the disc and the bottom of the disc storage portion so as to expose or cover the chucking and head openings. The disc holder is provided for the shutter, presses the disc against the shutter, and holds the disc thereon while the chucking and head openings are covered with the shutter. The rim expands from a side surface of the disc storage portion toward the center of the disc and contacts with an outer edge of the disc while the shutter is closed.

In one preferred embodiment of the present invention, the shutter preferably defines a hole in an area corresponding to a center hole of the disc while the shutter is closed.

In another preferred embodiment of the present invention, the rim preferably contacts with the second side of the disc.

In still another preferred embodiment, the cartridge body preferably has a gap between the rim and the bottom of the disc storage portion so that a portion of the shutter is stored in the gap while the chucking and head openings are exposed by the shutter.

In yet another preferred embodiment, the disc cartridge preferably further includes a convex portion around the hole of the shutter. The convex portion preferably contacts with the second side of the disc while the chucking and head openings are covered with the shutter.

In yet another preferred embodiment, the shutter preferably includes a convex portion that closes a gap between the second side of the disc and the shutter while the shutter is closed.

In this particular preferred embodiment, the convex portion is preferably located closer to the center of the disc storage portion than the rim is while the chucking and head openings are exposed by the shutter.

Specifically, the convex portion is preferably a protective layer that is provided to prevent the second side of the disc from getting scratched.

In yet another preferred embodiment, a protective layer may be provided on the rim to prevent the second side of the disc from getting scratched.

More specifically, the protective layer is preferably selected from the group consisting of an anti-scratching nonwoven fabric, a dustproof nonwoven fabric, an anti-scratching coating layer and a dustproof coating layer.

In yet another preferred embodiment, the convex portion preferably forms an integral part of the shutter.

A disc cartridge according to still another preferred embodiment of the present invention includes a cartridge body, a pair of shutters and a disc holder. The cartridge body includes a disc storage portion, a chucking opening and a head opening. The disc storage portion stores a disc, having first and second sides, therein so that the disc is rotatable in the disc storage portion and that the first side of the disc is exposed. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The pair of shutters is supported, and movable with respect to the cartridge body, between the second side of the disc and the bottom of the disc storage portion so as to expose or cover the chucking and head openings. The disc holder is provided for the shutters, presses the disc against the shutters, and holds the disc thereon while the chucking and head openings are covered with the shutters. The head opening reaches a side surface of the cartridge body. An opener/closer for use to open and close the shutters is provided for at least one of the shutters and is located inside the head opening.

A disc cartridge according to yet another preferred embodiment of the present invention includes a cartridge body, a pair of shutters and a disc holder. The cartridge body includes a disc storage portion, a chucking opening and a head opening. The disc storage portion stores a disc, having first and second sides, therein so that the disc is rotatable in the disc storage portion and that the first side of the disc is exposed. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The pair of shutters is supported, and movable with respect to the cartridge body, between the second side of the disc and the bottom of the disc storage portion so as to expose or cover the chucking and head openings. The disc holder is provided for the shutters, presses the disc against the shutters, and holds the disc thereon while the chucking and head openings are covered with the shutters. The shutters have first and second pairs of contact portions. Each pair of contact portions contact with each other. The first and second pairs are not aligned with each other.

In one preferred embodiment of the present invention, the contact portions of each of the fist and second pairs are preferably sloped, and overlap with each other, in a thickness direction of the disc.

A disc cartridge according to yet another preferred embodiment of the present invention includes a cartridge body, a pair of shutters and a number of disc holders. The cartridge body includes a disc storage portion, a chucking opening and a head opening. The disc storage portion stores a disc, having first and second sides, therein so that the disc is rotatable in the disc storage portion and that the first side of the disc is exposed. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The pair of shutters is supported, and movable with respect to the cartridge body, between the second side of the disc and the bottom of the disc storage portion so as to expose or cover the chucking and head openings. The disc holders are provided for the shutters, press the disc against the shutters, and hold the disc thereon while the chucking and head openings are covered with the shutters. At least one of the disc holders is movable toward the center of the disc storage portion with respect to one of the shutters.

A disc cartridge according to yet another preferred embodiment of the present invention includes a cartridge body, a pair of shutters, a number of disc holders and a number of disc stoppers. The cartridge body includes a disc storage portion, a chucking opening and a head opening. The disc storage portion stores a disc, having first and second sides, therein so that the disc is rotatable in the disc storage portion and that the first side of the disc is exposed. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The pair of shutters is supported, and movable with respect to the cartridge body, between the second side of the disc and the bottom of the disc storage portion so as to expose or cover the chucking and head openings. The disc holders are provided for the shutters. Each of the disc holders has a downwardly tapered slope that presses the disc against the shutters and holds the disc thereon while the chucking and head openings are covered with the shutters. Each of the disc stoppers has a disc contact portion that prevents the disc from dropping down from the disc storage portion and provided for the cartridge body to protrude over the disc. A portion of the slope of each of the disc holders is located over the contact portion of each of the disc stoppers.

In one preferred embodiment of the present invention, the pair of shutters is preferably locked together while closed.

In another preferred embodiment of the present invention, the disc cartridge preferably further includes a shutter contact portion that regulates the positions of the shutters being closed.

A disc cartridge according to yet another preferred embodiment of the present invention includes a cartridge body, a pair of shutters and a number of disc holders. The cartridge body includes a disc storage portion, a chucking opening and a head opening. The disc storage portion stores a disc, having first and second sides, therein so that the disc is rotatable in the disc storage portion and that the first side of the disc is exposed. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The pair of shutters is supported, and movable with respect to the cartridge body, between the second side of the disc and the bottom of the disc storage portion so as to expose or cover the chucking and head openings. The disc holders are provided for the shutters, press the disc against the shutters, and hold the disc thereon while the chucking and head openings are covered with the shutters. Each of the disc holders includes a first portion with a first height and a second portion with a second height that is lower than the first height. An inner upper surface of the cartridge body has a recessed portion that receives the top of the first portion of each disc holder that moves as the shutters are going to be opened or closed. The recessed portion is thinner than another portion of the inner upper surface of the cartridge body under which the second portion of the disc holder moves.

In one preferred embodiment of the present invention, as the shutters are going to be closed, the first portion of each of the disc holders preferably contacts with the disc earlier than the second portion thereof.

A disc cartridge according to yet another preferred embodiment of the present invention includes a cartridge body, a pair of shutters, a number of disc holders and a disc stopper. The cartridge body includes a disc storage portion, a chucking opening and a head opening. The disc storage portion stores a disc, having first and second sides, therein so that the disc is rotatable in the disc storage portion and that the first side of the disc is exposed. The disc storage portion also has a disc window through which the disc is inserted or removed into/from the disc storage portion. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The pair of shutters is supported, and movable with respect to the cartridge body, between the second side of the disc and the bottom of the disc storage portion so as to expose or cover the chucking and head openings. The disc holders are provided for the shutters, press the disc against the shutters, and hold the disc thereon while the chucking and head openings are covered with the shutters. The disc stopper is secured to the cartridge body so as to be movable between a state of protruding into the disc window and a state of not protruding into the disc window.

In one preferred embodiment of the present invention, the disc stopper is preferably movable on a plane that is parallel to the upper surface of the cartridge body.

In this particular preferred embodiment, the disc stopper is preferably rotatable on the upper surface of the cartridge body.

A disc cartridge according to yet another preferred embodiment of the present invention includes a cartridge body, a pair of shutters, a number of disc holders and a disc supporting portion. The cartridge body includes a disc storage portion, a chucking opening and a head opening. The disc storage portion stores a disc, having first and second sides, therein so that the disc is rotatable in the disc storage portion and that the first side of the disc is exposed. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The pair of shutters is supported, and movable with respect to the cartridge body, between the second side of the disc and the bottom of the disc storage portion so as to expose or cover the chucking and head openings. The disc holders are provided for the shutters, press the disc against the shutters, and hold the disc thereon while the chucking and head openings are covered with the shutters. The disc supporting portion is provided along the circumference of an inner lower surface of the cartridge body so as to contact with an outer edge and a surrounding portion of the second side of the disc that is being stored inside the disc storage portion while the shutters are closed.

In one preferred embodiment of the present invention, at least a part of the disc supporting portion is preferably parallel to the inner lower surface of the cartridge body and preferably contacts with the second side of the disc.

In another preferred embodiment of the present invention, the disc supporting portion preferably has an upwardly tapered cross section that connects an inner side surface and the inner lower surface of the cartridge body together. While the shutters are closed and the disc is stored in the disc storage portion, the outer edge of the disc is preferably in contact with the disc supporting portion.

A disc cartridge according to yet another preferred embodiment of the present invention includes a cartridge body, a pair of shutters and a number of disc holders. The cartridge body includes a disc storage portion, a chucking opening and a head opening. The disc storage portion stores a disc, having first and second sides, therein so that the disc is rotatable in the disc storage portion and that the first side of the disc is exposed. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The pair of shutters is supported, and movable with respect to the cartridge body, between the second side of the disc and the bottom of the disc storage portion so as to expose or cover the chucking and head openings. The disc holders are provided for the shutters, press the disc against the shutters, and hold the disc thereon while the chucking and head openings are covered with the shutters. An inner lower surface of the cartridge body includes a plurality of recessed regions, through which respective bottoms of the disc holders pass while the shutters are going to be opened or closed.

A disc cartridge according to yet another preferred embodiment of the present invention includes a cartridge body, a pair of shutters and a number of disc holders. The cartridge body includes a disc storage portion, a chucking opening and a head opening. The disc storage portion stores a disc, having first and second sides, therein so that the disc is rotatable in the disc storage portion and that the first side of the disc is exposed. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The pair of shutters is supported, and movable with respect to the cartridge body, between the second side of the disc and the bottom of the disc storage portion so as to expose or cover the chucking and head openings. The disc holders are provided for the shutters, press the disc against the shutters, and hold the disc thereon while the chucking and head openings are covered with the shutters. An inner lower surface of the cartridge body includes a plurality of recessed regions in the vicinity of the outer periphery of the shutters.

A disc cartridge according to yet another preferred embodiment of the present invention includes a cartridge body, a pair of shutters and a number of disc holders. The cartridge body includes a disc storage portion, a chucking opening and a head opening. The disc storage portion stores a disc, having first and second sides, therein so that the disc is rotatable in the disc storage portion and that the first side of the disc is exposed. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The pair of shutters is supported, and movable with respect to the cartridge body, between the second side of the disc and the bottom of the disc storage portion so as to expose or cover the chucking and head openings. The disc holders are provided for the shutters, press the disc against the shutters, and hold the disc thereon while the chucking and head openings are covered with the shutters. An inner lower surface of the cartridge body includes a plurality of recessed regions around the chucking and head openings and/or near an inner side surface of the cartridge body.

A disc cartridge according to yet another preferred embodiment of the present invention includes a cartridge body, at least one shutter, a number of disc holders and first and second opener/closers. The cartridge body includes disc storage portion, a chucking opening and a head opening. The disc storage portion stores a disc, having first and second sides, therein so that the disc is rotatable in the disc storage portion and that the first side of the disc is exposed. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The at least one shutter is supported, and movable with respect to the cartridge body, between the second side of the disc and the bottom of the disc storage portion so as to expose or cover the chucking and head openings. The disc holders are provided for the at least one shutter, press the disc against the shutter and hold the disc thereon while the chucking and head openings are covered with the shutter. The first and second opener/closers are used to open and close the shutter.

In one preferred embodiment of the present invention, the first and second opener/closers are preferably respectively provided for first and second side surfaces of the cartridge body.

In this particular preferred embodiment, the first and second side surfaces are preferably adjacent to each other.

Specifically, the disc cartridge preferably further includes a second shutter.

More specifically, the first and second opener/closers are preferably connected to, or engaged with, the at least one shutter and the second shutter, respectively.

In that case, the first opener/closer is preferably a protrusion that is connected to the at least one shutter, and the at least one shutter is preferably opened or closed by sliding the first opener/closer along a portion of the first side surface.

For example, the second opener/closer may be a rotational member that is engaged with the second shutter. Then, the second shutter may be opened or closed by rotating the second opener/closer.

Alternatively, the second opener/closer may also be a sliding link member that is engaged with the second shutter. Then, the second shutter may be opened or closed by sliding the second opener/closer along the second side surface.

As another alternative, the second opener/closer may also be a belt member that is connected to the second shutter. Then, the second shutter may be opened or closed by sliding the second opener/closer along the second side surface.

A disc cartridge according to yet another preferred embodiment of the present invention includes a cartridge body, a pair of shutters, a number of disc holders and a rotation stopper. The cartridge body includes a disc storage portion, a chucking opening and a head opening. The disc storage portion stores a disc, having first and second sides, therein so that the disc is rotatable in the disc storage portion and that the first side of the disc is exposed. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The pair of shutters is supported, and movable with respect to the cartridge body, between the second side of the disc and the bottom of the disc storage portion so as to expose or cover the chucking and head openings. The disc holders are provided for the shutters, press the disc against the shutters, and hold the disc thereon while the chucking and head openings are covered with the shutters. The rotation stopper is provided for at least one of the disc holders to prevent the disc from rotating while the shutters are closed.

In one preferred embodiment of the present invention, the rotation stopper is preferably made of a material having a large coefficient of friction and is preferably provided for the at least one of the disc holders so as to contact with the disc while the shutters are closed.

In this particular preferred embodiment, the rotation stopper is preferably made of rubber.

A disc cartridge according to yet another preferred embodiment of the present invention includes a cartridge body, a pair of shutters, a number of disc holders and at least one disc stopper. The cartridge body includes a disc storage portion, a chucking opening and a head opening. The disc storage portion has a disc window and stores a disc, having first and second sides, therein so that the disc is rotatable in the disc storage portion and that the first side of the disc is exposed inside the disc window. The chucking opening is formed on the bottom of the disc storage portion so as to get the disc chucked externally. The head opening is also formed on the bottom of the disc storage portion so as to allow a head, which reads and/or writes a signal from/on the second side of the disc, to access the second side of the disc. The pair of shutters is supported, and movable with respect to the cartridge body, between the second side of the disc and the bottom of the disc storage portion so as to expose or cover the chucking and head openings. The disc holders are provided for the shutters, press the disc against the shutters, and hold the disc thereon while the chucking and head openings are covered with the shutters. The at least one disc stopper is provided for the cartridge body so as to protrude at least partially into the disc window. The head opening reaches a side surface of the cartridge body. An opener/closer for use to open and close the shutters is provided for at least one of the shutters and is located inside the head opening.

In one preferred embodiment of the present invention, the shutters preferably have first and second pairs of contact portions, each pair contacting with each other. The first and second pairs are not aligned with each other.

In this particular preferred embodiment, the contact portions of each of the first and second pairs are preferably sloped, and overlap with each other, in a thickness direction of the disc.

More particularly, in the first pair of contact portions, the contact portion of one of the two shutters is preferably located over the contact portion of the other shutter. In the second pair of contact portions on the other hand, the contact portion of the one shutter is preferably located under the contact portion of the other shutter.

In yet another preferred embodiment, while closed, the shutters preferably define a hold in a region corresponding to a center hole of the disc.

Specifically, the hole defined by the shutters preferably has a diameter that is approximately equal to that of the center hole of the disc.

More specifically, the disc holders are preferably provided at two ends of the shutters, and each of the disc holders preferably has a downwardly tapered slope.

In this particular preferred embodiment, at least one of the disc holders is preferably movable toward the center of the disc.

Alternatively, each of the disc holders preferably includes a first portion with a first height and a second portion with a second height that is lower than the first height. An inner upper surface of the cartridge body preferably has a recessed portion that receives the top of the first portion of each of the disc holders that moves as the shutters are going to be opened or closed. The recessed portion is preferably thinner than another portion of the inner upper surface of the cartridge body under which the second portion of each of the disc holders moves.

In this particular preferred embodiment, as the shutters are going to be closed, the first portion of each of the disc holders preferably contacts with the disc earlier than the second portion thereof.

In yet another preferred embodiment, the disc stopper preferably has a disc contact portion that contacts with the disc. A portion of the slope of at least one of the disc holders is preferably located over the disc contact portion of the disc stopper.

In this particular preferred embodiment, the shutters preferably rotate on a pair of shafts that are provided for the cartridge body.

Specifically, the shutters preferably have an interlocking mechanism that interlocks the shutters together to open or close the shutters synchronously with each other.

In that case, the disc cartridge preferably further includes an elastic member that applies an elastic force to the shutters to keep the shutters closed.

A disc drive according to a preferred embodiment of the present invention is loaded with the disc cartridge according to one of the various preferred embodiments of the present invention described above, and reads and/or writes a signal from/on the disc that is stored in the disc cartridge.

A disc drive according to another preferred embodiment of the present invention includes driving means, a head, a supporting mechanism and a shutter opening/closing mechanism. The driving means rotates a disc. The head reads and/or writes a signal from/on the disc. The supporting mechanism supports the disc cartridge according to one of the various preferred embodiments of the present invention described above, which stores the disc therein, at a predetermined position with respect to the driving means. The shutter opening/closing mechanism opens the shutter of the disc cartridge and gets the disc released from the disc holder or the disc retaining member so that the disc is rotatable inside the disc storage portion of the disc cartridge.

In one preferred embodiment of the present invention, the disc drive preferably further includes a damper for mounting the disc onto the driving means.

In another preferred embodiment of the present invention, the supporting structure preferably includes a positioning pin for fixing the disc cartridge at the predetermined position.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 99 is an exploded perspective view of the disc cartridge shown in FIG. 98.

DETAILED DESCRIPTION OF PREFERRED EMBODIMENTS

Embodiment 1

Figure 1:
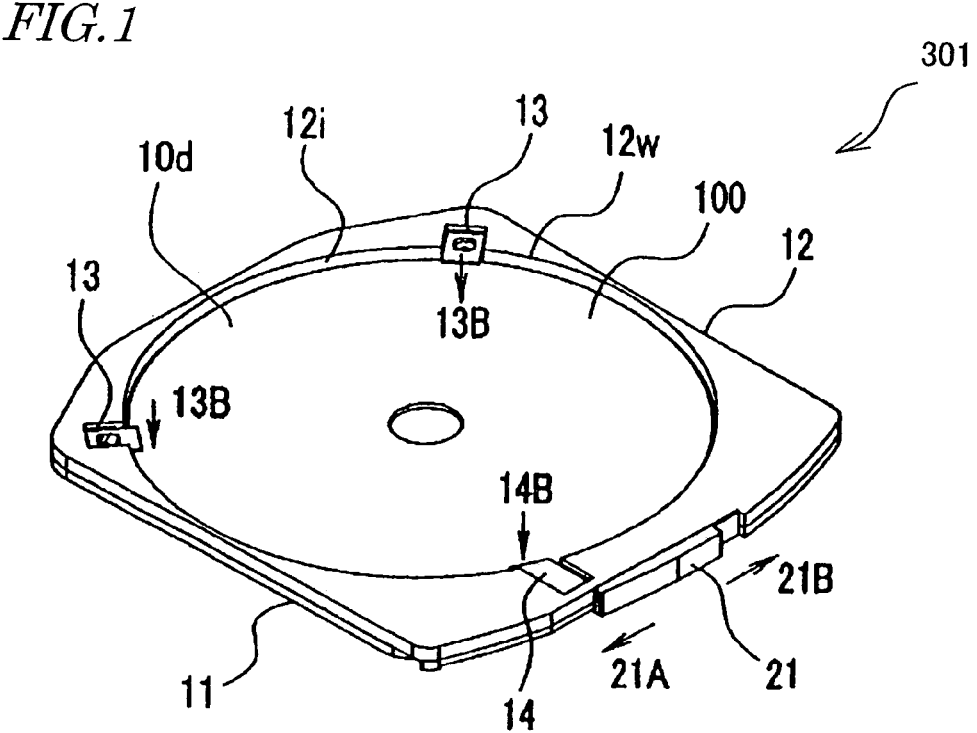
FIG. 1 is a perspective view illustrating an overall configuration for a disc cartridge according to a first specific preferred embodiment of the present invention.
Figure 2:
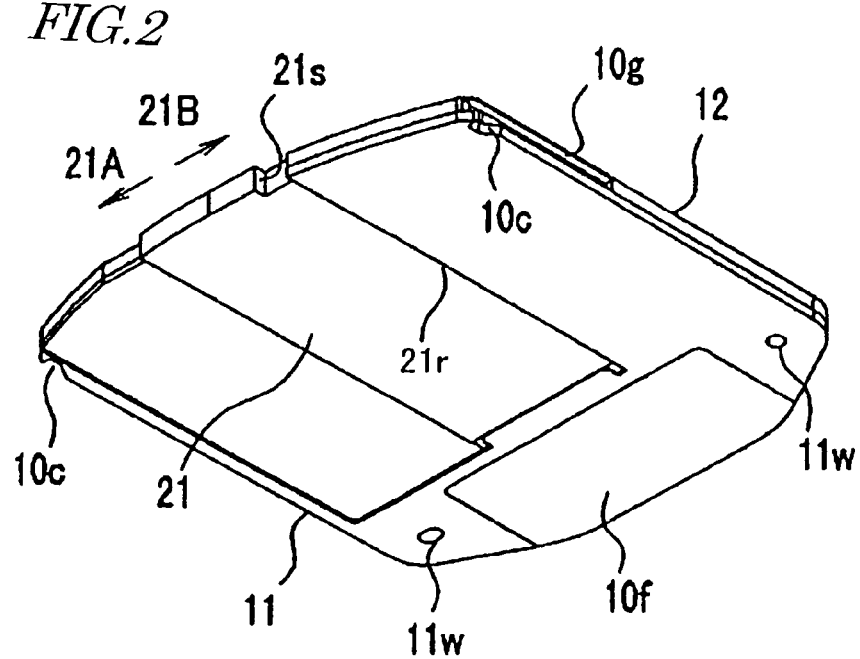
FIG. 2 is a perspective view of the disc cartridge shown in FIG. 1 as viewed from below it.
Figure 3:
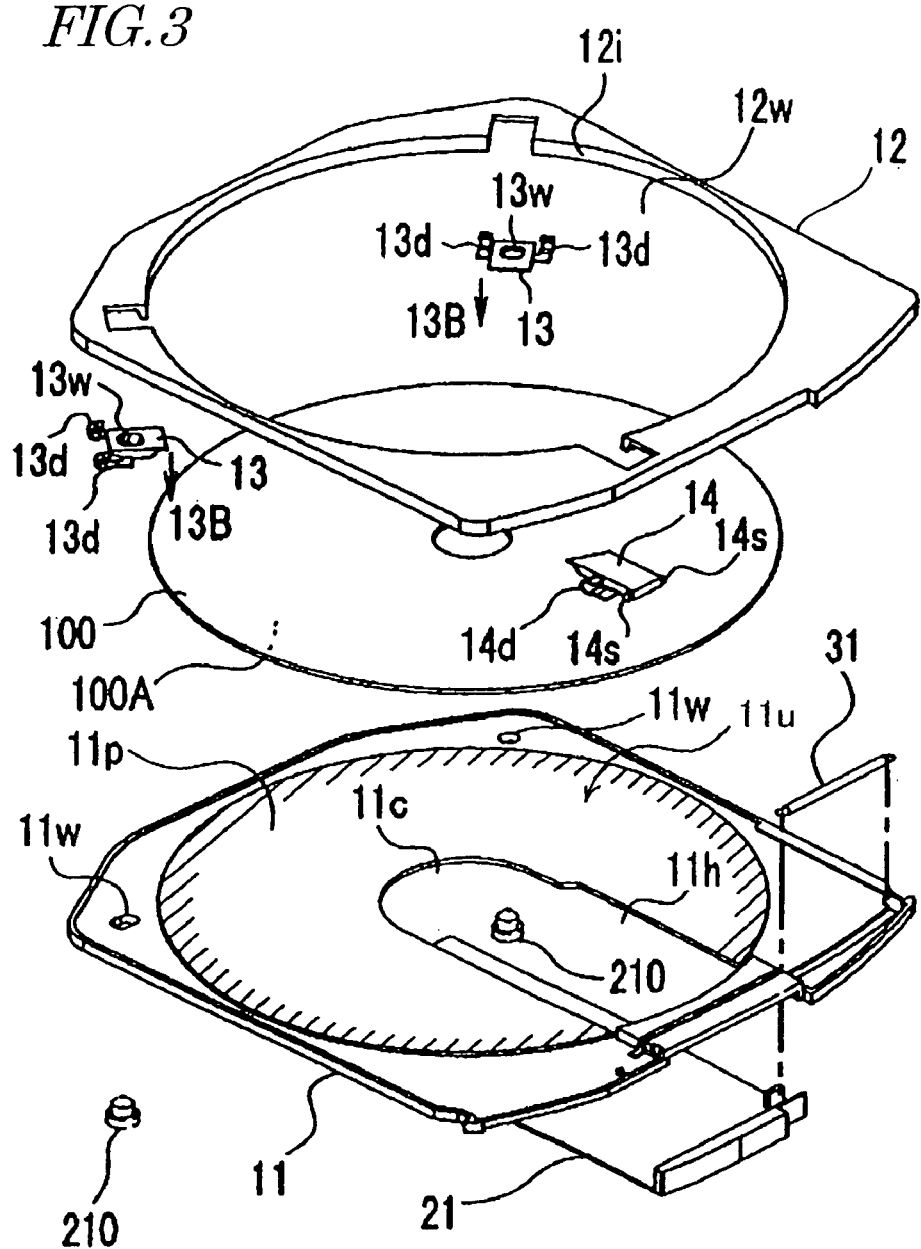
FIG. 3 is an exploded perspective view of the disc cartridge shown in FIG. 1.

Hereinafter, a disc cartridge 301 according to a first specific preferred embodiment of the present invention will be described with reference to FIGS. 1, 2 and 3. FIG. 1 is a perspective view illustrating an overall configuration of the disc cartridge 301, including a disc 100 stored, as viewed from above the cartridge 301. FIG. 2 is a perspective view of the disc cartridge 301 as viewed from below the cartridge 301. FIG. 3 is an exploded perspective view illustrating respective parts of the disc cartridge 301.

The disc 100 includes first and second sides. The first side of the disc 100, on which its label, for example, is normally printed, is illustrated in FIG. 1, while the second side thereof, i.e., the signal recording side 100A, is illustrated as the backside in FIG. 3.

As shown in FIG. 1, the disc cartridge 301 includes a lower shell 11, an upper shell 12, disc holders 13, 14 and a shutter 21.

As shown in FIG. 3, the lower shell 11 includes a chucking opening 11c and a head opening 11h. The chucking opening 11c allows a chucking member (e.g., a spindle motor for rotating the disc 100) to enter the disc cartridge 301 externally. The head opening 11h allows a head, which reads and/or writes a signal from/on the signal recording side 100A of the disc 100, to enter the disc cartridge 301 and access a target location on the disc 100. The lower shell 11 also includes two positioning holes 11w, which engage with cartridge positioning pins 210 of a disc drive (not shown), thereby fixing the disc cartridge 301 in its predetermined position inside the disc drive. The lower shell 11 faces the signal recording side 100A of the disc 100.

The upper shell 12 includes a circular disc window 12w, through which the disc 100 can be introduced and removed into/from the disc cartridge 301 and which expands over the entire projection area of the disc 100 to expose the upper side of the disc 100. The upper and lower shells 12 and 11 are adhered or welded together at their outer periphery, thereby forming a cartridge body 10.

A disc storage portion 10d for storing the disc 100 therein (see FIG. 1) is defined by an inner lower surface 11u and an inner side surface 12i of the cartridge body 10. The inner lower surface 11u is opposed to the signal recording side 100A of the disc 100, while the inner side surface 12i has a substantially cylindrical shape and defines the disc window 12w inside. That is to say, the inner lower surface 11u is the bottom of the disc storage portion 10d. The inner lower surface 11u is covered with a protective layer 11p for the purpose of preventing the signal recording side 100A of the disc 100 from getting scratched or attracting dust.

The protective layer 11p may be appropriately selected from the group consisting of anti-scratching nonwoven fabric, dustproof nonwoven fabric, anti-scratching coating and dustproof coating. In this preferred embodiment, a sheet of a dustproof nonwoven fabric is adhered or ultrasonic welded as the protective layer 11p to the inner lower surface 11u.

In the disc storage portion 10d, a gap, which is wide enough to allow the disc 100 to rotate freely, is provided between the inner side surface 12i and the outer periphery of the disc 100. Also, the top of the disc storage portion 10d is the disc window 12w so that the disc 100 stored in the disc storage portion 10d has one of its sides exposed inside the disc window 12w.

As shown in FIG. 3, the disc cartridge 301 includes two disc holders 13 of the same shape. Each of the disc holders 13 includes a pair of elastic portions 13d and a hole 13w that runs obliquely through the disc holder 13. When the elastic portions 13d of the disc holders 13 are sandwiched between the upper and lower shells 12 and 11, an elastic force is applied to the respective inner ends of the disc holders 13 in the direction indicated by the arrows 13B in FIG. 3. As a result, the disc 100 is pressed against the inner lower surface 11u. Also, these two disc holders 13 are disposed so that the holes 13w thereof are located substantially over the positioning holes 11w.

The other disc holder 14 includes a shaft 14s and two elastic portions 14d. The disc holder 14 is secured to the cartridge body 10 so as to rotate on the shaft 14s. When the elastic portions 14d of the disc holder 14 are sandwiched between the upper and lower shells 12 and 11, an elastic force is applied to the respective inner ends of the disc holder 14 in the direction indicated by the arrow 14B in FIG. 1. As a result, the disc 100 is pressed against the inner lower surface 11u.

The shutter 21 is externally fitted with the lower shell 11 so as to face the signal recording side 100A of the disc 100. As shown in FIGS. 1 and 2, when the shutter 21 is moved horizontally in the direction indicated by the arrow 21A or 21B, the chucking opening 11c and the head opening 11h are exposed or covered. A shutter spring 31 is extended between the shutter 21 and the cartridge body 10 to apply an elastic force to the shutter 21 in such a direction as to close the shutter 21.

As shown in FIG. 2, a label plane or concave portion 10f, on which the user can note down the contents of the disc 100 stored, is provided on the bottom of the cartridge body 10 (i.e., the lower shell 11). As also shown in FIG. 2, a pair of concave portions 10c, provided on the right- and left-hand sides of the cartridge body 10, may be engaged with convex portions provided for a disc drive or a disc changer to pull in and load, or position, the disc cartridge 301. Another concave portion 10g is provided near one of the concave portions 10c. This concave portion 10g has such a shape as to prevent the user from inserting this disc cartridge 301 in a wrong direction. That is to say, this concave portion 10g is just fitted with a convex portion, provided for the disc drive, only when the disc cartridge 301 is inserted in the correct direction. Suppose the user tries to insert the disc cartridge 301 into the disc drive upside down or the wrong way round. In that case, these concave and convex portions are never fitted with each other, thereby preventing the user from inserting this disc cartridge 301 in the wrong way.

Figure 4:
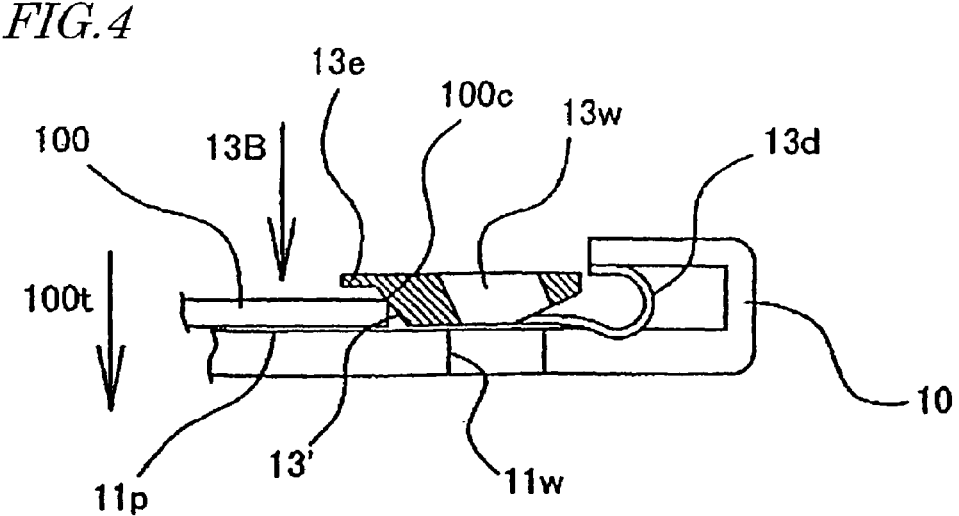
FIG. 4 is a cross-sectional view illustrating a disc holder and a surround portion of the disc cartridge shown in FIG. 1.
Figure 5:
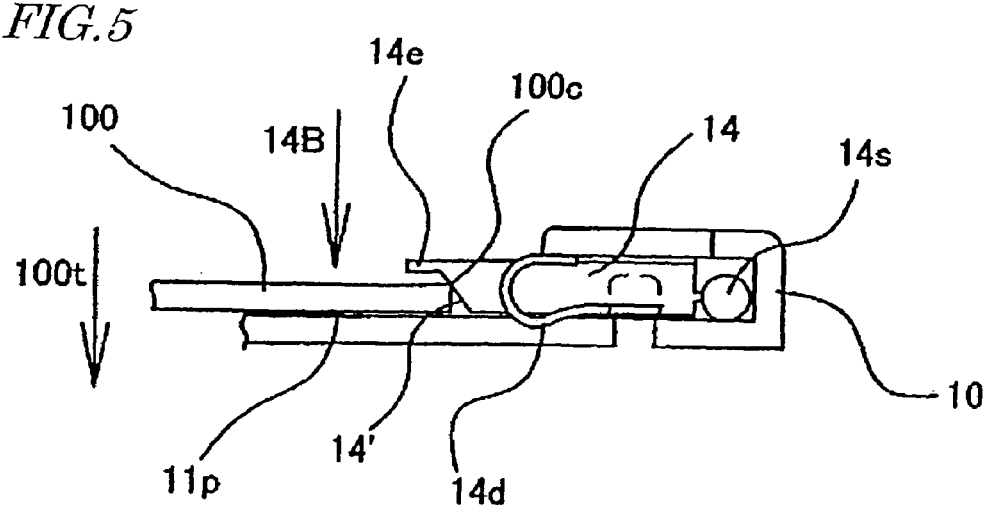
FIG. 5 is a cross-sectional view illustrating another disc holder and a surround portion of the disc cartridge shown in FIG. 1.

Next, it will be described in further detail with reference to FIGS. 4 and 5 how the disc holders 13 and 14 hold the disc 100 thereon. FIG. 4 is a cross-sectional view of the disc holder 13 in a state where the disc 100 has been mounted thereon as shown in FIGS. 1 through 3, while FIG. 5 is a cross-sectional view of the disc holder 14 in the state where the disc 100 has been mounted thereon. FIGS. 3 and 4 are both taken in a disc radial direction.

As shown in FIGS. 4 and 5, the disc holders 13 and 14 include slopes 13' and 14', which are expanded over a portion of the projection area of the disc 100 (i.e., over the outer periphery of the disc 100), at the respective inner ends thereof. As described above, an elastic force is applied from the elastic portions 13*d* or 14*d* to the disc holder 13 or 14 in the direction indicated by the arrow 13B or 14B. In that situation, the slope 13' or 14' contacts with the outer edge 100*c* of the disc 100, thereby gripping the disc 100 thereon and pressing the disc 100 in a thickness direction 100*t* thereof. As a result, the signal recording side 100A of the disc 100 is brought into tight contact with the sheet 11*p*. In this manner, the disc 100 is fixed inside the cartridge body 10. In this state, the outer periphery of the signal recording side 100A of the disc 100 keeps a close contact with the sheet 11*p*. Thus, no dust will be deposited on the signal recording side 100A.

Next, it will be described in detail with reference to FIGS. 6, 7 and 8 how the disc 100 is released from the disc holders 13 and 14.

Figure 6:
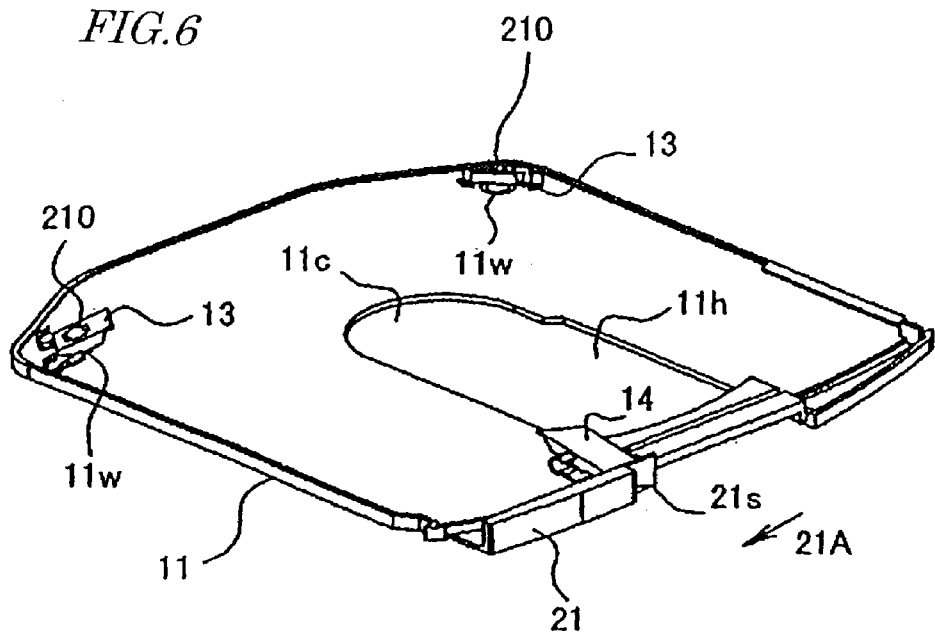
FIG. 6 is a perspective view illustrating a state of the disc cartridge shown in FIG. 1 in which its shutter is opened and positioning pins have been inserted into its positioning holes.

FIG. 6 is a perspective view illustrating the lower shell 11 of the disc cartridge 301 with the upper shell 12 and the disc 100 removed therefrom. As shown in FIG. 6, the shutter 21 has its L-shaped portion 21*s* pressed by a shutter opening mechanism (not shown) of the disc drive in the direction indicated by the arrow 21A. As a result, the chucking opening 11*c* and the head opening 11*h* are now exposed. Also, the cartridge positioning pins 210 of the disc drive are engaged with the positioning holes 11*w* of the cartridge body 10.

Figure 7:
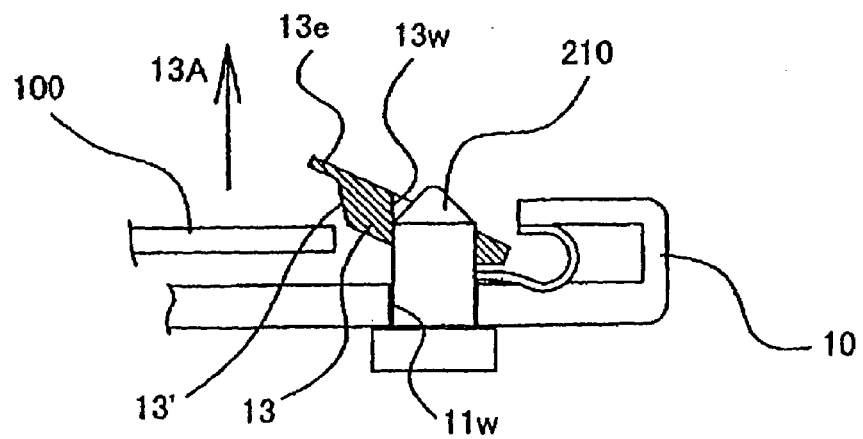
FIG. 7 is a cross-sectional view illustrating a disc holder and a surround portion of the disc cartridge shown in FIG. 6.

FIG. 7 is a cross-sectional view of the disc holder 13 in the state shown in FIG. 6 and is taken in a disc radial direction. FIG. 8 is a perspective view illustrating the disc holder 14 and the shutter 21 in the state shown in FIG. 6 to a larger scale.

As shown in FIG. 7, when the cartridge positioning pin 210 of the disc drive is inserted into the positioning hole 11*w* of the lower shell 11, the cartridge positioning pin 210 engages with the obliquely running hole 13*w* of the disc holder 13. As a result, the disc holder 13 is lifted in the direction indicated by the arrow 13A, and the disc 100 is released from the grip of the slope 13' and is now freely rotatable. At this point in time, the rim 13*e* at the end of the disc holder 13 still hangs over a portion of the projection area of the disc 100 (i.e., the outer periphery thereof). Accordingly, even if the disc 100 is released in the disc cartridge 301 that has been loaded into a vertically mounted disc drive, the disc 100 will not drop down from the disc cartridge 301.

Figure 8:
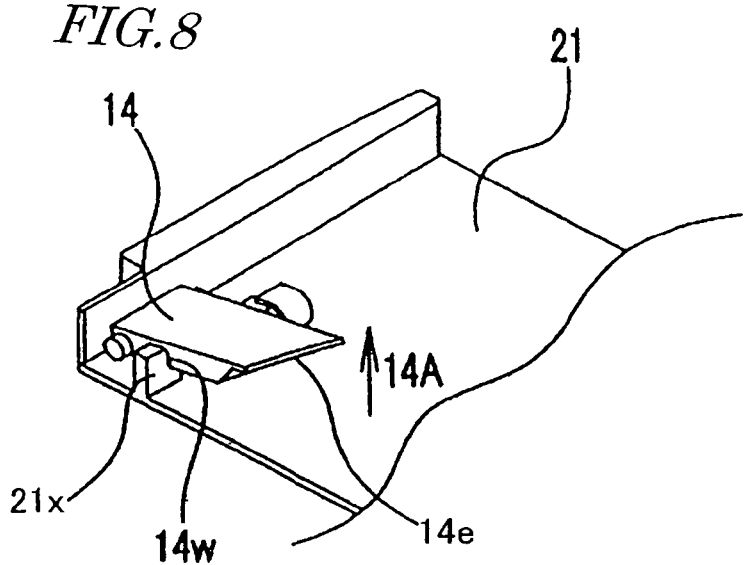
FIG. 8 is a perspective view illustrating another disc holder and a surround portion of the disc cartridge shown in FIG. 6.

On the other hand, when the shutter 21 is opened, a guide rib 21*x* provided on the shutter 21 enters a concave portion 14*w* of the disc holder 14, thereby raising the bottom of the concave portion 14*w* as shown in FIG. 8. As a result, the disc holder 14 is lifted to the direction indicated by the arrow 14A and the disc 100 is released from the grip of the slope 14' and becomes freely rotatable. At this point in time, the rim 14*e* at the end of the disc holder 14 still hangs over a portion of the projection area of the disc 100 (i.e., the outer periphery thereof). Accordingly, even if the disc 100 is released in the disc cartridge 301 that has been loaded into a vertically mounted disc drive, the disc 100 will not drop down from the disc cartridge 301.

Also, to remove the disc 100 intentionally, the user must release the disc 100 from the three disc holders 13 and 14 at the same time. Accordingly, it is possible to prevent the user from removing the disc 100 accidentally.

In this preferred embodiment, the end 21*r* of the shutter 21, which is opposed to the signal recording side 100A of the disc 100 when the shutter 21 is closed, may be provided with a brush or a dust cleaner as shown in FIG. 2 so that dust is removed from the signal recording side 100A of the disc 100 every time the shutter 21 is opened and closed. Optionally, the disc cartridge 301 may also include a locking mechanism for locking the disc holders 13 and 14 onto the cartridge body 10 when the disc 100 is mounted thereon.

Embodiment 2

Figure 9:
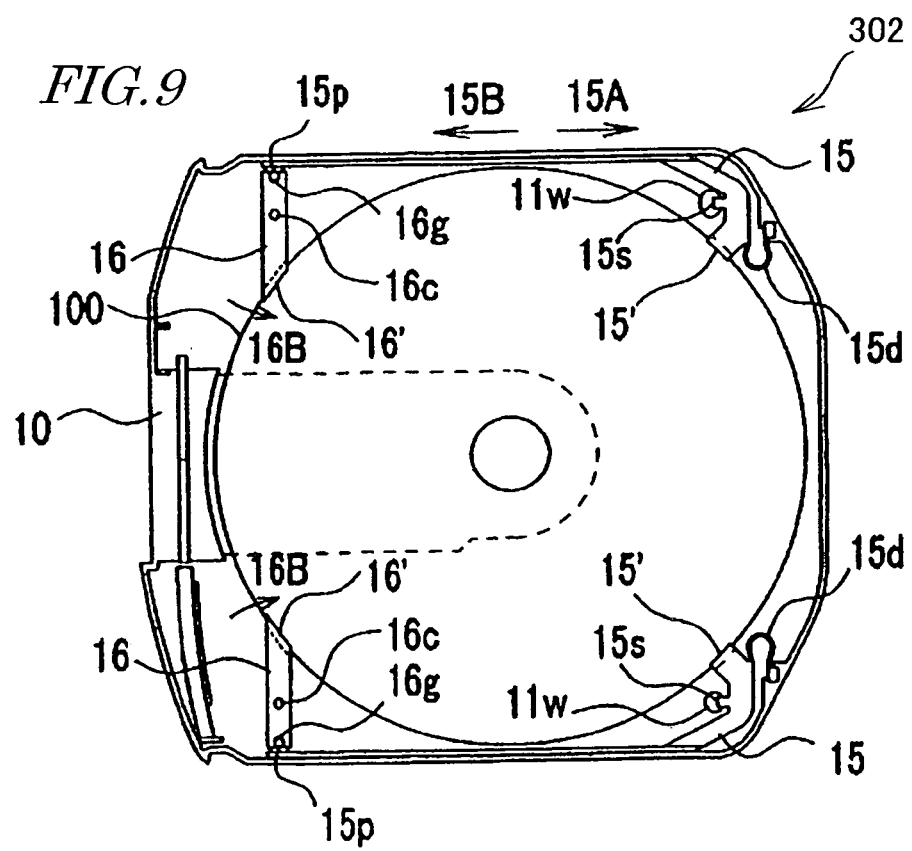
FIG. 9 is a plan view illustrating an overall configuration for a disc cartridge according to a second specific preferred embodiment of the present invention.
Figure 10:
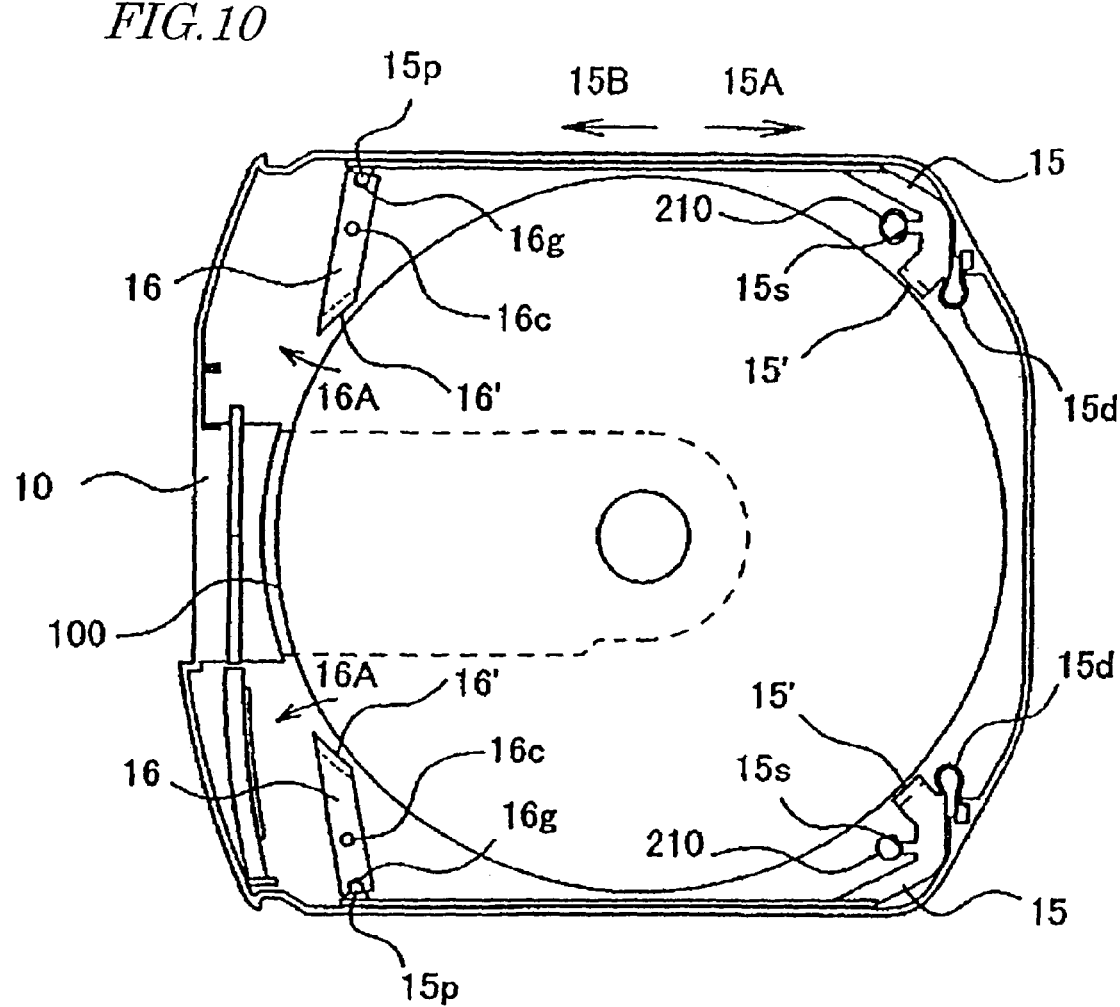
FIG. 10 is a plan view illustrating a state of the disc cartridge shown in FIG. 9 in which the disc has been released from its disc holders.

Hereinafter, a disc cartridge 302 according to a second specific preferred embodiment of the present invention will be described with reference to FIGS. 9 and 10. Specifically, FIG. 9 is plan view illustrating an overall configuration for the disc cartridge 302 in which the disc 100 is held by disc holders. FIG. 10 is a plan view illustrating an overall configuration for the disc cartridge 302 in which the disc 100 has been released from the disc holders. In FIGS. 9 and 10, each member having substantially the same function as the counterpart of the first preferred embodiment described above is identified by the same reference numeral and the description thereof will be omitted herein.

The disc cartridge 302 of the second preferred embodiment is different from the disc cartridge 301 of the first preferred embodiment in the function and structure of the disc holders. Specifically, the disc cartridge 302 of the second preferred embodiments includes two pairs of disc holders 15 and 16, which slide in the direction indicated by the arrow 15A or 15B, as shown in FIG. 9.

Each of the disc holders 15 includes an elastic portion 15*d*, which applies an elastic force to the disc holder 15 in the direction indicated by the arrow 15B. Just like the disc holders 13 and 14 of the first preferred embodiment, a slope 15' provided at the end of each disc holder 15 presses and fixes the disc 100 against the cartridge body 10.

Each of the disc holders 16 includes a shaft 16*c*. That is to say, the disc holder 16 is provided for the cartridge body 10 so as to rotate on its shaft 16*c*. Just like the disc holders 13 and 14 of the first preferred embodiment, a slope 16' provided at the end of each disc holder 16 presses and fixes the disc 100 against the cartridge body 10. Each of the disc holders 15 further includes a coupling pin 15*p*, which is engaged and interlocked with a groove 16*g* of its associated disc holder 16.

When the two cartridge positioning pins 210 of the disc drive are engaged with the positioning holes 11*w* of the cartridge body 10, respective protrusions 15*s* of the disc holders 15 are pushed and lifted by the positioning pins 210 as shown in FIG. 10. As a result, the disc holders 15 are moved in the direction indicated by the arrow 15A and the disc 100 is released from the grip of the slopes 15'. In the meantime, as the disc holders 15 are moved in the direction 15A, the disc holders 16 are rotated to the direction indicated by the arrow 16A. Consequently, the disc 100 is also released from the grip of the slopes 16'.

Embodiment 3

Figure 11:
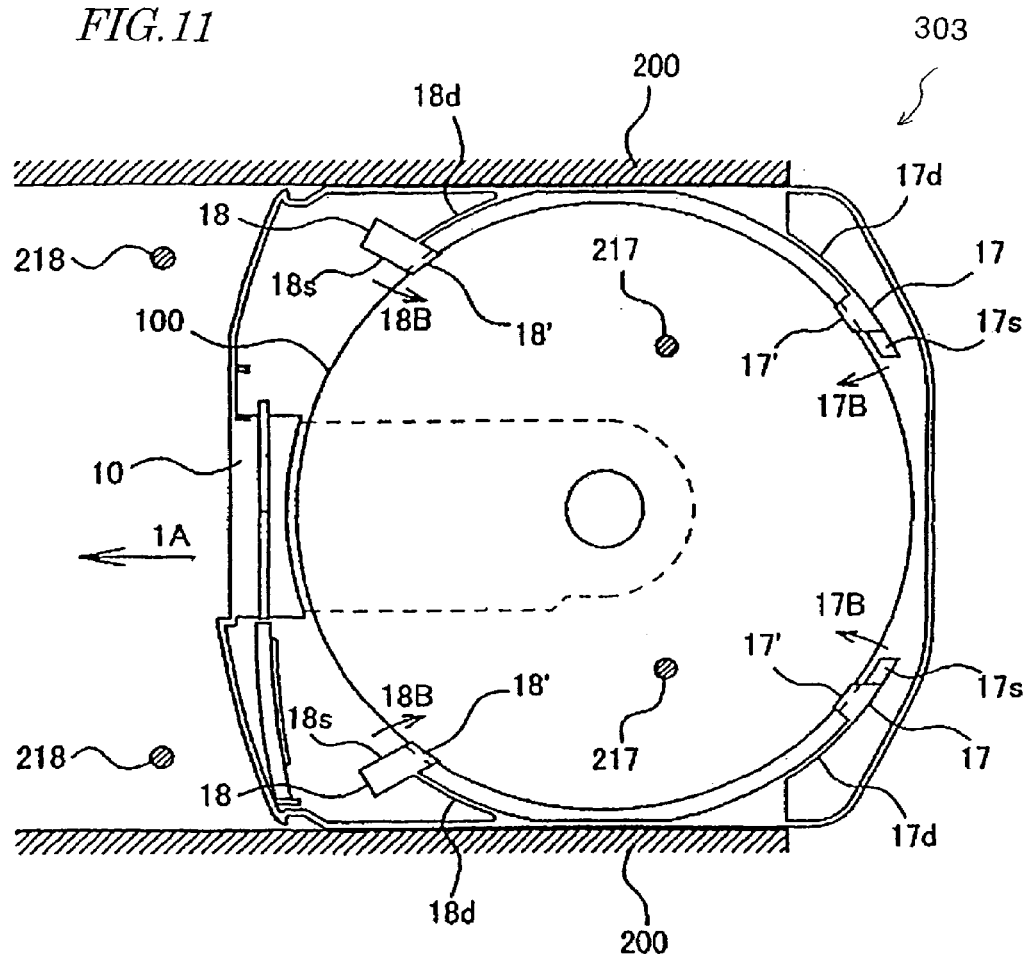
FIG. 11 is a plan view illustrating an overall configuration for a disc cartridge according to a third specific preferred embodiment of the present invention.
Figure 12:
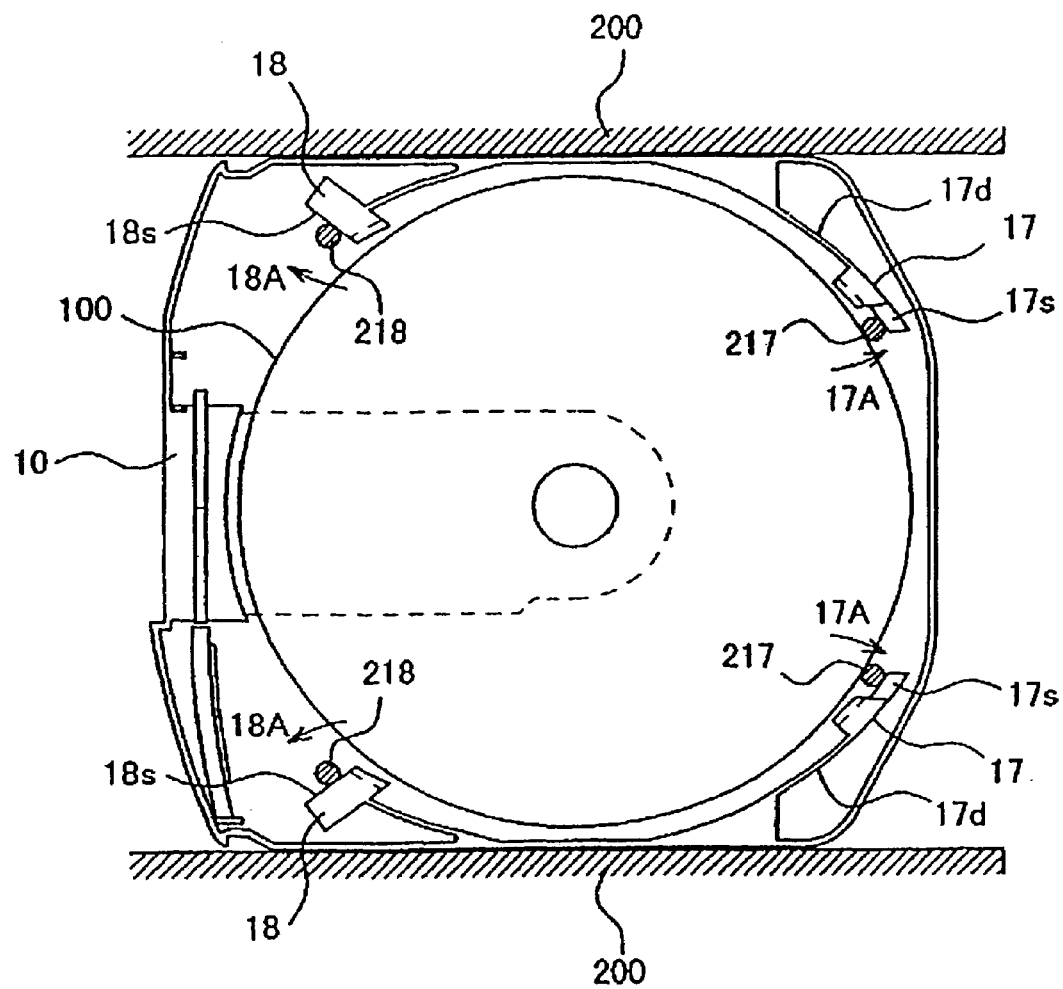
FIG. 12 is a plan view illustrating a state of the disc cartridge shown in FIG. 11 in which the disc has been released from its disc holders.

Hereinafter, a disc cartridge 303 according to a third specific preferred embodiment of the present invention will be described with reference to FIGS. 11 and 12. Specifically, FIG. 11 is plan view illustrating an overall configuration for the disc cartridge 303 in which the disc 100 is held by disc holders. FIG. 12 is a plan view illustrating an overall configuration for the disc cartridge 303 in which the disc 100 has been released from the disc holders. In FIGS. 11 and 12, each member having substantially the same function as the counterpart of the first preferred embodiment described above is identified by the same reference numeral and the description thereof will be omitted herein.

The disc cartridge 303 of the third preferred embodiment is different from the disc cartridge 301 of the first preferred embodiment in the function and structure of the disc holders. Specifically, the disc cartridge 303 of the third preferred embodiments includes two pairs of disc holders 17 and 18, to which an elastic force is applied in the directions indicated by the arrows 17B and 18B, respectively, as shown in FIG. 11. These disc holders 17 and 18 have been molded together with the cartridge body 10 so as to form integral parts of the cartridge body 10.

Each of the disc holders 17 includes an elastic portion 17d, which applies an elastic force to the disc holder 17 in the direction indicated by the arrow 17B. Just like the disc holders 13 and 14 of the first preferred embodiment, a slope 17' provided at the end of each disc holder 17 presses and fixes the disc 100 against the cartridge body 10.

Each of the disc holders 18 also includes an elastic portion 18d, which applies an elastic force to the disc holder 18 in the direction indicated by the arrow 18B. A slope 18' provided at the end of each disc holder 18 also presses and fixes the disc 100 against the cartridge body 10.

When this disc cartridge 303 is inserted into a disc drive 200, a pair of disc releasing pins 217, provided for the disc drive 200, presses protrusions 17s of the disc holders 17. As a result, the disc 100 is released from the disc holders 17 as shown in FIG. 12. At the same time, another pair of disc releasing pins 218, also provided for the disc drive 200, contacts with the side surfaces 18s of the disc holders 18. Consequently, the disc 100 is also released from the disc holders 18 as shown in FIG. 12.

Embodiment 4

Figure 13:
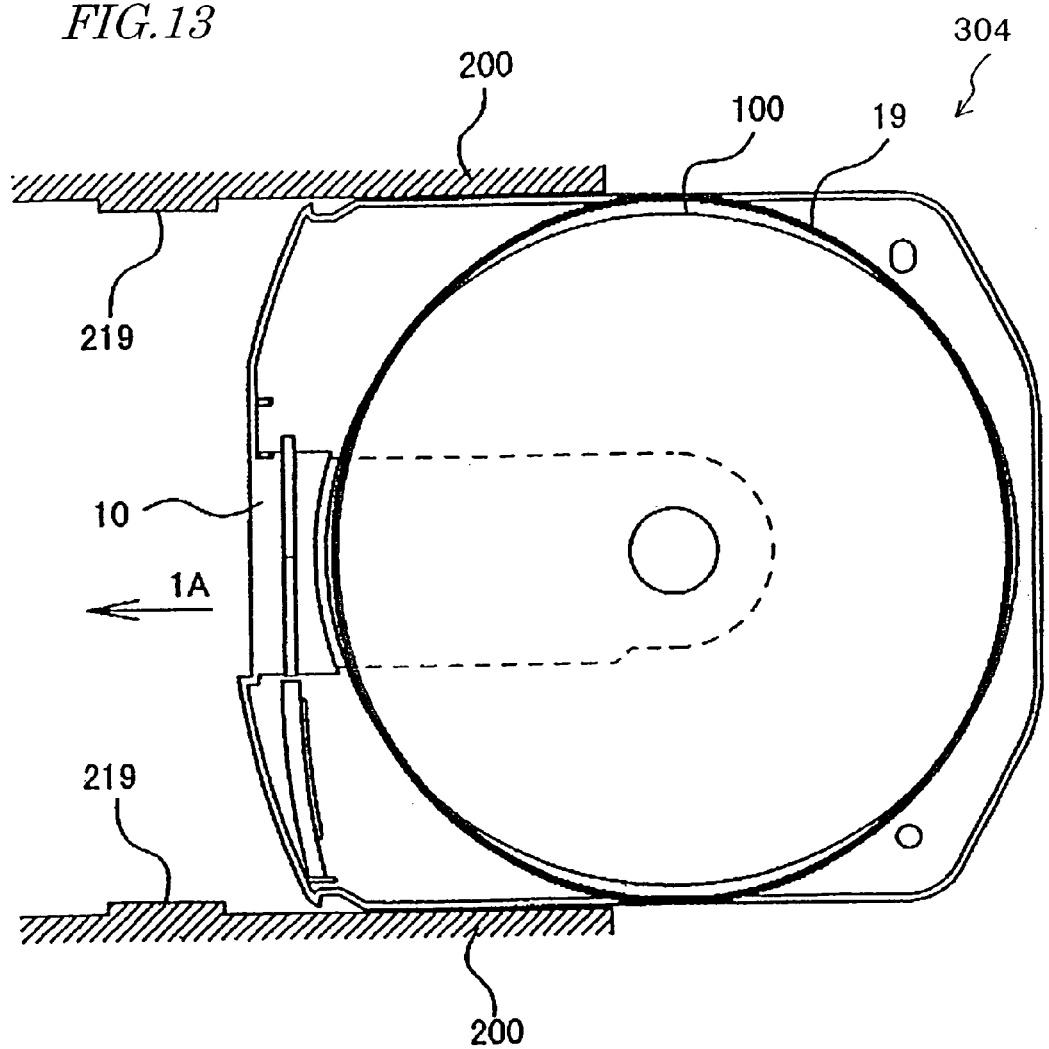
FIG. 13 is a plan view illustrating an overall configuration for a disc cartridge according to a fourth specific preferred embodiment of the present invention.
Figure 14:
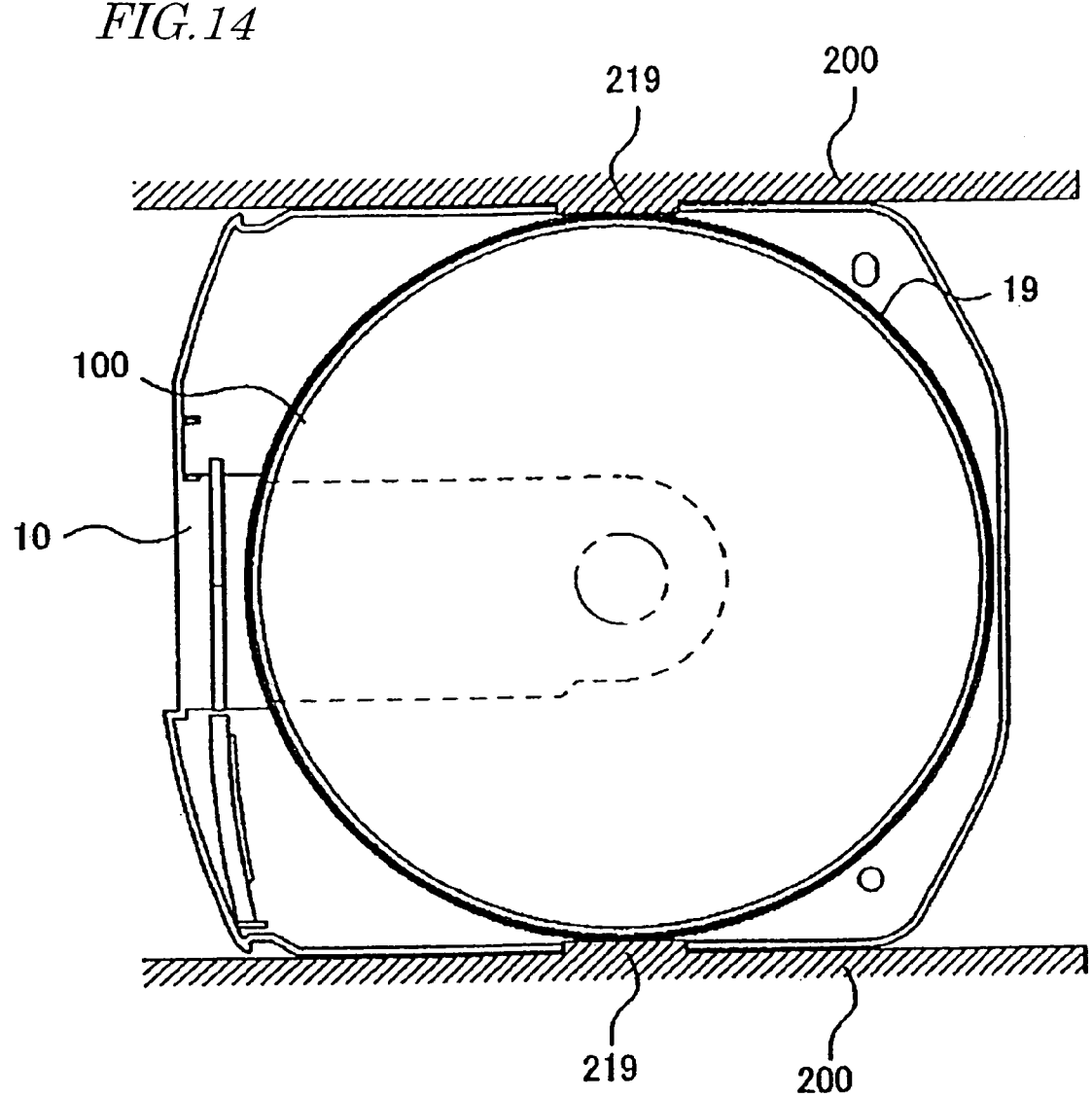
FIG. 14 is a plan view illustrating a state of the disc cartridge shown in FIG. 13 in which the disc has been released from its disc holder.

Hereinafter, a disc cartridge 304 according to a fourth specific preferred embodiment of the present invention will be described with reference to FIGS. 13 and 14. Specifically, FIG. 13 is plan view illustrating an overall configuration for the disc cartridge 304 in which the disc 100 is held by a disc holder. FIG. 14 is a plan view illustrating an overall configuration for the disc cartridge 304 in which the disc 100 has been released from the disc holder. In FIGS. 13 and 14, each member having substantially the same function as the counterpart of the first preferred embodiment described above is identified by the same reference numeral and the description thereof will be omitted herein.

The disc cartridge 304 of the fourth preferred embodiment is different from the disc cartridge 301 of the first preferred embodiment in the function and structure of the disc holder. Specifically, the disc cartridge 304 includes a ringlike disc holder 19.

As shown in FIG. 13, the disc holder 19 is a ringlike elastic member, which is made of rubber, for example, and can change its shape freely. When no force is externally applied thereto, the disc holder 19 has an ellipsoidal planar shape. However, by applying an external force thereto, the disc holder 19 may be deformed into a substantially completely round shape. In that case, the inside diameter of the disc holder 19 is greater than the diameter of the disc 100.

As shown in FIG. 13, the ellipsoidal disc holder 19 is in contact with the disc 100 at multiple points, thereby fixing the disc 100 onto the cartridge body 10. However, when this disc cartridge 304 is inserted into a disc drive 200, convex portions 219, provided for the disc drive 200, press the major axis portion of the ellipsoidal disc holder 19, thereby deforming the disc holder 19 as shown in FIG. 14. As a result, the disc holder 19 is deformed into an approximately completely round shape and is no longer in contact with the disc 100. That is to say, the disc 100 is released from the disc holder 19.

To release the disc 100 from the disc holder 19, the force that deforms the disc holder 19 may also be applied from the convex portion of the disc drive 200, which engages with the concave portion 10g (see FIG. 2) provided for preventing the user from inserting the disc cartridge in the wrong direction, to the disc holder 19. Alternatively, that force may also be applied from a pair of convex portions of the disc drive 200, which engages with the concave portions 10c (see FIG. 2) provided on the right- and left-hand sides of the disc cartridge 301 for pulling in the disc cartridge 301, to the disc holder 19.

Embodiment 5

Figure 15:
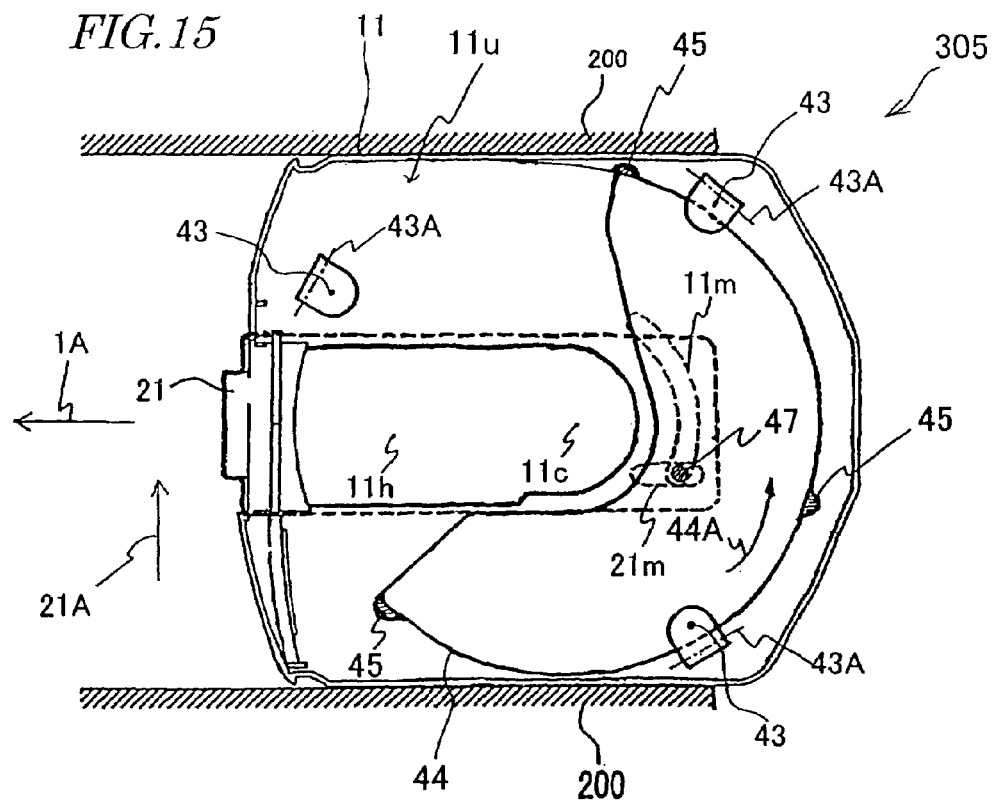
FIG. 15 is a plan view illustrating an overall configuration for a disc cartridge according to a fifth specific preferred embodiment of the present invention in a state where its shutter is closed.
Figure 16:
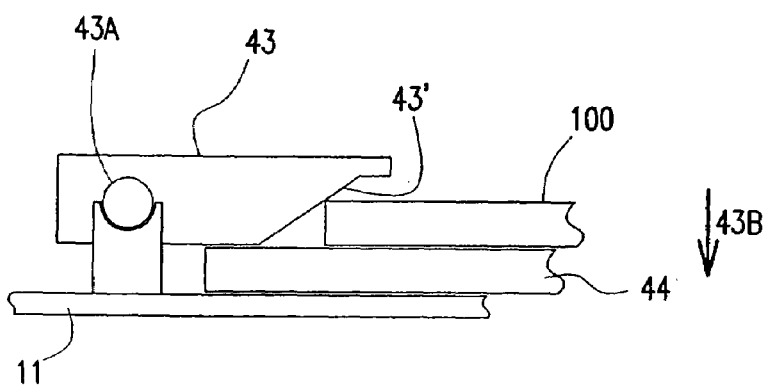
FIG. 16 is a cross-sectional view of a disc holder of the disc cartridge in the state shown in FIG. 15.
Figure 17:
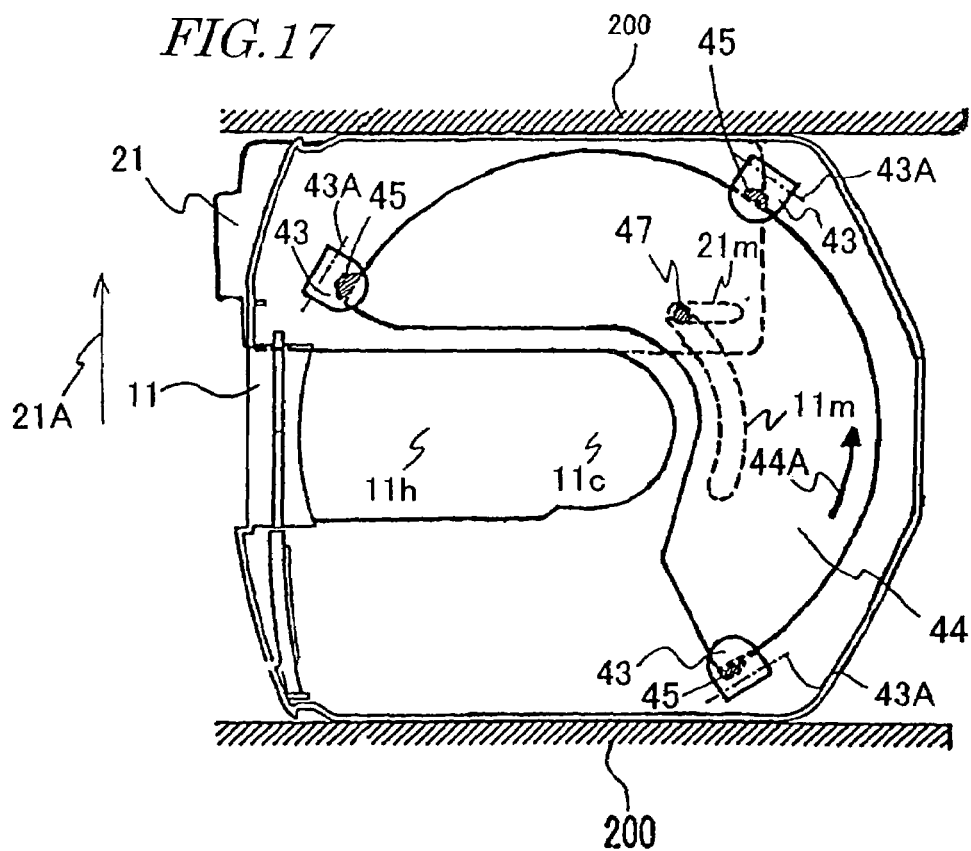
FIG. 17 is a plan view illustrating an overall configuration for the disc cartridge shown in FIG. 15 in a state where its shutter is opened.
Figure 18:
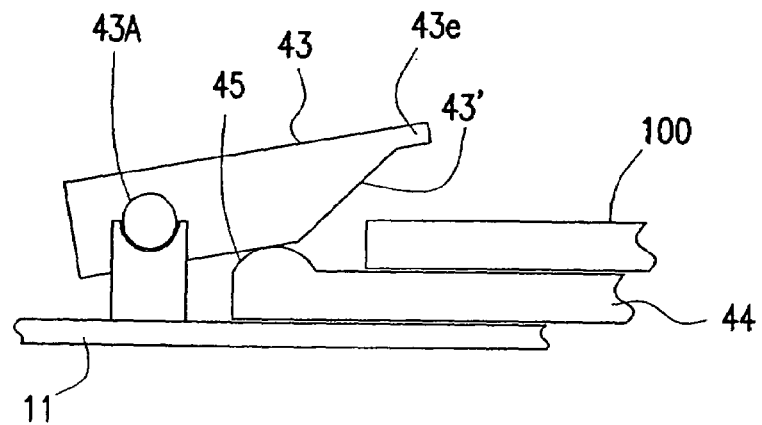
FIG. 18 is a cross-sectional view of the disc holder of the disc cartridge in the state shown in FIG. 17.

Hereinafter, a disc cartridge 305 according to a fifth specific preferred embodiment of the present invention will be described with reference to FIGS. 15 through 18. FIGS. 15 and 17 are plan views illustrating the structure of the disc cartridge 305 of the fifth preferred embodiment from which the upper shell has been removed. Specifically, FIG. 15 illustrates a state where the shutter 21 covers the openings 11h and 11c, while FIG. 17 illustrates a state where the shutter 21 exposes the openings 11h and 11c. FIGS. 16 and 18 illustrate states of a disc holder 43 when the shutter 21 is closed and when the shutter 21 is opened, respectively.

In FIGS. 15 through 18, each member having substantially the same function as the counterpart of the first preferred embodiment described above is identified by the same reference numeral.

The disc cartridge 305 of the fifth preferred embodiment is characterized in that the disc holding and releasing operations and the opening and closing operations are synchronously performed by disc holders 43 and the shutter 21, respectively, by way of a disc holder/shutter interlocking member 44.

The disc holder/shutter interlocking member 44 is provided over the inner lower surface 11u so as to rotate and slide around the chucking opening 11c of the lower shell 11 as indicated by the arrow 44A in FIGS. 15 and 17. The disc holder/shutter interlocking member 44 has a fan shape, or in the shape of a partially notched ring that has an inside diameter equal to the diameter of the chucking opening 11c.

The disc holder/shutter interlocking member 44 includes a pin 47 that extends toward the lower shell 11 (i.e., in the direction going into the paper of FIGS. 15 and 17). The lower shell 11 and the shutter 21 are respectively provided with guide grooves 11m and 21m that both engage with the pin 47. Also, multiple protrusions 45, which extend outward and upward (i.e., in the direction coming out of the paper of FIGS. 15 and 17), are provided on the outer periphery of the disc holder/shutter interlocking member 44. Furthermore, the upper surface of the disc holder/shutter interlocking member 44 is covered with a nonwoven fabric or a coating to prevent the signal recording side 100A of the disc 100 from getting scratched or attracting dust.

A number of disc holders 43 are disposed at predetermined intervals on the inner lower surface 11u so as to hold the outer edge of the disc 100 thereon when the disc 100 is stored in the disc cartridge 305. In the preferred embodiment shown in FIGS. 15 and 17, three disc holders 43 are provided. Alternatively, two, four or more disc holders 43 may also be provided. In any case, each of those disc holders 43 is secured to the lower shell 11 so as to rotate on the shaft 43A thereof.

As shown in FIG. 16, each of the disc holders 43 is located at such a position so as to partially overlap with the outer periphery of the disc holder/shutter interlocking member 44. Also, an elastic portion (not shown in FIG. 16) such as the elastic portion 14d shown in FIG. 5, for example, applies an elastic force to each disc holder 43 downward (i.e., toward the lower shell 11). Accordingly, while contacting with the outer edge of the disc 100, the slope 43' of the disc holder 43 not only presses the disc 100 in the direction indicated by the arrow 43B in FIG. 16 so that the disc 100 is brought into contact with the disc holder/shutter interlocking member 44 but also holds the disc 100 thereon.

As shown in FIG. 15, when the disc cartridge 305 including the disc (not shown) is inserted into a disc drive 200 in the direction indicated by the arrow 1A, a shutter opener/closer (not shown), provided for the disc drive 200, moves the shutter 21 in the direction indicated by the arrow 21A, thereby opening the shutter 21. When the shutter 21 starts to move in the direction 21A, a force is also applied in the direction 21A to the pin 47 of the disc holder/shutter interlocking member 44 that is engaged with the guide groove 21m of the shutter 21. As a result, the pin 47 is moved along the guide groove 11m of the lower shell 11, and the disc holder/shutter interlocking member 44 starts to rotate to the direction indicated by the arrow 44A around the chucking opening 11c. The guide groove 11m preferably extends approximately in the direction in which the shutter 21 is moved so that the disc holder/shutter interlocking member 44 moves along with the shutter 21.

When the shutter 21 is completely open, the protrusions 45 on the outer periphery of the disc holder/shutter interlocking member 44 are located under the disc holders 43 as shown in FIG. 17. Then, as shown in FIG. 18, the disc holders 43 are pushed up by the protrusions 45 and the slopes 43' of the disc holders 43 separate themselves from the outer edge of the disc 100. As a result, the force that has been vertically applied to the disc 100 in the direction indicated by the arrow 43B is removed from the disc 100 and the disc 100 is now freely rotatable. At this point in time, the rim 43e at the end of the disc holder 43 still hangs over a portion of the projection area of the disc 100 (i.e., the outer periphery thereof). Accordingly, even if the disc 100 is released in the disc cartridge 305 that has been loaded into a vertically mounted disc drive, the disc 100 will not drop down from the disc cartridge 305.

In the disc cartridge 305 of the fifth preferred embodiment, the disc can be released even if the disc cartridge 305 is not inserted into the disc drive 200. Accordingly, if the shutter 21 is opened manually, the disc holders 43 will release the disc 100 synchronously with the movement of the shutter 21. Thus, the user can remove an unwanted disc from the cartridge 305 and insert a new disc thereto any time he or she likes.

Embodiment 6

Figure 19:
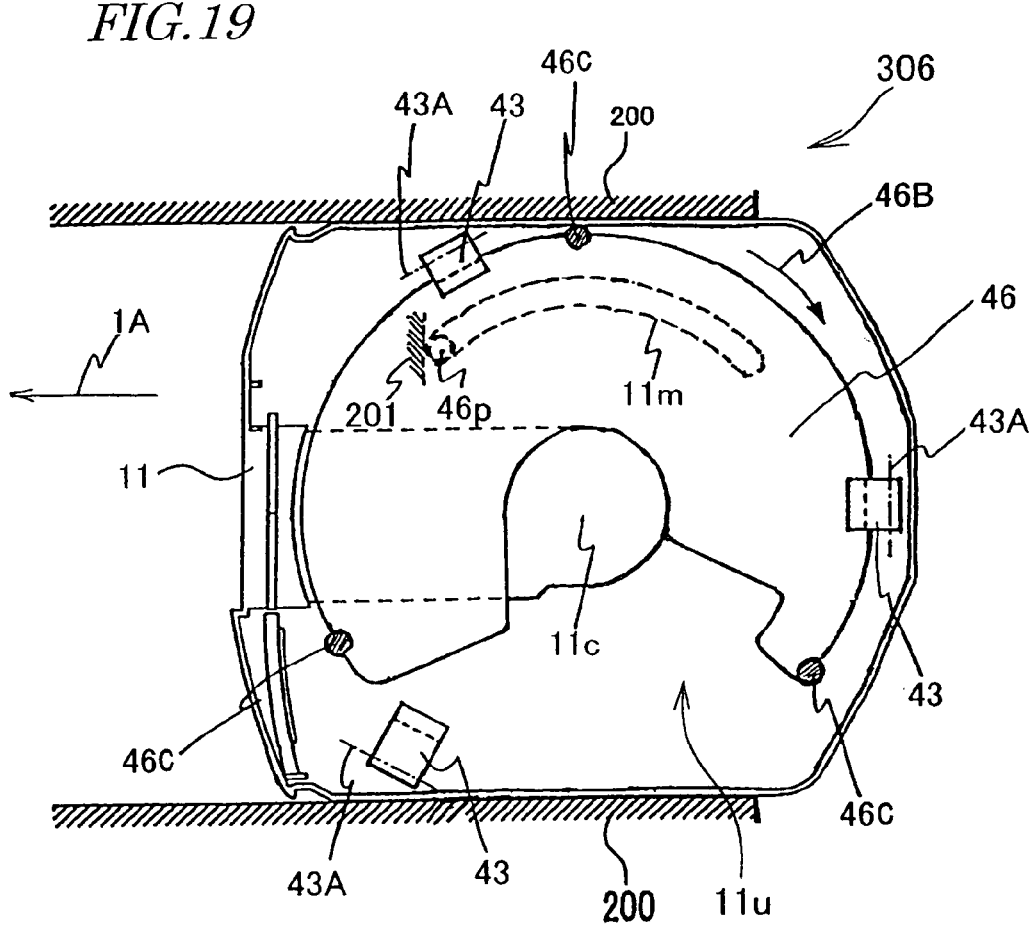
FIG. 19 is a plan view illustrating an overall configuration for a disc cartridge according to a sixth specific preferred embodiment of the present invention in a state where its shutter is closed.
Figure 20:
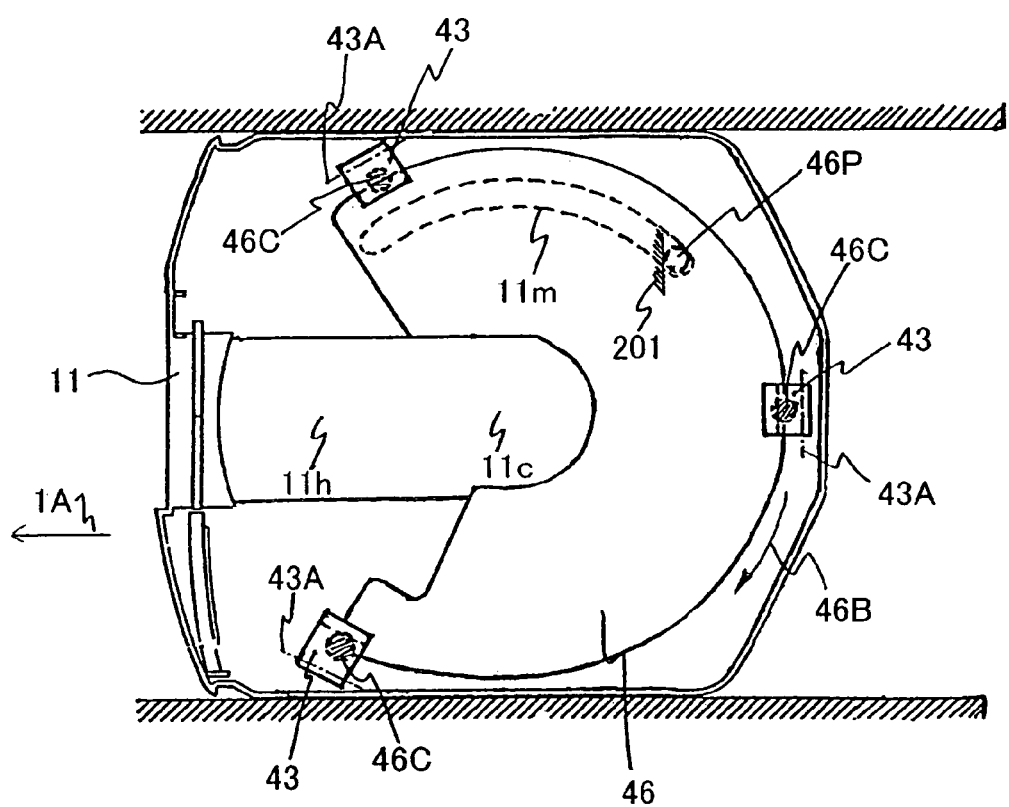
FIG. 20 is a plan view illustrating an overall configuration for the disc cartridge shown in FIG. 19 in a state where its shutter is opened.

Hereinafter, a disc cartridge 306 according to a sixth specific preferred embodiment of the present invention will be described with reference to FIGS. 19 and 20. FIGS. 19 and 20 are plan views illustrating the structure of the disc cartridge 306 of the sixth preferred embodiment from which the upper shell has been removed. Specifically, FIG. 19 illustrates a state where the shutter covers the head opening 11h, while FIG. 20 illustrates a state where the shutter exposes the opening 11h. In FIGS. 19 and 20, each member having substantially the same function as the counterpart of the first or fifth preferred embodiment described above is identified by the same reference numeral.

The disc cartridge 306 of the sixth preferred embodiment is characterized in that the shutter 46 thereof performs the functions of the disc holder/shutter interlocking member 44 and the shutter 21 of the disc cartridge 305 of the fifth preferred embodiment. The shutter 46 is provided over the inner lower surface 11u so as to rotate and slide around the chucking opening 11c of the lower shell 11 as indicated by the arrow 46B in FIGS. 19 and 20. The shutter 46 has a fan shape, or in the shape of a partially notched ring that has an inside diameter equal to the diameter of the chucking opening 11c.

The shutter 46 includes a pin 46p that extends toward the lower shell 11 (i.e., in the direction going into the paper of FIGS. 19 and 20). The lower shell 11 is provided with a guide groove 11m that engages with the pin 46p. When the pin 46p is located at one end of the guide groove 11m, the head opening 11h is closed up by the shutter 46. And when the pin 46p is located at the other end of the guide groove 11m, the head opening 11h is exposed by the shutter 46. The guide groove 11m is provided along a portion of an arc that is concentric with the chuck opening 11c. The guide groove 11m preferably extends approximately in the direction 1A in which the disc cartridge 306 is inserted into a disc drive 200 so that the shutter 46 is opened as the disc cartridge 306 is inserted into the disc drive 200.

Multiple protrusions 46c, which extend outward and upward (i.e., in the direction coming out of the paper of FIGS. 19 and 20), are provided on the outer periphery of the shutter 46. Furthermore, the upper surface of the shutter 46 is covered with a nonwoven fabric or a coating to prevent the signal recording side 100A of the disc 100 from getting scratched or attracting dust.

A number of disc holders 43, having a structure similar to that of the disc holders of the fifth preferred embodiment, are disposed at predetermined intervals on the inner lower surface 11u. The disc holders 43 and the protrusions 46c of the shutter 46 together hold or release the disc synchronously with the movement of the shutter 46 as already described for the fifth preferred embodiment.

When the disc cartridge 306 of the sixth preferred embodiment is inserted into the disc drive 200 in the direction indicated by the arrow 1A in FIG. 19, the pin 46p of the shutter 46 will soon contact with a contact member 201 provided for the disc drive 200. And when the disc cartridge 306 is inserted deeper into the disc drive 200, the pin 46p is pressed by the contact member 201 to start to move along the guide groove 11m. Then, the shutter 46 starts to rotate around the chucking opening 11c of the lower shell 11 to the direction indicated by the arrow 46B in FIG. 19. As the shutter 46 rotates to that direction, the head opening 11b is opened little by little.

As shown in FIG. 20, when the disc cartridge 306 has been fully inserted into the disc drive 200, the pin 46p will reach the other end of the guide groove 11m. As a result, the head opening 11h is completely exposed. At this point in time, as already described for the fifth preferred embodiment, the protrusions 46c on the outer periphery of the shutter 46 are located under the disc holders 43 as shown in FIG. 20. Then, the disc holders 43 are pushed up by the protrusions 46c toward the upper shell 12 (i.e., in the direction coming out of the paper of FIG. 20). As a result, the disc 100 that has been held by the disc holders 43 is released and now freely rotatable.

The disc cartridge 306 of the sixth preferred embodiment needs no disc holder/shutter interlocking member. Thus, compared to the disc cartridge 305 of the fifth preferred embodiment, the disc cartridge 306 can be thinner. Also, if the pin 46p is moved manually along the guide groove 11m, the shutter 46 can be opened and the disc can be released and removed from the disc holders 43.

In the sixth preferred embodiment described above, the shutter 46 is rotated clockwise as viewed from over the upper shell of the cartridge 306. However, the shutter 406 may also be rotated counterclockwise if the guide groove 11m is formed at a different position.

Embodiment 7

Figure 21:
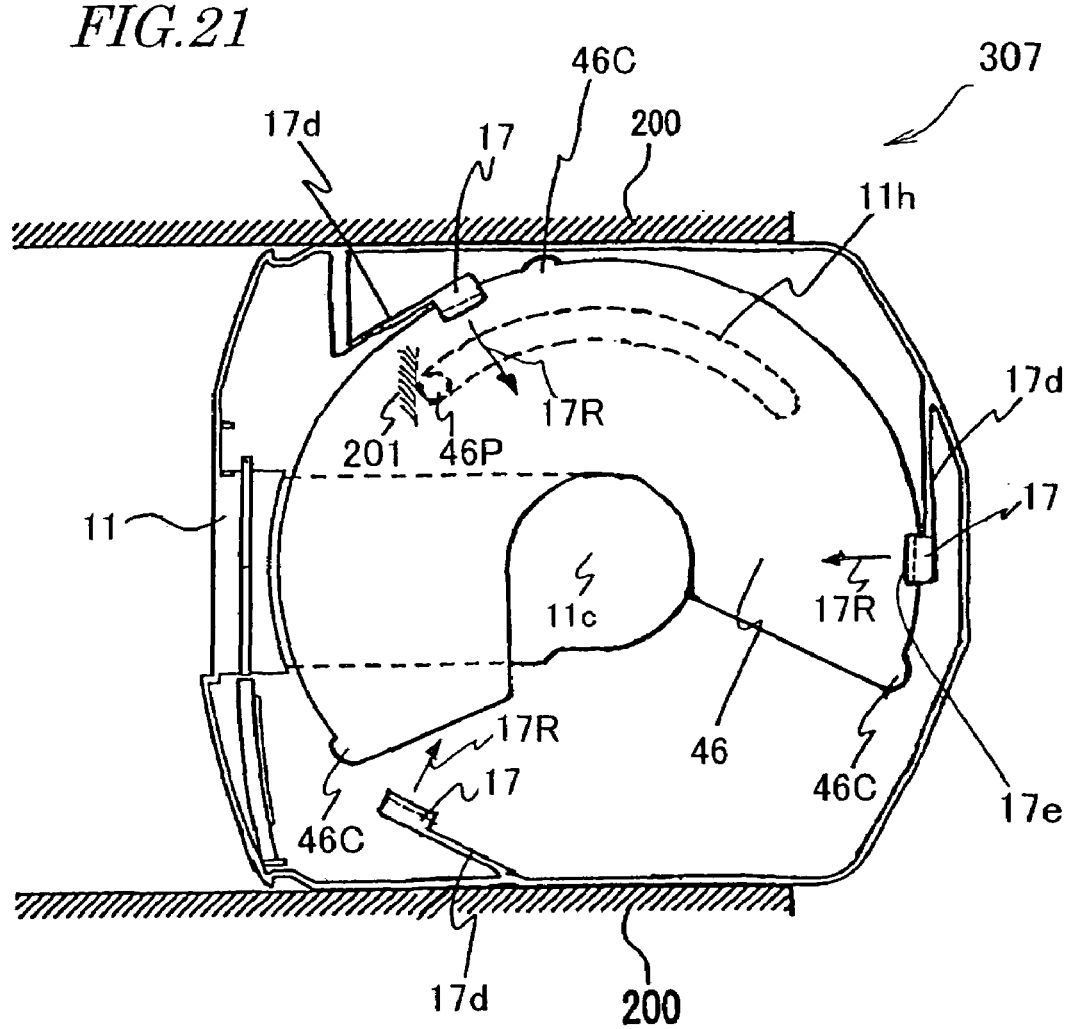
FIG. 21 is a plan view illustrating an overall configuration for a disc cartridge according to a seventh specific preferred embodiment of the present invention in a state where its shutter is closed.
Figure 22:
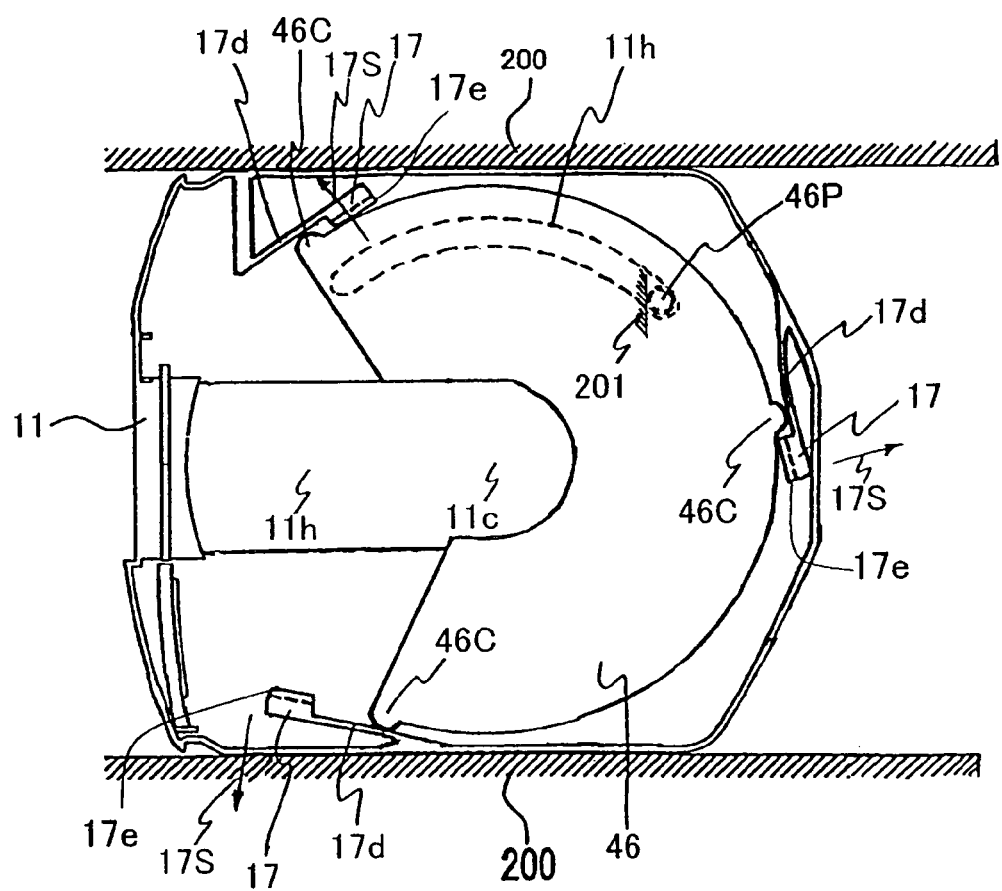
FIG. 22 is a plan view illustrating an overall configuration for the disc cartridge shown in FIG. 21 in a state where its shutter is opened.

Hereinafter, a disc cartridge 307 according to a seventh specific preferred embodiment of the present invention will be described with reference to FIGS. 21 and 22. FIGS. 21 and 22 are plan views illustrating the structure of the disc cartridge 307 of the seventh preferred embodiment from which the upper shell has been removed. Specifically, FIG. 21 illustrates a state where the shutter covers the head opening 11h, while FIG. 22 illustrates a state where the shutter exposes the head opening 11h. In FIGS. 21 and 22, each member having substantially the same function as the counterpart of the third or sixth preferred embodiment described above is identified by the same reference numeral.

The disc cartridge 307 of the seventh preferred embodiment is different from the disc cartridge 306 of the sixth preferred embodiment in the structure of the disc holders. Specifically, as shown in FIGS. 21 and 22, the disc cartridge 307 includes a plurality of disc holders 17. Just like the disc holders of the third preferred embodiment described above, each of these disc holders 17 also includes an elastic portion 17d. While the shutter 46 is going to be closed, the elastic portions 17d apply an elastic force to the disc 100 mounted, thereby holding and pressing the disc 100 toward the center thereof as indicated by the arrows 17R in FIG. 21. In this preferred embodiment, the disc holders 17 form integral parts of the lower shell 11. Alternatively, the disc holders 17 may also be formed separately from the lower shell 11.

When taken in the disc radial direction, each of these disc holders 17 also has a slope that expands over a portion of the projection area of the disc (i.e., the outer periphery of the disc 100) just like the disc holder 43 shown in FIG. 18. Accordingly, if the disc 100 gets held by the disc holders 17 so as to have its outer edge contact with the respective slopes of the disc holders 17, then the disc 100 is pressed against the shutter 46.

The shutter 46 includes a plurality of protrusions 46c on the outer periphery thereof. In this preferred embodiment, the protrusions 46c protrude outward. Also, the protrusions 46c are located at such positions on the outer periphery of the shutter 46 as to contact with the elastic portions 17d of the disc holders 17 when the shutter 46 is opened as shown in FIG. 22.

As shown in FIG. 22, when the shutter 46 is opened, the protrusions 46c dominate the inwardly applied elastic force of the elastic portions 17d, thereby pushing the elastic portions 17d outward as indicated by the arrows 17s. As a result, the disc 100 is released. However, each of the disc holders 17 also includes a rim 17e at the end thereof. Even after the disc 100 has been released, the rim 17e still hangs over a portion of the projection area of the disc 100. Accordingly, even if the disc 100 is released in the disc cartridge 307 that has been loaded into a vertically mounted disc drive 200, the disc 100 will not drop down from the disc cartridge 307.

The disc cartridge 307 of the seventh preferred embodiment achieves all the effects of the sixth preferred embodiment described above. In addition, according to this seventh preferred embodiment, the disc holders 17 may form integral parts of the lower shell 11. Then, the disc cartridge can have a simplified structure and can be formed at a low manufacturing cost.

Embodiment 8

Hereinafter, a disc cartridge 308 according to an eighth specific preferred embodiment of the present invention will be described with reference to the accompanying drawings.

Figure 23:
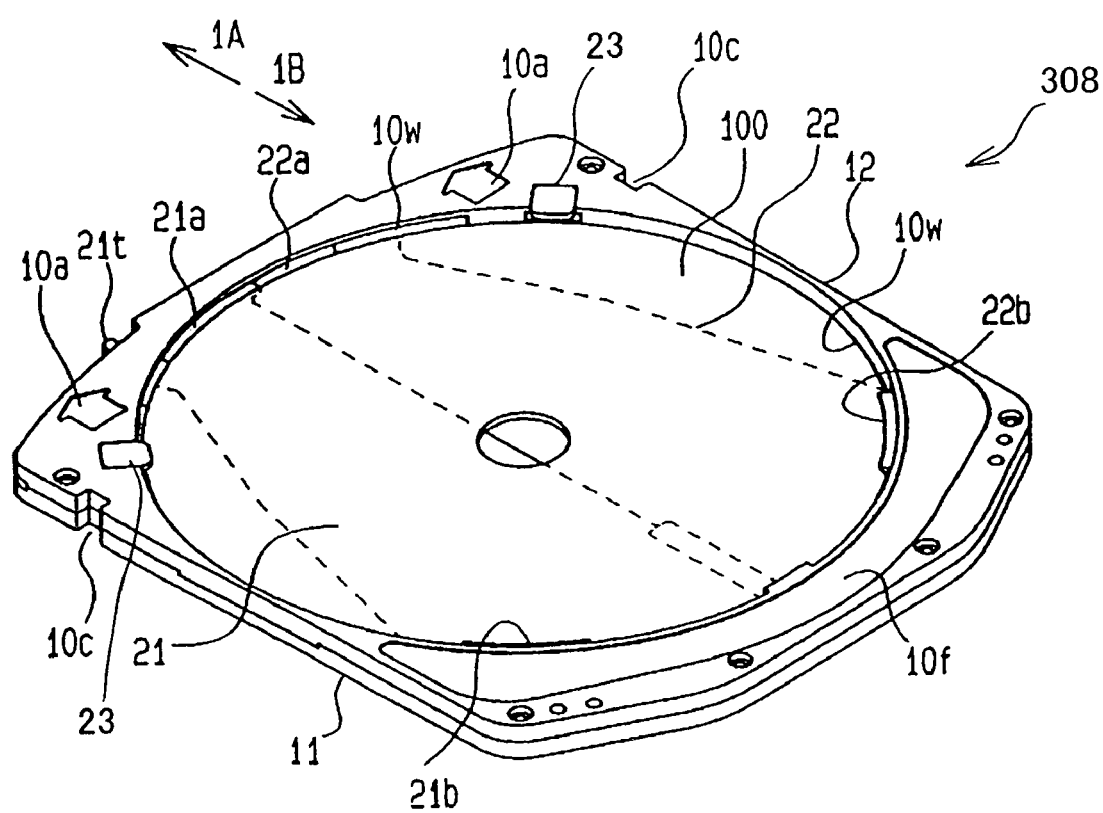
FIG. 23 is a perspective view illustrating an overall configuration for a disc cartridge according to an eighth specific preferred embodiment of the present invention.
Figure 24:
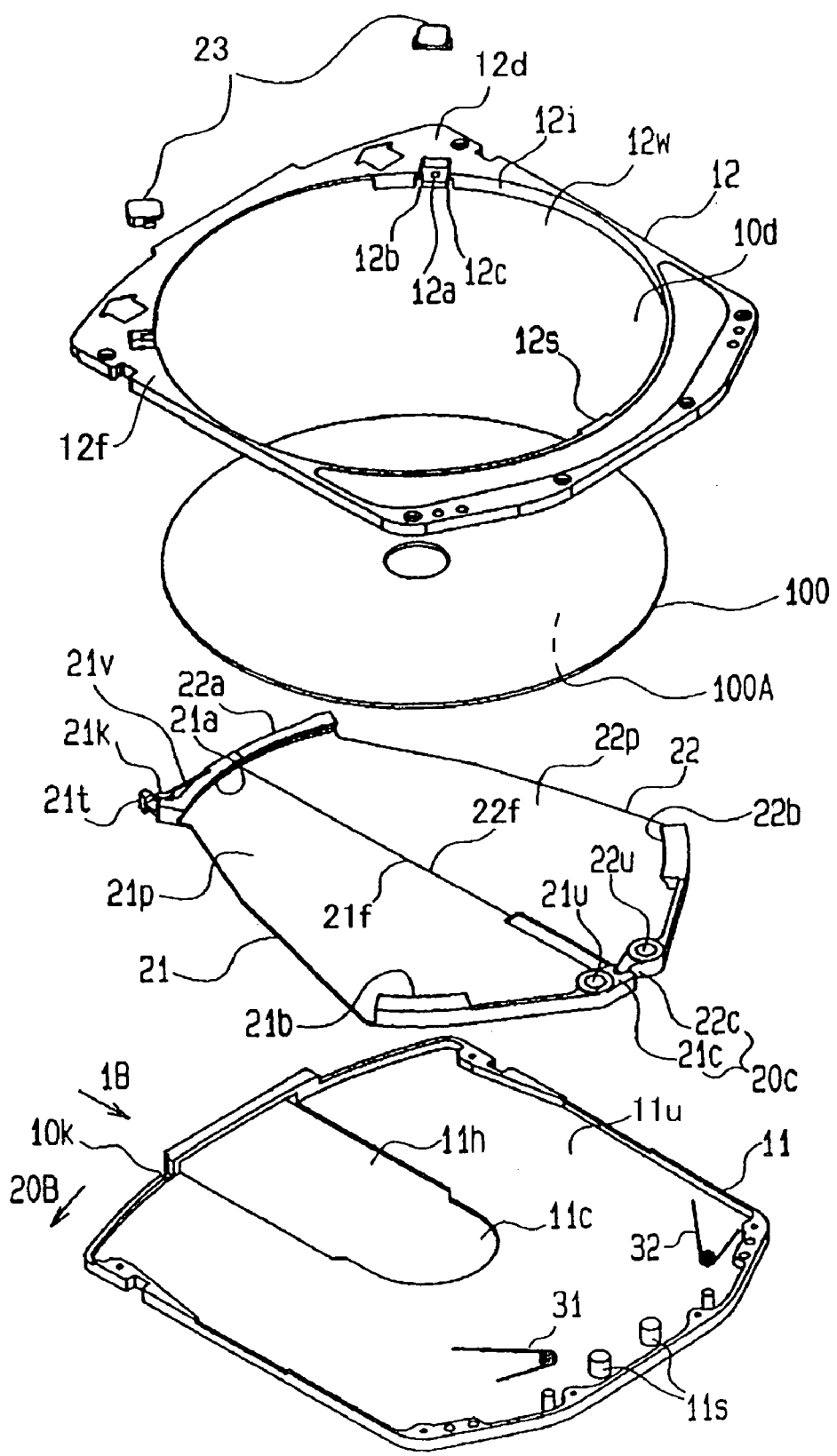
FIG. 24 is an exploded perspective view of the disc cartridge shown in FIG. 23.

First, the structure of the disc cartridge 308 will be outlined with reference to FIGS. 23 and 24. As in the first preferred embodiment described above, the disc 100 shown in FIGS. 23 and 24 also includes first and second sides. The first side of the disc, on which its label, for example, is normally printed, is illustrated in FIG. 23, while the second side thereof, i.e., the signal recording side 100A, is illustrated as the backside in FIG. 24.

As shown in FIGS. 23 and 24, the disc cartridge 308 includes a lower shell 11, an upper shell 12, a pair of shutters 21 and 22 and disc stoppers 23.

As shown in FIG. 24, the lower shell 11 includes a chucking opening 11c and a head opening 11h. The chucking opening 11c allows a chucking member (e.g., a spindle motor for rotating the disc 100) to enter the disc cartridge 308 externally. The head opening 11h allows a head, which reads and/or writes a signal from/on the signal recording side 100A of the disc 100, to enter the disc cartridge 308 and access a target location on the disc 100. The lower shell 11 faces the signal recording side 100A of the disc 100. Also, the head opening 11h reaches a side surface of the lower shell 11.

The upper shell 12 includes a circular disc window 12w, through which the disc 100 can be introduced and removed into/from the disc cartridge 308 and which expands over the entire projection area of the disc 100 to expose the upper side of the disc 100. The upper and lower shells 12 and 11 are adhered or welded together at their outer periphery, thereby forming a cartridge body 10.

A disc storage portion 10d for storing the disc 100 therein is defined by an inner lower surface 11u and an inner side surface 12i of the cartridge body 10. The inner lower surface 11u is opposed to the signal recording side 100A of the disc 100, while the inner side surface 12i has a substantially cylindrical shape and defines the disc window 12w inside. That is to say, the inner lower surface 11u is the bottom of the disc storage portion 10d.

In the disc storage portion 10d, a gap, which is wide enough to allow the disc 100 to rotate freely, is provided between the inner side surface 12i and the outer periphery of the disc 100. Also, the top of the disc storage portion 10d is the disc window 12w so that the disc 100 stored in the disc storage portion 10d has one of its sides exposed inside the disc window 12w.

Two removable disc stoppers 23 are provided for the upper shell 12 so as to partially protrude into the disc window 12w as shown in FIGS. 23 and 24. A third disc stopper 12s is further provided for the upper shell 12 so as to protrude into the disc window 12w. But the third disc stopper 12s forms an integral part of the upper shell 12. These three disc stoppers 23 and 12s are arranged substantially at regular intervals around the circumference of the disc window 12w for the purpose of preventing the disc 100 from dropping down from the disc window 12w. These disc stoppers 23 and 12s are effective particularly when this disc cartridge 308 is loaded into a vertically mounted disc drive.

The shutters 21 and 22 are disposed between the signal recording side 100A of the disc 100 and the inner lower surface 11u of the cartridge body 10. The shutters 21 and 22 include holes 21u and 22u, respectively. These holes 21u and 22u are engaged in a freely rotatable state with shafts 11s, which are located outside of the disc storage portion 10d of the cartridge body 10 and on a deep side of the cartridge body 10 opposite to the head opening 11h thereof. Thus, the shutters 21 and 22 rotate on the shafts 11s in such a manner as to cover or expose the chucking and head openings 11c and 11h.

A cam 21c and a follower 22c are provided near the holes 21u and 22u of the shutters 21 and 22, respectively. The cam 21c and the follower 22c have mutually engaging shapes and together make up an interlocking mechanism 20c for opening and closing the shutters 21 and 22 while interlocking them with each other.

The respective upper surfaces of the shutters 21 and 22, which are opposed to the signal recording side 100A of the disc 100, are covered with protective layers 21p and 22p for the purpose of preventing the signal recording side 100A of the disc 100 from getting scratched or attracting dust.

The protective layers 21p and 22p may be appropriately selected from the group consisting of anti-scratching nonwoven fabric, dustproof nonwoven fabric, anti-scratching coating and dustproof coating. In this preferred embodiment, sheets of a dustproof nonwoven fabric are adhered or ultrasonic welded as the protective layers 21p and 22p to the shutters 21 and 22, respectively.

Shutter springs 31 and 32 are provided outside of the disc storage portion 10d for the shutters 21 and 22, respectively. These springs 31 and 32 apply an elastic force to the shutters 21 and 22 in such a direction as to close the shutters 21 and 22. Optionally, an elastic force may also be applied from any other type of elastic members to the shutters 21 and 22 in that direction.

In the disc cartridge 308 shown in FIG. 24, the shutters 21 and 22 each include two disc holders 21a, 21b and 22a, 22b at both ends thereof. Each of these disc holders 21a, 21b, 22a and 22b has a downwardly tapered cross-sectional shape (or slope) to grip the outer edge of the disc 100 while the shutters 21 and 22 are closed. The structure and operation of the disc holders 21a, 21b, 22a and 22b will be described in further detail later.

As shown in FIG. 23, the upper surface of the cartridge body 10 (or the upper shell 12) has a label plane 10f, on which the user can note down the contents of the disc 100 stored, and embossed arrow marks (or concave portions) 10a that indicate the direction (the arrow 1A) in which this disc cartridge 308 should be inserted into a disc drive. The cartridge body 10 further includes two concave portions 10c on two of its side surfaces that are parallel to the direction 1A in which the disc cartridge 308 is inserted. These concave portions 10c may be engaged with convex portions provided for the disc drive or a disc changer to pull in and load, or position, the disc cartridge 308.

Figure 25:
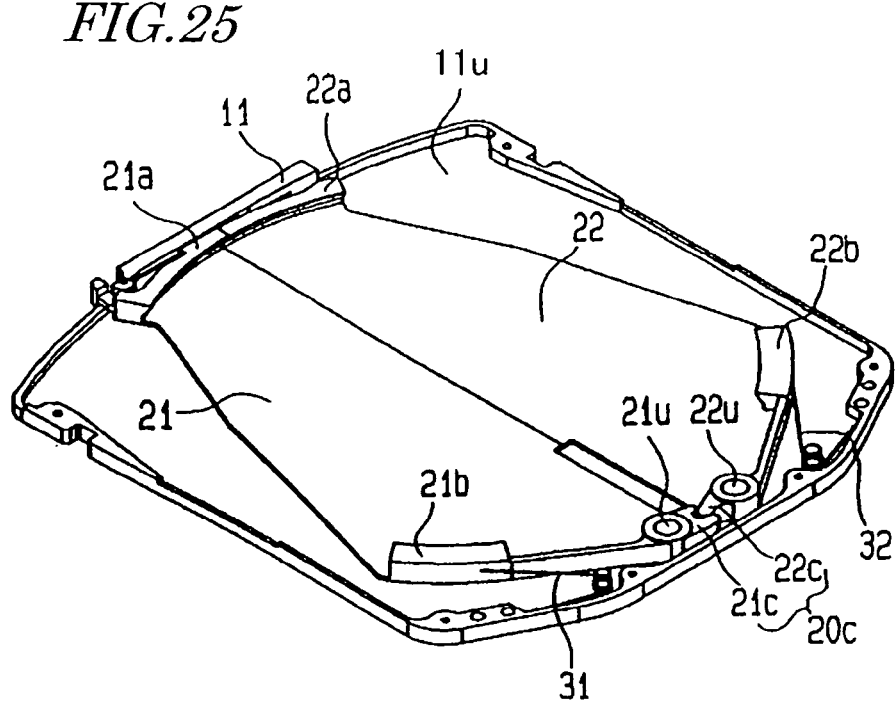
FIG. 25 is a perspective view illustrating the disc cartridge shown in FIG. 23 with its upper shell and the disc removed to show a state where its shutters are closed.

FIG. 25 is a perspective view illustrating the disc cartridge 308 with the upper shell 12 and the disc 100 removed to show a state where the shutters 21 and 22 cover the chucking and head openings 11c and 11h. In FIG. 25, the disc holders 21a, 21b, 22a and 22b of the shutters 21 and 22 are located at such positions as to grip the outer edge of the disc 100 (not shown in FIG. 25).

Figure 26:
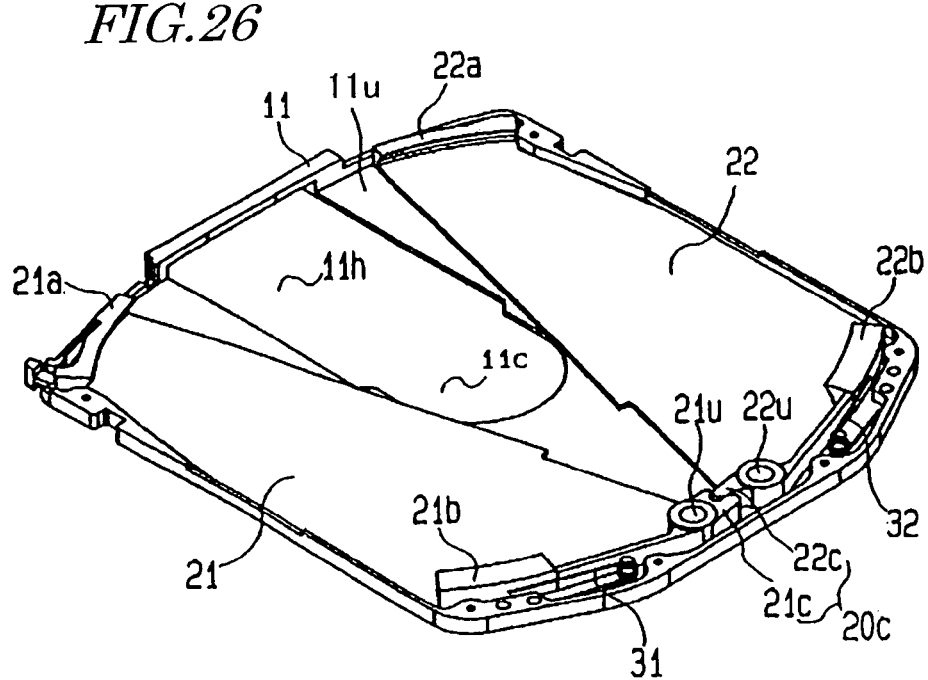
FIG. 26 is a perspective view illustrating the disc cartridge shown in FIG. 23 with its upper shell and the disc removed to show a state where its shutters are opened.

FIG. 26 is a perspective view illustrating the disc cartridge 308 with the upper shell 12 and the disc 100 removed to show a state where the shutters 21 and 22 expose the chucking and head openings 11c and 11h. As a result of the rotation of the shutters 21 and 22 on their holes 21u and 22u, respectively, the chucking and head openings 11c and 11h are now exposed. Also, as the shutters 21 and 22 have rotated, the disc holders 21a, 21b, 22a and 22b have also rotated on the holes 21u and 22u. Consequently, the disc holders 21a, 21b, 22a and 22b are now separated from the outer edge of the disc 100 (not shown in FIG. 26).

Figure 27:
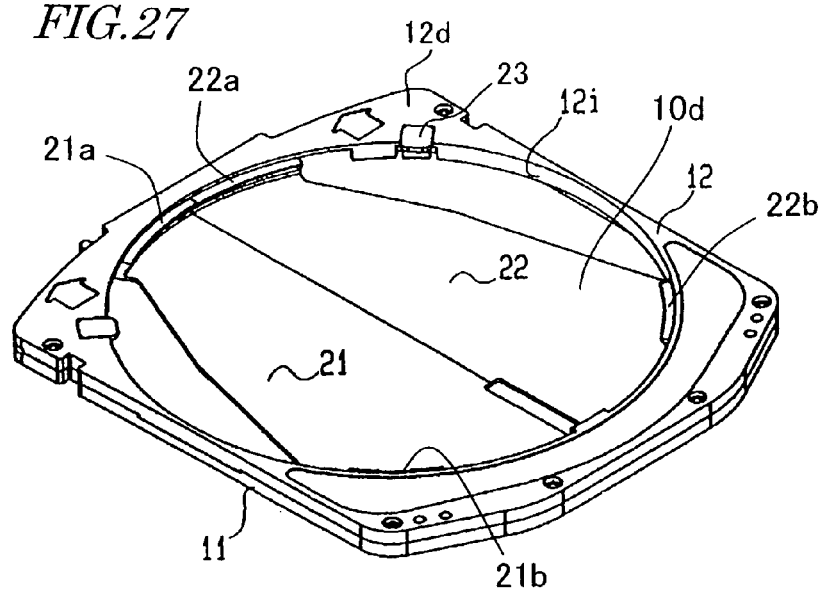
FIG. 27 is a perspective view illustrating the disc cartridge shown in FIG. 23 with the disc removed to show a state where its shutters are closed.
Figure 28:
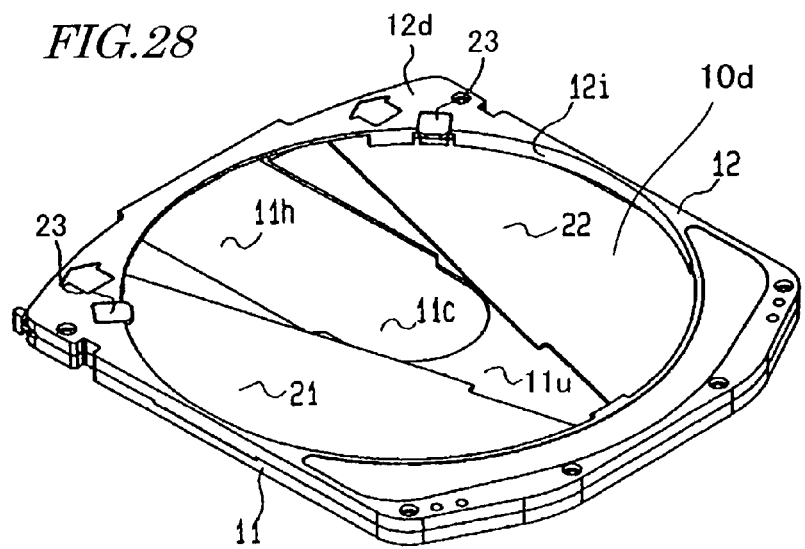
FIG. 28 is a perspective view illustrating the disc cartridge shown in FIG. 23 with the disc removed to show a state where its shutters are opened.

FIG. 27 is a perspective view illustrating the disc cartridge 308, on which the disc 100 has not been mounted yet, to show a state where the shutters 21 and 22 cover the chucking and head openings 11c and 11h. As shown in FIG. 27, the disc holders 21a, 21b, 22a and 22b protrude into the disc storage portion 10d. Thus, when the disc 100 is stored in this disc cartridge 308, the disc 100 is held by these disc holders 21a, 21b, 22a and 22b. On the other hand, FIG. 28 is a perspective view illustrating the disc cartridge 308, on which the disc 100 has not been mounted yet, to show a state where the shutters 21 and 22 expose the chucking and head openings 11c and 11h. As shown in FIG. 28, while the shutters 21 and 22 are opened, the disc holders 21a, 21b, 22a and 22b are stored outside of the disc storage portion 10d of the cartridge body 10.

Figure 29:
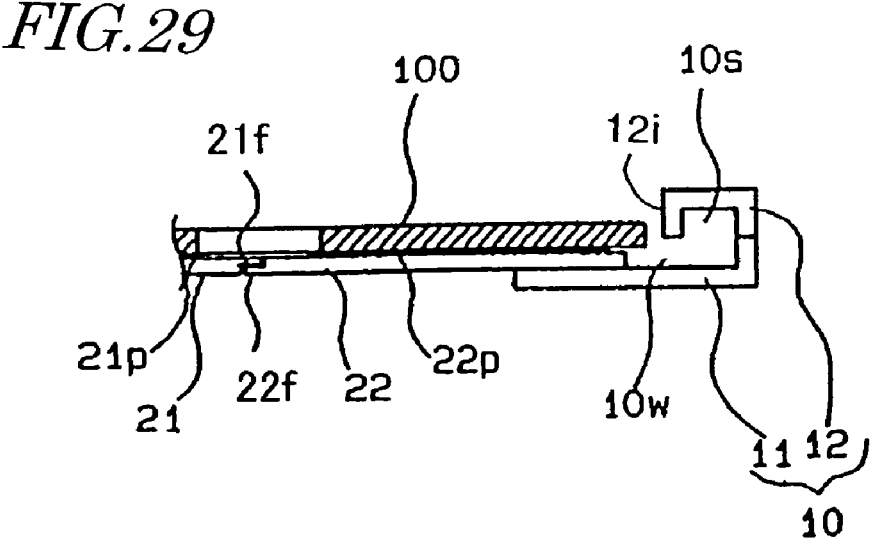
FIG. 29 is a partial cross-sectional view of the disc cartridge shown in FIG. 23, which is viewed along a plane that passes the center of the disc.

Next, the structure and the operation of the shutters 21 and 22 will be described in further detail with reference to FIGS. 29, 30 and 31. FIG. 29 is a partial cross-sectional view of the disc cartridge 308, which is viewed along a plane that passes the center of the disc 100. As shown in FIG. 29, the inner side surface 12i of the cartridge body 10 is provided with a notched portion 10w so as not to interfere with the opening and closing operations of the shutters 21 and 22. Also, the cartridge body 10 further includes shutter storage 10s for storing a portion of the shutters 21 and 22 being opened. Furthermore, at least the edges 21f and 22f of the shutters 21 and 22, which are butted against each other over the chucking and head openings 11c and 11h while the shutters 21 and 22 are closed, overlap with each other vertically (i.e., in the thickness direction of the disc 100) as shown in FIG. 29.

Figure 30:
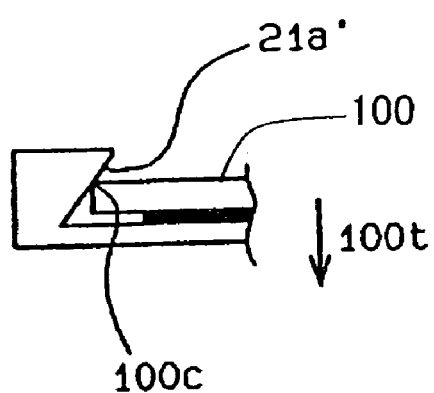
FIG. 30 is a cross-sectional view illustrating a portion of the shutter of the disc cartridge shown in FIG. 23.

On the other hand, as shown in FIG. 30, each of the disc holders 21a, 21b, 22a and 22b includes a slope 21a', 21b', 22a' or 22b', which hangs over the projection area of the disc 100 and overlaps with the outer edge of the disc 100. That is to say, the slope 21a', 21b', 22a' or 22b' has a downwardly tapered cross section and leans toward the disc 100 as shown in FIG. 30. While the chucking and head openings 11c and 11h are covered with the shutters 21 and 22, the slopes 21a', 21b', 22a' and 22b' are allowed to contact with the outer edge 100c of the disc 100, thereby gripping the disc 100 thereon and pressing the disc 100 in the thickness direction 100t. As a result, the sheets 21p and 22p of the shutters 21 and 22 contact with the signal recording side 100A of the disc 100 and the disc 100 is fixed in the cartridge body 10. In such a state, the signal recording side 100A of the disc 100 is in close contact with the sheets 21p and 22p. Thus, no dust will be deposited on the signal recording side 100A.

Also, if the exposed side of the disc 100 is rotated manually or if the shutters 21 and 22 are opened or closed intentionally, then dust, finger marks or any other dirt that has adhered onto the signal recording side 100A of the disc 100 may be wiped away.

Figure 31:
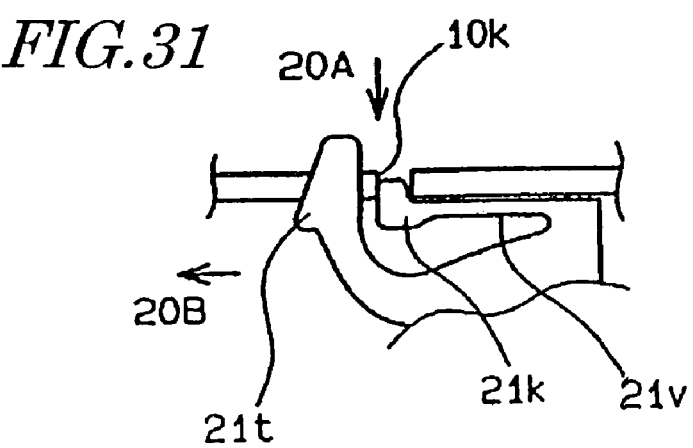
FIG. 31 is a partial plan view illustrating a shutter opener/closer and its surrounding portion of the disc cartridge shown in FIG. 23.

Furthermore, as shown in FIG. 31, the shutter 21 includes a shutter opener/closer 21t, an elastic portion 21v and a locking protrusion 21k. These portions 21t, 21v and 21k form integral parts of the shutter 21. Specifically, the shutter opener/closer 21t is for use to open and close the shutter 21 externally. The locking protrusion 21k is connected to the shutter 21 by way of the elastic portion 21v. While the shutter 21 covers the chucking and head openings 11c and 11b, the locking protrusion 21k, to which an elastic force is being applied from the elastic portion 21v, engages with a locking hole 10k of the cartridge body 10, thereby preventing the shutter 21 from rotating and fixing the shutter 21 to the cartridge body 10 as shown in FIG. 31. When the shutter 21 is fixed, the other shutter 22, which is interlocked with the former shutter 21 via the interlocking mechanism 20c, is also fixed.

Accordingly, only by getting the locking protrusion 21k pressed externally by a protrusion, for example, in the direction indicated by the arrow 20A and disengaged from the locking hole 10k while pressing the opener/closer 21t in the direction indicated by the arrow 20B at the same time, the shutters 21 and 22 can be rotated to expose the chucking and head openings 11c and 11h and the disc 100 can be released from the disc holders 21a, 21b, 22a and 22b. Thus, it is possible to prevent the user from removing the disc 100 accidentally.

Figure 32:
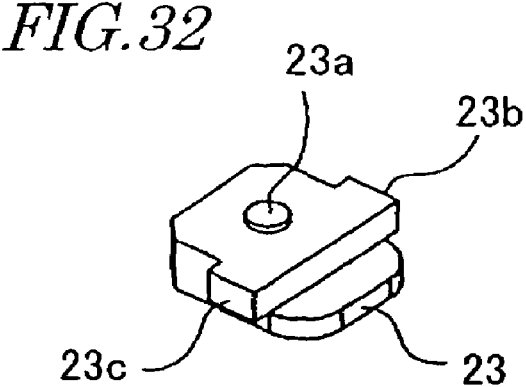
FIG. 32 is a perspective view illustrating a disc stopper of the disc cartridge shown in FIG. 23.

Next, the structure and operation of the disc stoppers 23 will be described in further detail with reference to FIGS. 24 and 32. FIG. 32 is a perspective view illustrating the removable disc stopper 23 upside down. The convex portions 23a, 23b and 23c of the disc stopper 23 are respectively engaged with concave portions 12a, 12b and 12c provided for the upper shell 12 near the disc window 12w thereof as shown in FIG. 24. Thus, if these convex portions 23a, 23b and 23c are disengaged from the concave portions 12a, 12b and 12c, the disc stopper 23 can be removed from the upper shell 12.

Figure 33:
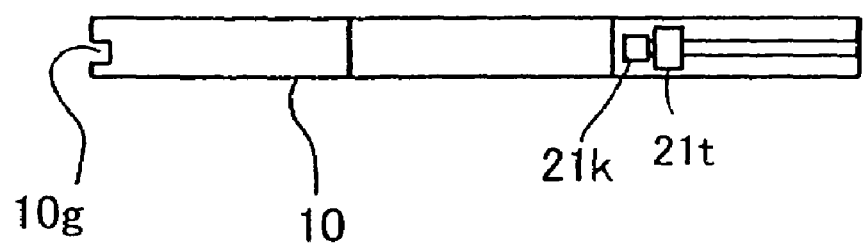
FIG. 33 is a front view illustrating the insertion side of the disc cartridge shown in FIG. 23.

Next, a mechanism for preventing the user from inserting this disc cartridge 308 into a disc drive in the wrong way will be described with reference to FIG. 33. FIG. 33 is a front view illustrating the insertion side of the disc cartridge 308 shown in FIG. 23 as viewed in the direction 1B (see FIG. 23). As shown in FIG. 33, the cartridge body 10 includes a concave portion 10g on one side surface thereof and is asymmetric in the direction 1A in which the disc cartridge 308 is inserted into the disc drive (see FIG. 23). The concave portion 10g is not located at the center of thickness of the cartridge body 10.

By providing such a concave portion 10g for the disc cartridge 308, only when its associated convex portion, provided for the disc drive, is fitted with this concave portion 10g, the disc cartridge 308 can be inserted into the disc drive correctly and the disc drive can operate normally.

Stated otherwise, even if the user tries to insert the disc cartridge 308 into the disc drive upside down by mistake, he or she cannot insert the cartridge 308 into the disc drive. This is because the associated convex portion of the disc drive interferes with the other side surface of the disc cartridge 308 with no concave portion 10g. Also, even if the user tries to insert the disc cartridge 308 into the disc drive upside down and in the wrong way by mistake, he or she cannot insert the cartridge 308 into the disc drive, either. This is because the convex portion of the disc drive also interferes with the non-recessed portion of the side surface with the concave portion 10g. Thus, it is possible to prevent the user from inserting the disc cartridge 308 erroneously.

The disc cartridge 308 of the eighth preferred embodiment described above may be modified in various manners.

For example, the thickness of the cartridge body 10 may be further reduced to such an extent that the disc stoppers 23 will not protrude from the upper surface 12f of the upper shell 12 (see FIG. 24) while the shutters 21 and 22 are closed. In that case, while the shutters 21 and 22 are going to be opened, the disc holders 21a and 22a may push the respective convex portions 23a of the disc stoppers 23 upward from under the disc stoppers 23, thereby protruding the disc stoppers 23 from the upper surface 12f of the upper shell 12. According to such a structure, a sufficiently broad space can be allowed the disc 100 to rotate inside the disc storage portion 10d and yet the disc cartridge 308 can have its thickness further reduced.

Also, the disc stoppers 23 may form integral parts of the cartridge body 10. In that case, the disc stoppers 23 should be able to be bent almost perpendicularly so that the disc 100 mounted can be removed.

Furthermore, the shutter springs 31 and 32 may apply an elastic force in such a direction as to open the shutters 21 and 22. If the shutters 21 and 22 can operate almost completely synchronously by way of the interlocking mechanism, one of the shutter springs 31 and 32 may be omitted.

In the preferred embodiment described above, the locking protrusion 21k forms an integral part of the shutter 21. Alternatively, a locking lever, including a locking protrusion and a convex portion at the end thereof, may be connected to the cartridge body 10 via an elastic portion, and an associated concave portion may be provided for the shutter so that the convex and concave portions engage with each other. In that case, by pressing the locking protrusion through a locking hole of the cartridge body, these convex and concave portions may be disengaged from each other so as to allow the shutters to rotate freely. Optionally, in that alternative preferred embodiment, the locking lever, as well as the shutter springs (i.e., elastic members), may be resin springs that form integral parts of the cartridge body 10.

Embodiment 9

Hereinafter, a disc cartridge 309 according to a ninth specific preferred embodiment of the present invention will be described with reference to the accompanying drawings.

Figure 34:
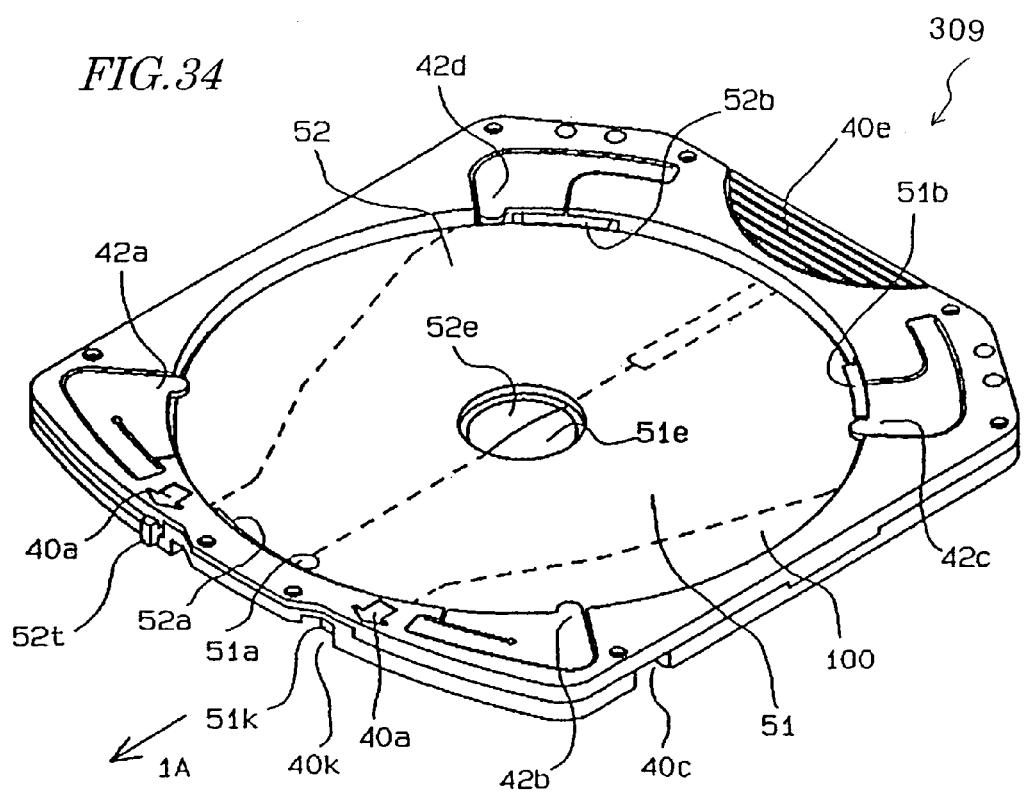
FIG. 34 is a perspective view illustrating an overall configuration for a disc cartridge according to a ninth specific preferred embodiment of the present invention.
Figure 35:
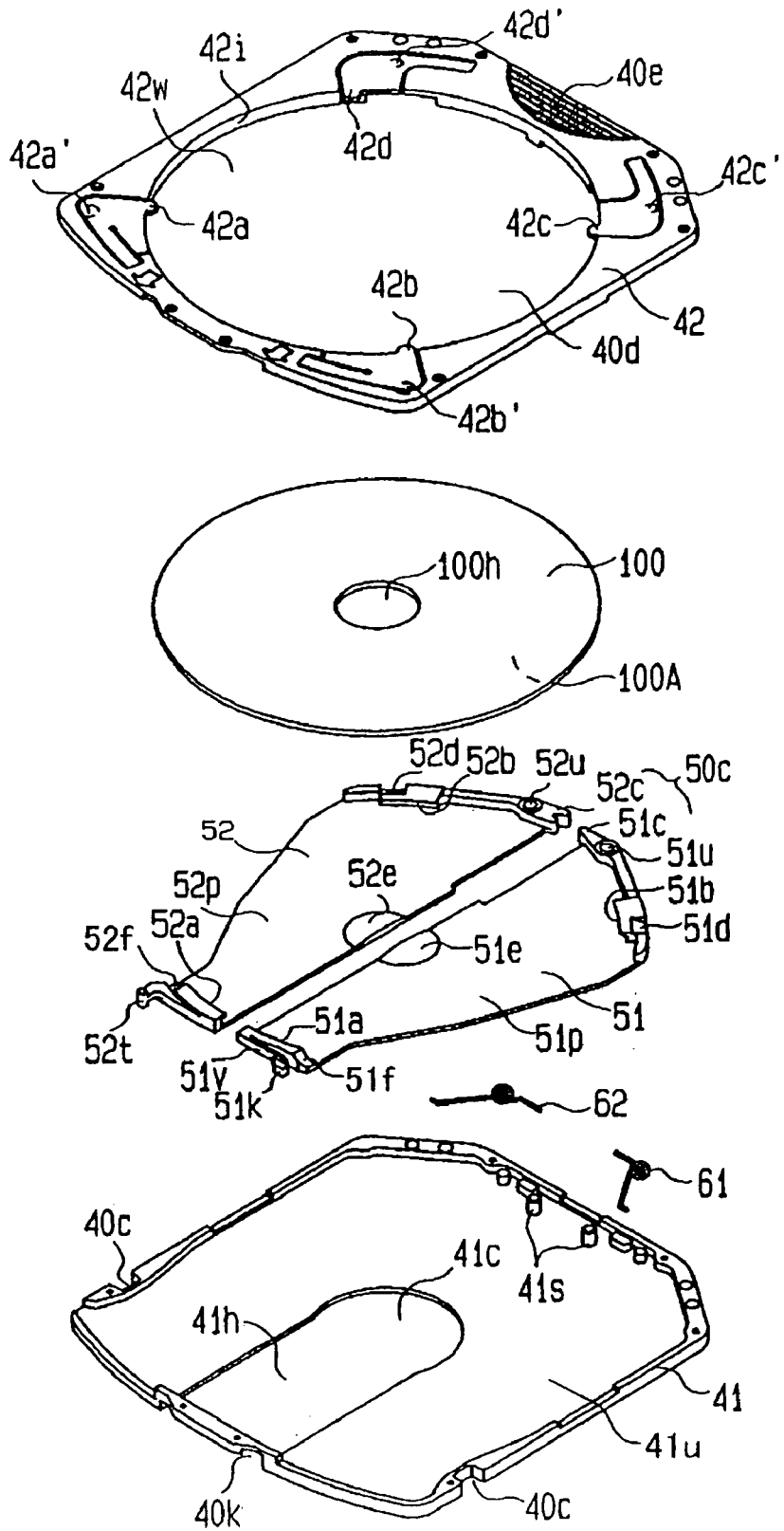
FIG. 35 is an exploded perspective view of the disc cartridge shown in FIG. 34.

As shown in FIGS. 34 and 35, the disc cartridge 309 includes a lower shell 41, an upper shell 42, disc stoppers 42a, 42b, 42c and 42d, and a pair of shutters 51 and 52.

As shown in FIG. 35, the lower shell 41 includes a chucking opening 41c and a head opening 41h. The chucking opening 41c allows a chucking member (e.g., a spindle motor for rotating the disc 100) to enter the disc cartridge 309 externally The head opening 41h allows a head, which reads and/or writes a signal from/on the signal recording side 100A of the disc 100, to enter the disc cartridge 309 and access a target location on the disc 100. The lower shell 41 faces the signal recording side 100A of the disc 100. Also, the head opening 41h reaches one side surface of the lower shell 41.

The upper shell 42 includes a circular disc window 42w, through which the disc 100 can be introduced and removed into/from the disc cartridge 309 and which expands over the entire projection area of the disc 100 to expose the upper side of the disc 100. The upper and lower shells 42 and 41 are adhered or welded together at their outer periphery, thereby forming a cartridge body 40.

A disc storage portion 40d for storing the disc 100 therein is defined by a first inner surface 41u and a second inner surface 42i of the cartridge body 40. The first inner surface 41u is opposed to the signal recording side 100A of the disc 100, while the second inner surface 42i has a substantially cylindrical shape and defines the disc window 42w inside. That is to say, the first inner surface 41u is the bottom of the disc storage portion 40d.

In the disc storage portion 40d, a gap, which is wide enough to allow the disc 100 to rotate freely, is provided between the second inner surface 42i and the outer periphery of the disc 100. Also, the top of the disc storage portion 40d is the disc window 42w so that the disc 100 stored in the disc storage portion 40d has one of its sides exposed inside the disc window 42w.

The disc stoppers 42a, 42b, 42c and 42d form integral parts of the upper shell 42 so as to partially protrude into the disc window 42w. Each of these disc stoppers 42a, 42b, 42c and 42d is separated from the upper shell 42 via a slit. These disc stoppers 42a, 42b, 42c and 42d are used to prevent the disc 100 from dropping down from the disc window 42w. The disc stoppers 42a, 42b, 42c and 42d are effective particularly when this disc cartridge 309 is loaded into a vertically mounted disc drive. Optionally, these disc stoppers 42a, 42b, 42c and 42d may be integrated with the upper shell 42 by way of elastic members.

The shutters 51 and 52 are disposed between the signal recording side 100A of the disc 100 and the first inner surface 41u of the cartridge body 40. The shutters 51 and 52 include holes 51u and 52u, respectively. These holes 51u and 52u are engaged in a freely rotatable state with shafts 41s, which are located outside of the disc storage portion 40d of the cartridge body 40 and on a deep side of the cartridge body 40 opposite to the head opening 41h thereof. Thus, the shutters 51 and 52 rotate on the shafts 41s in such a manner as to cover or expose the chucking and head openings 41c and 41h.

A cam 51c and a follower 52c are provided near the holes 51u and 52u of the shutters 51 and 52, respectively. The cam 51c and the follower 52c have mutually engaging shapes and together make up an interlocking mechanism 50c for opening and closing the shutters 51 and 52 while interlocking them with each other.

The respective upper surfaces of the shutters 51 and 52, which are opposed to the signal recording side 100A of the disc 100, are covered with protective layers 51p and 52p for the purpose of preventing the signal recording side 100A of the disc 100 from getting scratched or attracting dust.

The protective layers 51p and 52p may be appropriately selected from the group consisting of anti-scratching nonwoven fabric, dustproof nonwoven fabric, anti-scratching coating and dustproof coating. In this preferred embodiment, sheets of a dustproof nonwoven fabric are adhered or ultrasonic welded as the protective layers 51p and 52p to the shutters 51 and 52, respectively.

Shutter springs 61 and 62 are provided outside of the disc storage portion 40d for the shutters 51 and 52, respectively. These springs 61 and 62 apply an elastic force to the shutters 51 and 52 in such a direction as to close the shutters 51 and 52. Alternatively, the shutter springs 61 and 62 may apply an elastic force to the shutters 51 and 52 in such a direction as to open the shutters 51 and 52. Also, if the shutters 51 and 52 can operate almost completely synchronously by way of the interlocking mechanism, one of the shutter springs 61 and 62 may be omitted.

As in the eighth preferred embodiment described above, the shutters 51 and 52 each include two disc holders 51a, 51b and 52a, 52b at both ends thereof as shown in FIG. 35. Furthermore, as will be described in detail later, convex portions 51e and 52e are formed on the shutters 51 and 52, respectively, so as to be located under the center hole of the disc 100 while the shutters 51 and 52 are closed.

As shown in FIG. 34, the upper surface of the cartridge body 40 (or the upper shell 42) has embossed arrow marks (or concave portions) 40a that indicate the direction (the arrow 1A) in which this disc cartridge 309 should be inserted into a disc drive. The cartridge body 40 further includes two concave portions 40c on two of its side surfaces that are parallel to the direction 1A in which the disc cartridge 309 is inserted into the disc drive. These concave portions 40c may be engaged with convex portions provided for the disc drive or a disc changer to pull in and load, or position, the disc cartridge 309. Optionally, only one of the side surfaces of the disc cartridge 309 may include the concave portion 40c. In that case, the concave portion 40c can contribute to preventing the user from inserting or loading this disc cartridge 309 into the disc drive upside down by mistake. The upper surface of the cartridge body 40 further includes a grip 40e that allows the user to grip this disc cartridge 309. This grip 40e has an antislip embossed shape.

Figure 36:
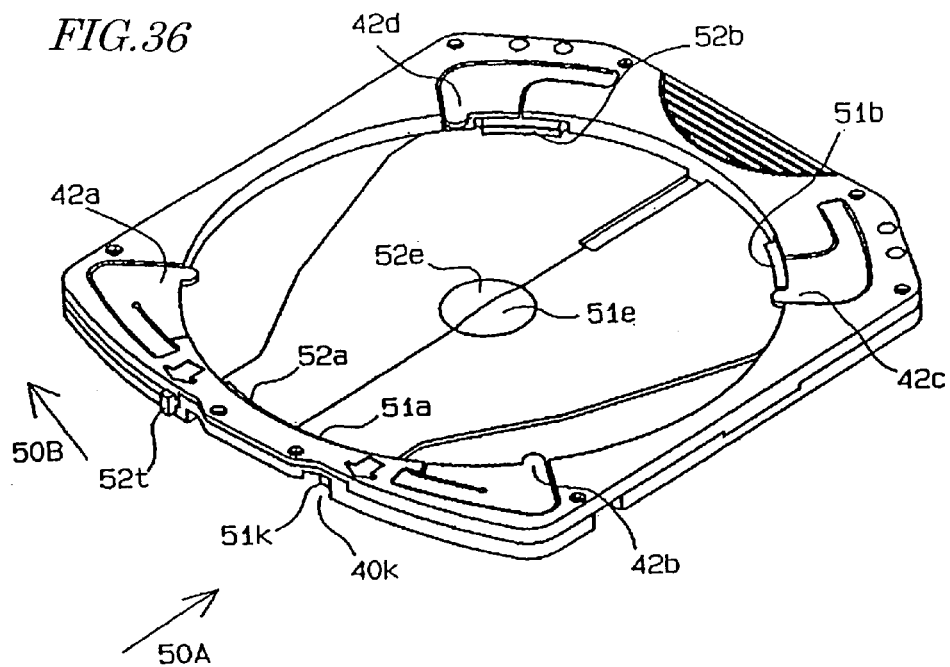
FIG. 36 is a perspective view illustrating the disc cartridge shown in FIG. 34 with the disc removed to show a state where its shutters are closed.
Figure 37:
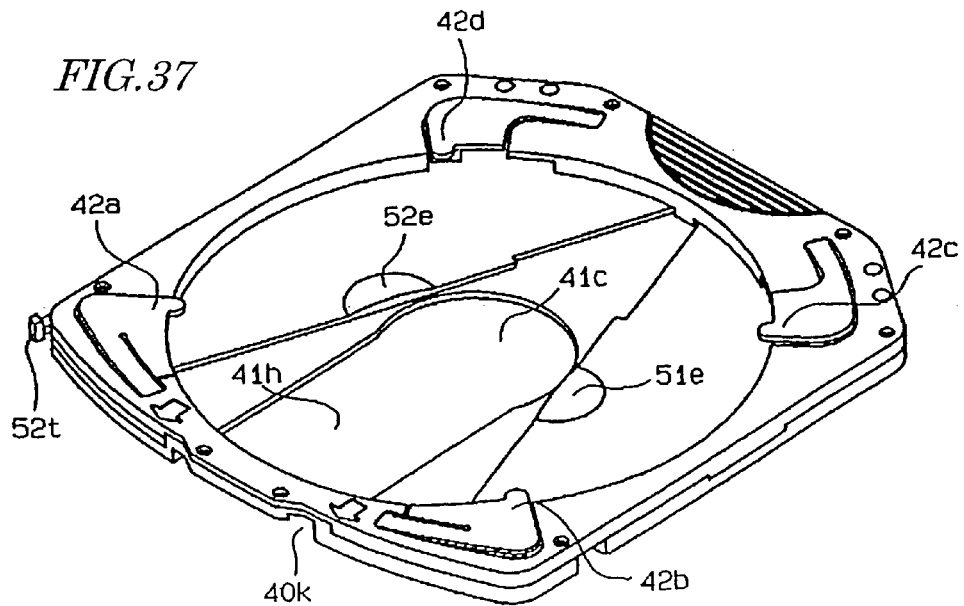
FIG. 37 is a perspective view illustrating the disc cartridge shown in FIG. 34 with the disc removed to show a state where its shutters are opened.

FIG. 36 is a perspective view illustrating the disc cartridge 309, in which no disc 100 has been stored yet, to show a state where the shutters 51 and 52 cover the chucking and head openings 41c and 41h. FIG. 37 is a perspective view illustrating the disc cartridge 309, in which no disc 100 has been stored yet, to show a state where the shutters 51 and 52 expose the chucking and head openings 41c and 41h.

Hereinafter, the structure and the operation of the shutters 51 and 52 will be described in further detail. As shown in FIGS. 34 and 35, the disc holders 51a, 51b, 52a and 52b of the shutters 51 and 52 also have such a cross-sectional shape as including a slope that hangs over the projection area of the disc 100 and overlaps with the outer edge of the disc 100 as in the eighth preferred embodiment. That is to say, the slope is downwardly tapered and leans toward the disc 100. Thus, the effects of the eighth preferred embodiment described above are also achieved by this ninth preferred embodiment.

Also, the shutter 52 includes an opener/closer 52t for use to open and close the shutter 52 externally, while the shutter 51 includes an elastic portion 51v and a locking protrusion 51k as integral parts thereof. The locking protrusion 51k is connected to the shutter 51 by way of the elastic portion 51v as shown in FIG. 35. Thus, while the chucking and head openings 41c and 41h are covered with the shutters 51 and 52, the locking protrusion 51k, to which an elastic force is applied from the elastic portion 51v, engages with a locking hole 40k of the cartridge body 40 (or the lower shell 41), thereby fixing the shutter 51 in a non-rotatable state to the cartridge body 40. When the shutter 51 is fixed in this way, the other shutter 52, which is interlocked with the shutter 51 via the interlocking mechanism 50c, is also fixed.

Accordingly, only by getting the locking protrusion 51k pressed externally by a protrusion, for example, in the direction indicated by the arrow 50A and disengaged from the locking hole 40k while pressing the opener/closer 52t in the direction indicated by the arrow 50B at the same time as shown in FIG. 36, the shutters 51 and 52 can be rotated to expose the chucking and head openings 41c and 41h and the disc 100 can be released from the disc holders 51a, 51b, 52a and 52b. Thus, it is possible to prevent the user from removing the disc 100 accidentally.

Unlike the eighth preferred embodiment described above, the locking protrusion 51k and the opener/closer 52t are provided in this preferred embodiment for the two different shutters 51 and 52. Such a structure is particularly effective for a disc cartridge for a disc of a small size. This is because a disc cartridge for a disc of a small size and the shutters thereof should have relatively small sizes and it is normally difficult to provide the locking protrusion and opener/closer for a single shutter out of design considerations. Also, even when a single shutter can include both the locking protrusion and the opener/closer, a very narrow gap would be allowed between a shutter opening/closing mechanism and an unlocking mechanism on the disc drive side or these two mechanisms need to be formed within a very limited space, thus making it hard to design the disc drive as intended.

In the preferred embodiment described above, the locking protrusion 51k forms an integral part of the shutter 51. Alternatively, a locking lever, including a locking protrusion and a convex portion at the end thereof, may be connected to the cartridge body 40 by way of an elastic portion, and an associated concave portion may be provided for the shutter so that the convex and concave portions engage with each other. In that case, by pressing the locking protrusion through a locking hole of the cartridge body, these convex and concave portions may be disengaged from each other so as to allow the shutters to rotate freely. Optionally, in that alternative preferred embodiment, the locking lever, as well as the shutter springs (i.e., elastic members), may be resin springs that form integral parts of the cartridge body 40.

Figure 38:
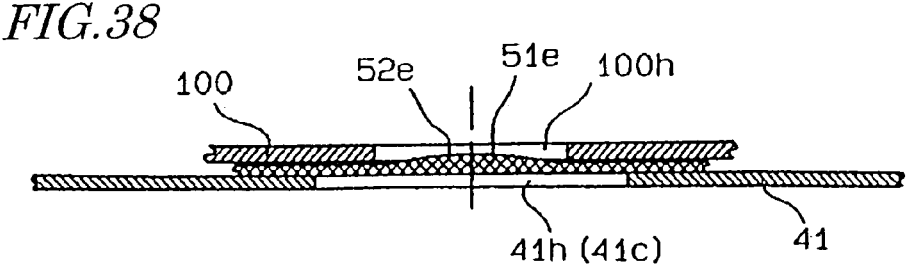
FIG. 38 is a partial cross-sectional view of the disc cartridge shown in FIG. 34, which is viewed along a plane that passes the center of the disc to show a state where its shutters are closed.

Next, it will be described how the convex portions 51e and 52e on the shutters 51 and 52 work. FIG. 38 is a partial cross-sectional view of the disc cartridge 309, which is viewed along a plane that passes the center of the disc 100. As shown in FIG. 38, while the shutters 51 and 52 are closed, the convex portions 51e and 52e protrude into the center hole 100h of the disc 100 and the disc 100 is now in contact with the shutters 51 and 52.

Figure 39:
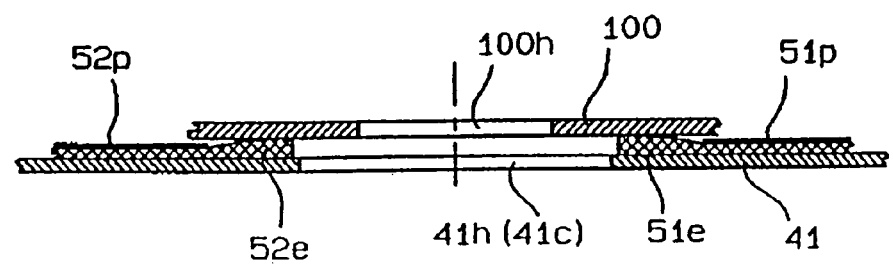
FIG. 39 is a partial cross-sectional view of the disc cartridge shown in FIG. 34, which is viewed along a plane that passes the center of the disc to show a state where its shutters are opened.

As shown in FIG. 39, while the shutters 51 and 52 are going to be opened, the convex portions 51e and 52e slide from inside the center hole 100h into under the lower side of the disc 100, thereby lifting the disc 100 up from the shutters 51 and 52. In this manner, while the shutters 51 and 52 are going to be opened or closed, the signal recording side 100A of the disc 100 will not get scratched by the shutters 51 and 52. Also, it is inside the signal recording area of the signal recording side 100A that the convex portions 51e and 52e move along with the shutters 51 and 52 being opened or closed. Accordingly, the convex portions 51e and 52e will not contact with, or scratch, the signal recording area.

Figure 40:
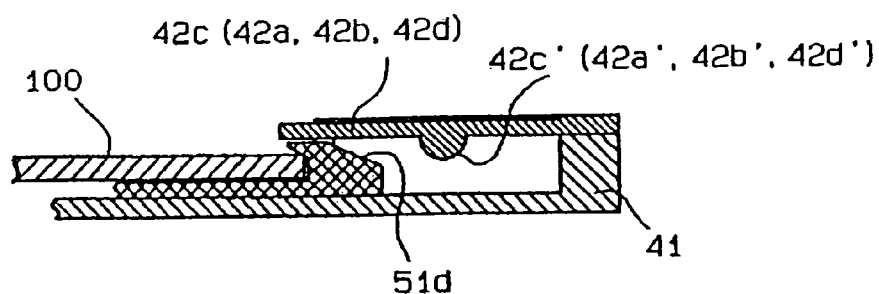
FIG. 40 is a partial cross-sectional view illustrating a portion of the disc cartridge shown in FIG. 34 around the disc outer periphery, which is viewed along a plane passing the center of the disc to show a state where its shutters are closed.

Next, the structure and operation of the disc stoppers will be described with reference to FIGS. 40 and 41. FIG. 40 is a partial cross-sectional view illustrating a portion of the disc cartridge 309 around the disc outer periphery, and is viewed along a plane that passes the center of the disc 100. As shown in FIG. 40, a convex portion 42a', 42b', 42c' or 42d' has been formed on the bottom of the disc stopper 42a, 42b, 42c or 42d. While the shutters 51 and 52 are closed, the disc stopper 42a, 42b, 42c or 42d is substantially parallel to the surface of the disc 100 and falls within the thickness of the cartridge 309 as shown in FIG. 40. An appearance of the disc cartridge 309 in such a state is illustrated in FIG. 36.

Figure 41:
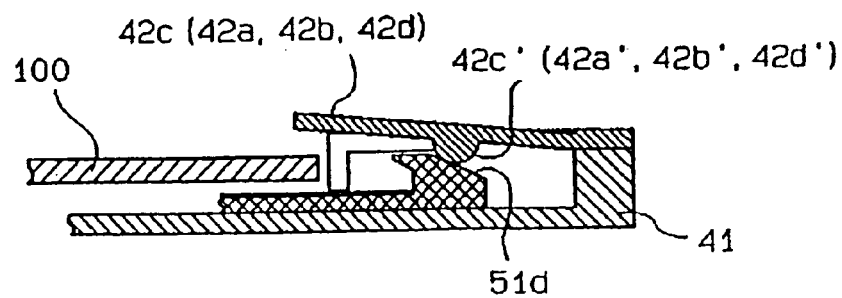
FIG. 41 is a partial cross-sectional view illustrating a portion of the disc cartridge shown in FIG. 34 around the disc outer periphery, which is viewed along a plane passing the center of the disc to show a state where its shutters are opened.

On the other hand, while the shutters 51 and 52 are opened, the slopes 52f, 51f, 51d and 52d of the shutters 51 and 52 contact with the convex portions 42a', 42b', 42c' and or 42d', respectively, thereby lifting the disc stoppers 42a, 42b, 42c and 42d to above the disc 100 as shown in FIG. 41. An appearance of the disc cartridge 309 in such a state is illustrated in FIG. 37. By using such a structure, particularly in an interval after the disc cartridge 309 has been vertically loaded into a disc drive and before the disc 100 is chucked, it is possible to prevent the disc 100 from dropping down from the cartridge 309. In addition, while the disc 100 is being chucked, the disc 100 can move in a broader space. Furthermore, this structure can also contribute to further reducing the thickness of the cartridge.

It should be noted that to keep the shutters 51 and 52 temporarily opened for a while, the slopes 52f, 51f, 51d and 52d may have convex or concave portions that engage with the convex portions 42a', 42b', 42c' and 42d'.

Embodiment 10

Hereinafter, a disc cartridge 310 according to a tenth specific preferred embodiment of the present invention will be described with reference to the accompanying drawings. The disc cartridge 310 of this preferred embodiment is mainly characterized in that disc stoppers are provided for the shutters.

Figure 42:
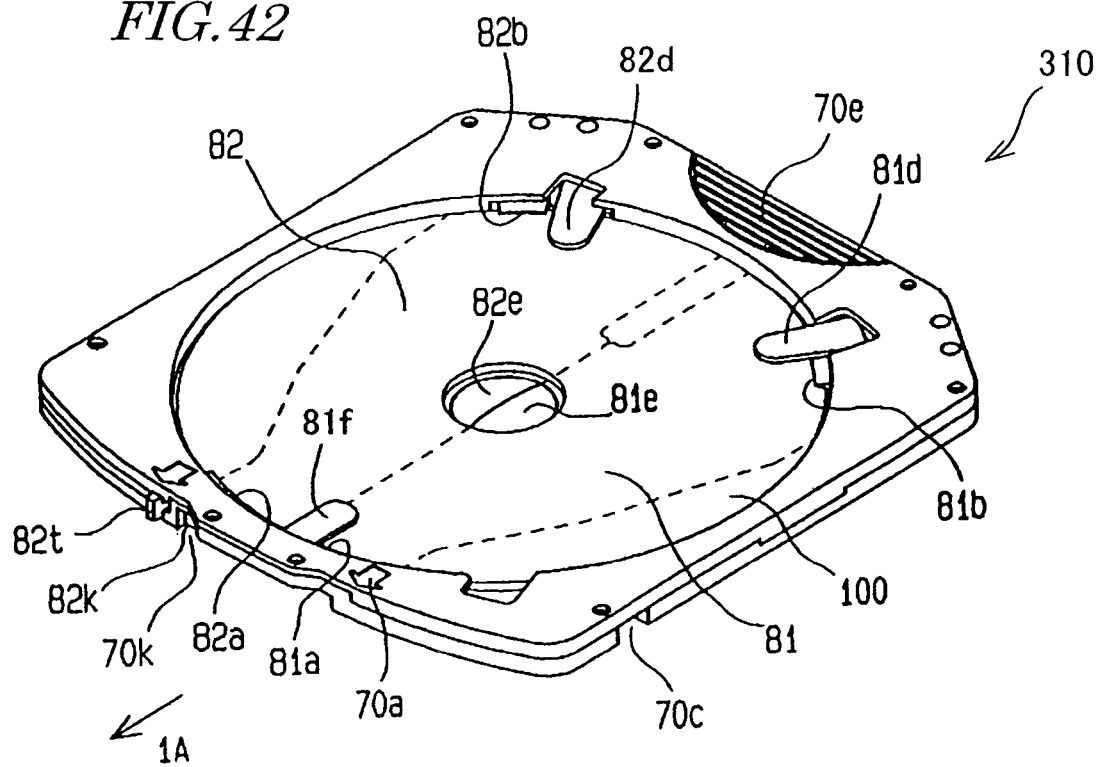
FIG. 42 is a perspective view illustrating an overall configuration for a disc cartridge according to a tenth specific preferred embodiment of the present invention.
Figure 43:
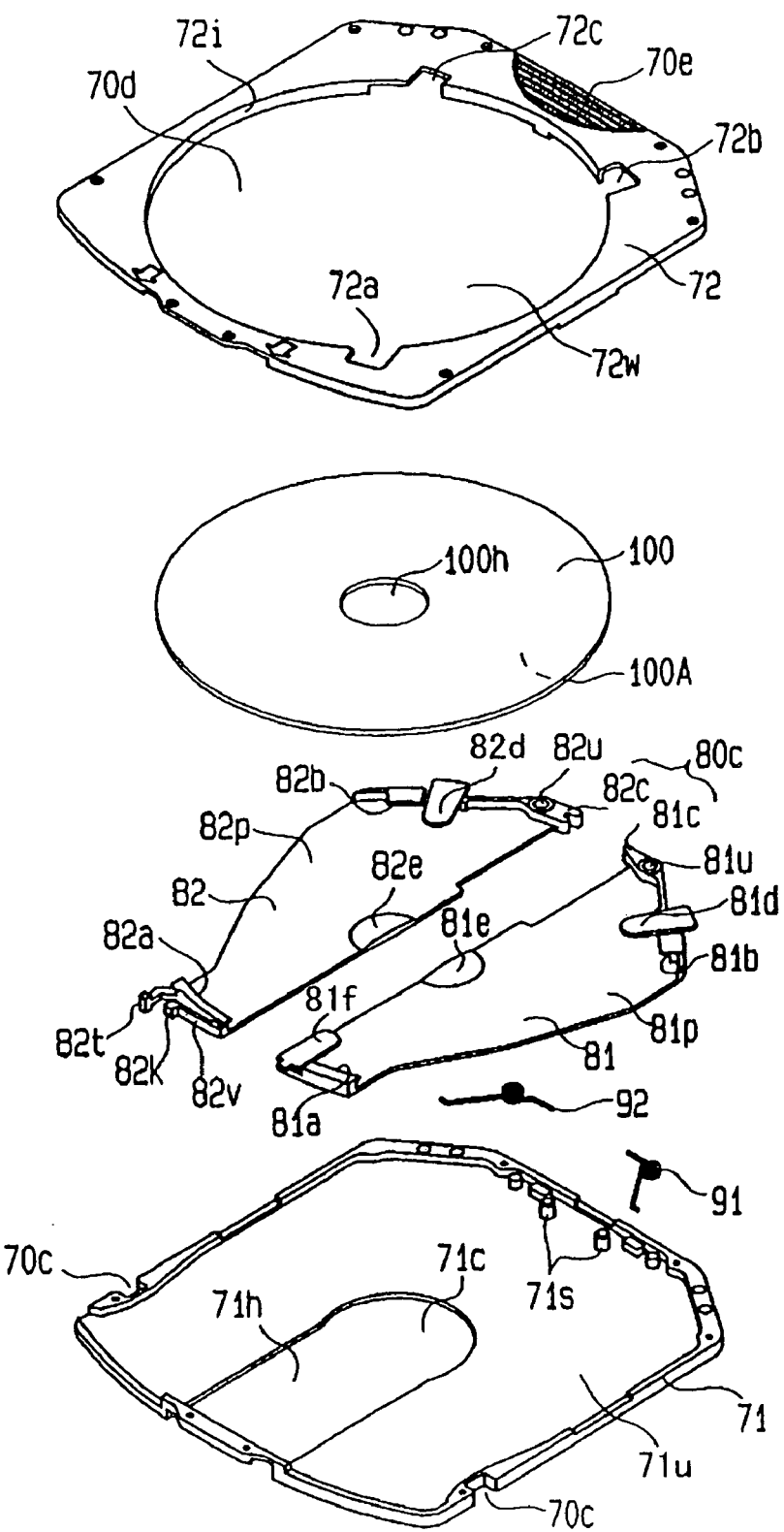
FIG. 43 is an exploded perspective view of the disc cartridge shown in FIG. 42.

As shown in FIGS. 42 and 43, the disc cartridge 310 includes a lower shell 71, an upper shell 72, disc stoppers 81d, 81f, and 82d, and a pair of shutters 81 and 82.

As shown in FIG. 43, the lower shell 71 includes a chucking opening 71c and a head opening 71h. The chucking opening 71c allows a chucking member (e.g., a spindle motor for rotating the disc 100) to enter the disc cartridge 310 externally. The head opening 71h allows a head, which reads and/or writes a signal from/on the signal recording side 100A of the disc 100, to enter the disc cartridge 310 and access a target location on the disc 100. The lower shell 71 faces the signal recording side 100A of the disc 100. Also, the head opening 71h reaches one side surface of the lower shell 71.

The upper shell 72 includes a circular disc window 72w, through which the disc 100 can be introduced and removed into/from the disc cartridge 310 and which expands over the entire projection area of the disc 100 to expose the upper side of the disc 100. The upper and lower shells 72 and 71 are adhered or welded together at their outer periphery, thereby forming a cartridge body 70.

A disc storage portion 70d for storing the disc 100 therein is defined by a first inner surface 71u and a second inner surface 72i of the cartridge body 70. The first inner surface 71u is opposed to the signal recording side 100A of the disc 100, while the second inner surface 72i has a substantially cylindrical shape and defines the disc window 72w inside. That is to say, the first inner surface 71u is the bottom of the disc storage portion 70d.

In the disc storage portion 70d, a gap, which is wide enough to allow the disc 100 to rotate freely, is provided between the second inner surface 72i and the outer periphery of the disc 100. Also, the top of the disc storage portion 70d is the disc window 72w so that the disc 100 stored in the disc storage portion 70d has one of its sides exposed inside the disc window 72w.

The shutters 81 and 82 are disposed between the signal recording side 100A of the disc 100 and the first inner surface 71u of the cartridge body 70. The shutters 81 and 82 include holes 81u and 82u, respectively. These holes 81u and 82u are engaged in a freely rotatable state with shafts 71s, which are located outside of the disc storage portion 70d of the cartridge body 70 and on a deep side of the cartridge body 70 opposite to the head opening 71h thereof. Thus, the shutters 81 and 82 rotate on the shafts 71s in such a manner as to cover or expose the chucking and head openings 71c and 71h.

A cam 81c and a follower 82c are provided near the holes 81u and 82u of the shutters 81 and 82, respectively. The cam 81c and the follower 82c have mutually engaging shapes and together make up an interlocking mechanism 80c for opening and closing the shutters 81 and 82 while interlocking them with each other.

The respective upper surfaces of the shutters 81 and 82, which are opposed to the signal recording side 100A of the disc 100, are covered with protective layers 81p and 82p for the purpose of preventing the signal recording side 100A of the disc 100 from getting scratched or attracting dust.

The protective layers 81p and 82p may be appropriately selected from the group consisting of anti-scratching non-woven fabric, dustproof nonwoven fabric, anti-scratching coating and dustproof coating. In this preferred embodiment, sheets of a dustproof nonwoven fabric are adhered or ultrasonic welded as the protective layers 81p and 82p to the shutters 81 and 82, respectively.

Shutter springs 91 and 92 are provided outside of the disc storage portion 70d for the shutters 81 and 82, respectively. These springs 91 and 92 apply an elastic force to the shutters 81 and 82 in such a direction as to close the shutters 81 and 82. Alternatively, the shutter springs 91 and 92 may apply an elastic force to the shutters 81 and 82 in such a direction as to open the shutters 81 and 82. Also, if the shutters 81 and 82 can operate almost completely synchronously by way of the interlocking mechanism 80c, one of the shutter springs 91 and 92 may be omitted.

As in the eighth preferred embodiment described above, the shutters 81 and 82 each include two disc holders 81a, 81b and 82a, 82b at both ends thereof as shown in FIG. 43. Convex portions 81e and 82e are also formed on the shutters 81 and 82, respectively, as in the ninth preferred embodiment.

Furthermore, as will be described in detail later, the disc stoppers 81f, 81d and 82d are provided as integral parts of the shutters 81 and 82 near the disc holders 81a, 81b and 82a, respectively. Alternatively, these disc stoppers 81f, 81d and 82d may be integrated with the shutters 81 and 82 by way of elastic members.

As shown in FIG. 42, the upper surface of the cartridge body 70 (or the upper shell 72) has embossed arrow marks (or concave portions) 70a that indicate the direction (the arrow 1A) in which this disc cartridge 310 should be inserted into a disc drive. The cartridge body 70 further includes two concave portions 70c on two of its side surfaces that are parallel to the direction 1A in which the disc cartridge 310 is inserted. These concave portions 70c may be engaged with convex portions provided for the disc drive or a disc changer to pull in and load, or position, the disc cartridge 310. Optionally, only one of the side surfaces of the disc cartridge 310 may include the concave portion 70c. In that case, the concave portion 70c can contribute to preventing the user from inserting or loading this disc cartridge 310 into the disc drive upside down by mistake. The upper surface of the cartridge body 70 further includes a grip 70e that allows the user to grip this disc cartridge 310. This grip 70e has an antislip embossed shape.

Figure 44:
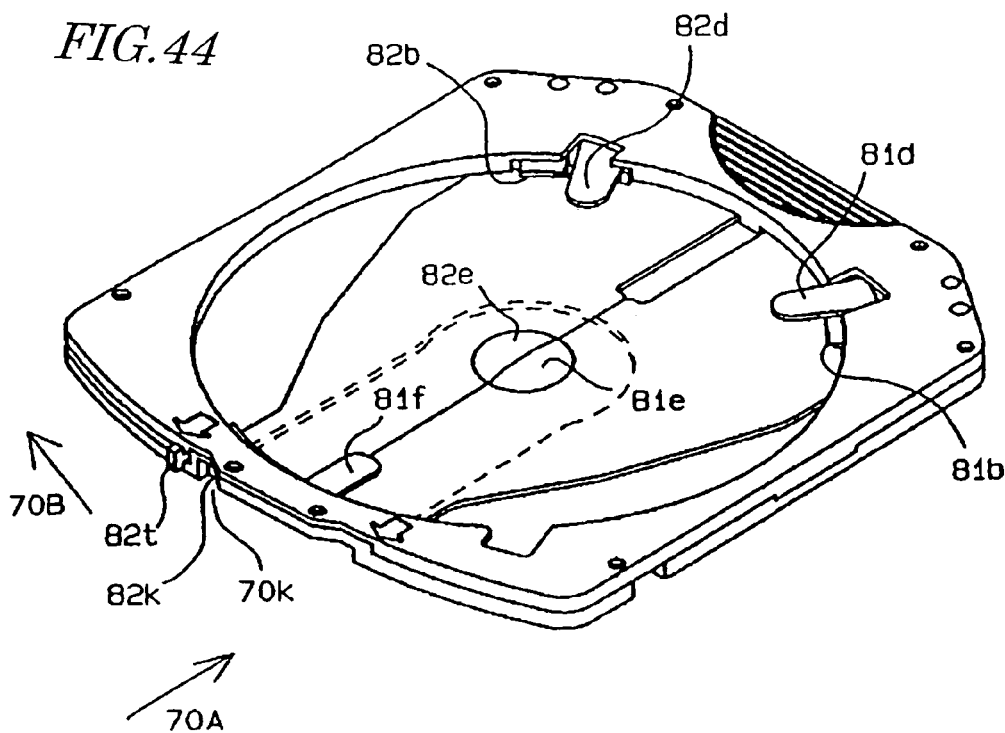
FIG. 44 is a perspective view illustrating the disc cartridge shown in FIG. 42 with the disc removed to show a state where its shutters are closed.
Figure 45:
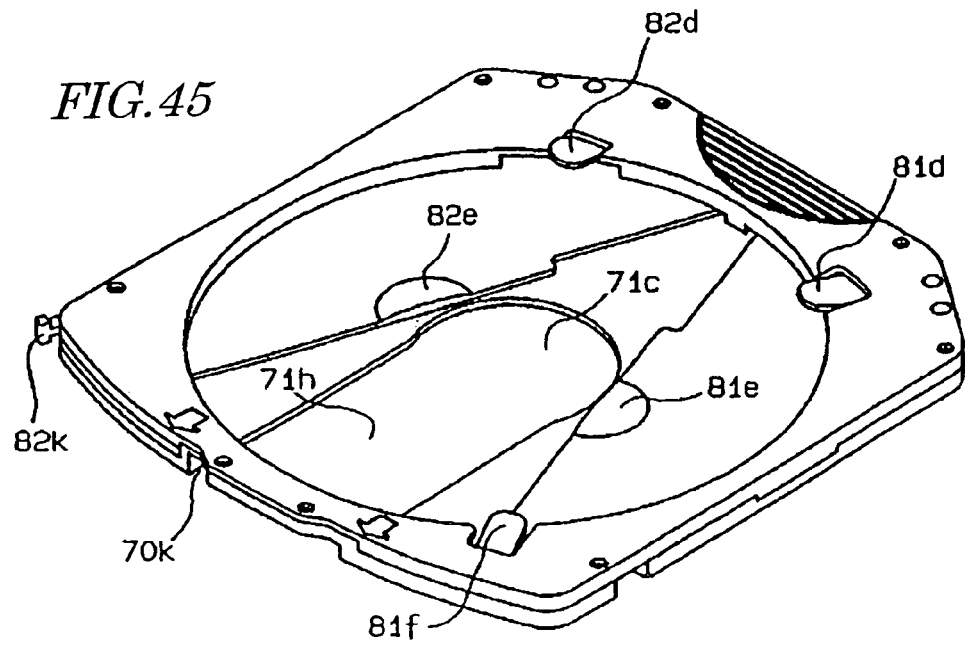
FIG. 45 is a perspective view illustrating the disc cartridge shown in FIG. 42 with the disc removed to show a state where its shutters are opened.

FIG. 44 is a perspective view illustrating the disc cartridge 310, in which no disc 100 has been stored yet, to show a state where the shutters 81 and 82 cover the chucking and head openings 71c and 71h. FIG. 45 is a perspective view illustrating the disc cartridge 310, in which no disc 100 has been stored yet, to show a state where the shutters 81 and 82 expose the chucking and head openings 71c and 71h.

Hereinafter, the structure and the operation of the shutters 81 and 82 will be described in further detail. As shown in FIGS. 42 and 43, the disc holders 81a, 81b, 82a and 82b of the shutters 81 and 82 have such a cross-sectional shape as including a slope that hangs over the projection area of the disc 100 and overlaps with the outer edge of the disc 100 as in the eighth preferred embodiment. That is to say, the slope is downwardly tapered and leans toward the disc 100. Thus, the effects of the eighth preferred embodiment described above are also achieved by this tenth preferred embodiment.

Also, the shutter 82 includes an opener/closer 82t for use to open and close the shutter 82 externally, an elastic portion 82v and a locking protrusion 82k as integral parts thereof. The locking protrusion 82k is connected to the shutter 82 by way of the elastic portion 82v as shown in FIG. 43. Thus, while the chucking and head openings 71c and 71h are covered with the shutters 81 and 82, the locking protrusion 82k, to which an elastic force is applied from the elastic portion 82v, engages with a locking hole 70k of the cartridge body 70 (or the lower shell 71) as shown in FIG. 44, thereby fixing the shutter 82 in a non-rotatable state to the cartridge body 70. When the shutter 82 is fixed in this way, the other shutter 81, which is interlocked with the shutter 82 via the interlocking mechanism 80c, is also fixed.

Accordingly, only by getting the locking protrusion 82k pressed externally by a protrusion, for example, in the direction indicated by the arrow 70A and disengaged from the locking hole 70k while pressing the opener/closer 82t in the direction indicated by the arrow 70B at the same time as shown in FIG. 44, the shutters 81 and 82 can be rotated to expose the chucking and head openings 71c and 71h and the disc 100 can be released from the disc holders 81a, 81b, 82a and 82b. Thus, it is possible to prevent the user from removing the disc 100 accidentally.

In the preferred embodiment described above, the locking protrusion 82k forms an integral part of the shutter 82. Alternatively, a locking lever, including a locking protrusion and a convex portion at the end thereof, may be connected to the cartridge body 70 by way of an elastic portion, and a concave portion may be provided for the shutter so that the convex and concave portions engage with each other. In that case, by pressing the locking protrusion through a locking hole of the cartridge body, these convex and concave portions may be disengaged from each other so as to allow the shutters to rotate freely. Optionally, in that alternative preferred embodiment, the locking lever, as well as the shutter springs (i.e., elastic members), may be resin springs that form integral parts of the cartridge body 70.

Figure 46:
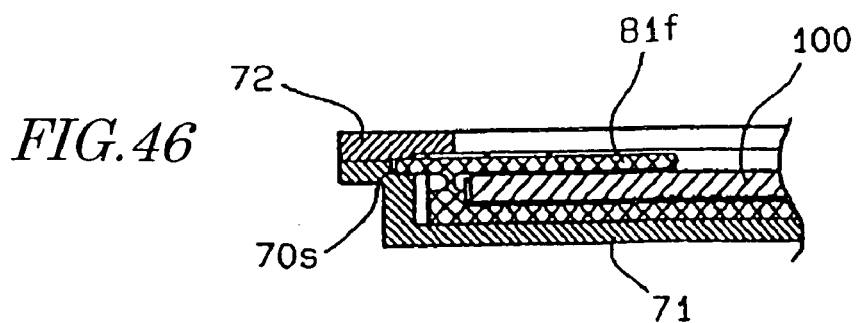
FIG. 46 is a partial cross-sectional view of the disc cartridge shown in FIG. 42, which is viewed along a plane that passes the center of the disc to show a state where its shutters are closed.
Figure 48:
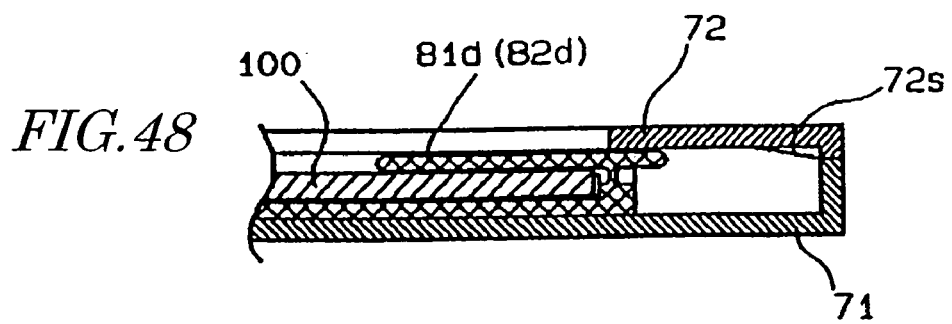
FIG. 48 is a partial cross-sectional view illustrating a portion of the disc cartridge shown in FIG. 42 around the disc outer periphery, which is viewed along a plane passing the center of the disc to show a state where its shutters are closed.

Next, the structure and operation of the disc stoppers 81f, 81d and 82d will be described in further detail. While the shutters 81 and 82 are closed, the disc stoppers 81f, 81d and 82d are substantially parallel to the surface of the disc 100 and do not protrude from the upper surface of the disc cartridge 310 as shown in FIGS. 46 and 48. An appearance of the disc cartridge 310 in such a state is illustrated in FIG. 44.

Figure 47:
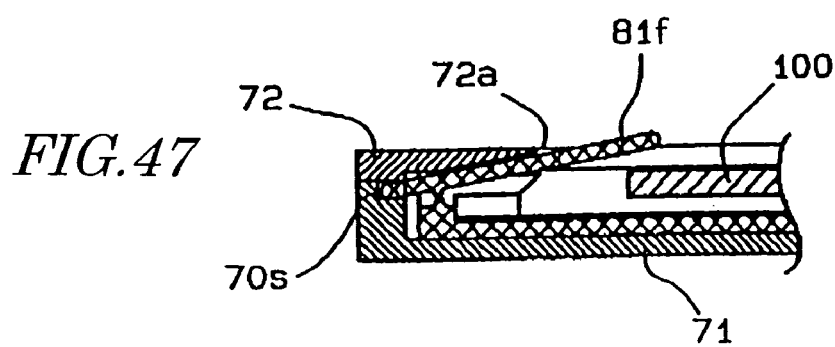
FIG. 47 is a partial cross-sectional view of the disc cartridge shown in FIG. 42, which is viewed along a plane that passes the center of the disc to show a state where its shutters are opened.
Figure 49:
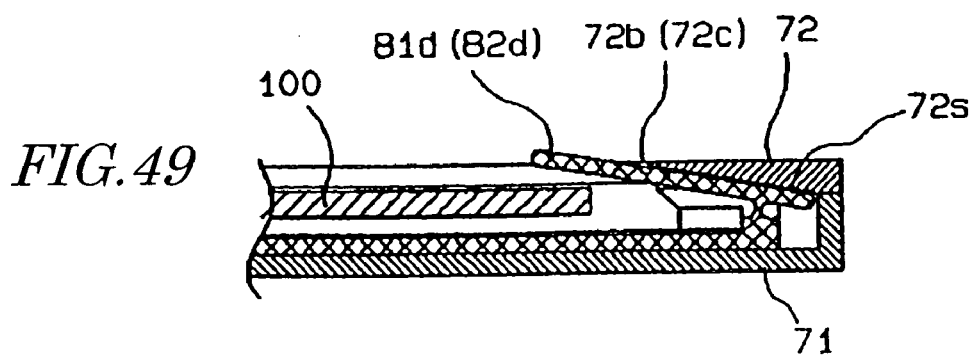
FIG. 49 is a partial cross-sectional view illustrating a portion of the disc cartridge shown in FIG. 42 around the disc outer periphery, which is viewed along a plane passing the center of the disc to show a state where its shutters are opened.

On the other hand, while the shutters 81 and 82 are going to be opened, the disc stoppers 81f, 81d and 82d are guided by a slit 70s and a slope 72s of the cartridge body 70 so as to be lifted to above the disc 100 as shown in FIGS. 47 and 49. The slit 70s is formed in the inner sidewall of the cartridge body 70 as shown in FIG. 47, while the slope 72s is formed on the inner upper surface of the cartridge body 70 as shown in FIG. 49. Also, the upper shell 72 is provided with notched portions 72a, 72b and 72c so as not to interfere with the disc stoppers 81f, 81d and 82d that have been lifted up. An appearance of the disc cartridge 310 in such a state is illustrated in FIG. 45.

While the shutters 81 and 82 are closed, the disc stoppers 81f, 81d and 82d hang over the projection area of the disc 100 and overlap with the outer periphery of the disc 100. Thus, the disc stoppers 81f, 81d and 82d press the disc 100 against the shutters 81 and 82 in the thickness direction, thereby holding it thereon. Accordingly, the disc holders 81a, 81b, 82a and 82b may be omitted from the shutters 81 and 82.

By using such a structure, particularly in an interval after the disc cartridge 310 has been vertically loaded into a disc drive and before the disc 100 is chucked, it is possible to prevent the disc 100 from dropping down from the cartridge 310. In addition, while the disc 100 is being chucked, the disc 100 can move in a broader space. Furthermore, this structure can also contribute to further reducing the thickness of the cartridge body.

Embodiment 11

Hereinafter, a disc cartridge 311 according to an eleventh specific preferred embodiment of the present invention will be described with reference to the accompanying drawings.

Figure 50:
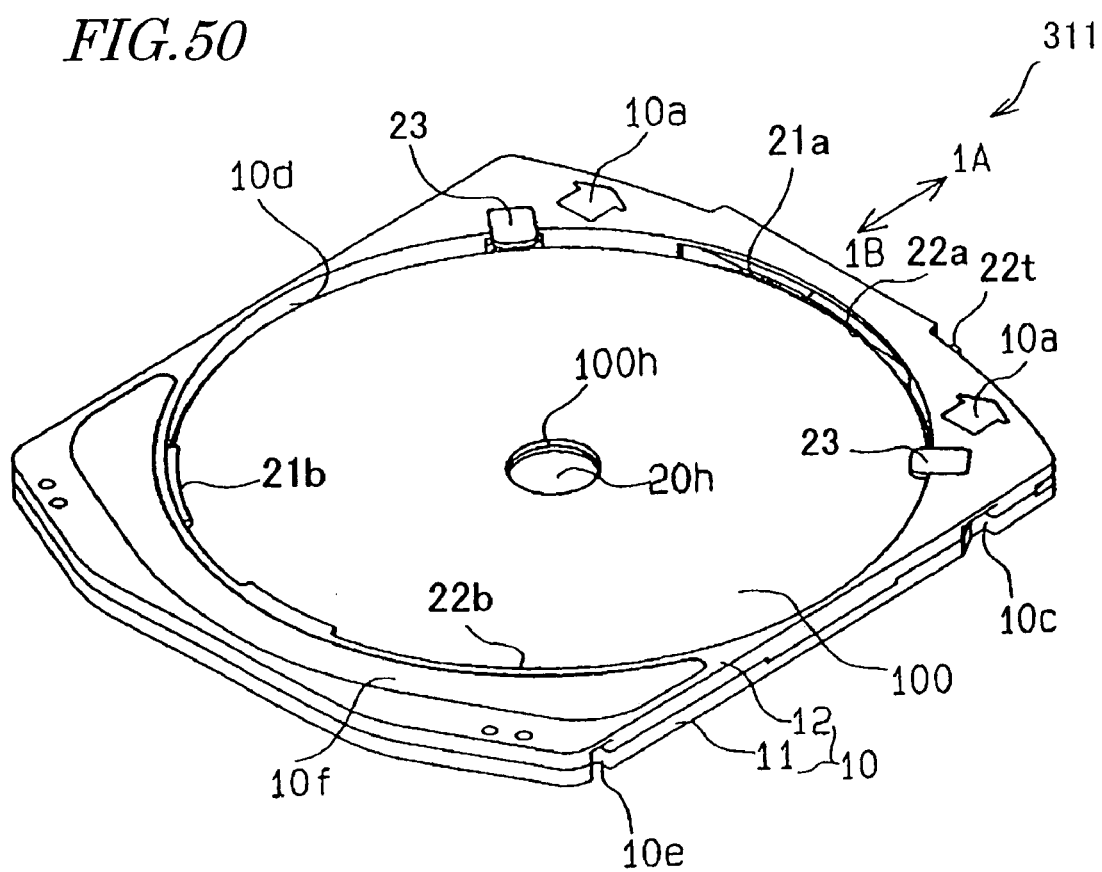
FIG. 50 is a perspective view illustrating an overall configuration for a disc cartridge according to an eleventh specific preferred embodiment of the present invention.
Figure 51:
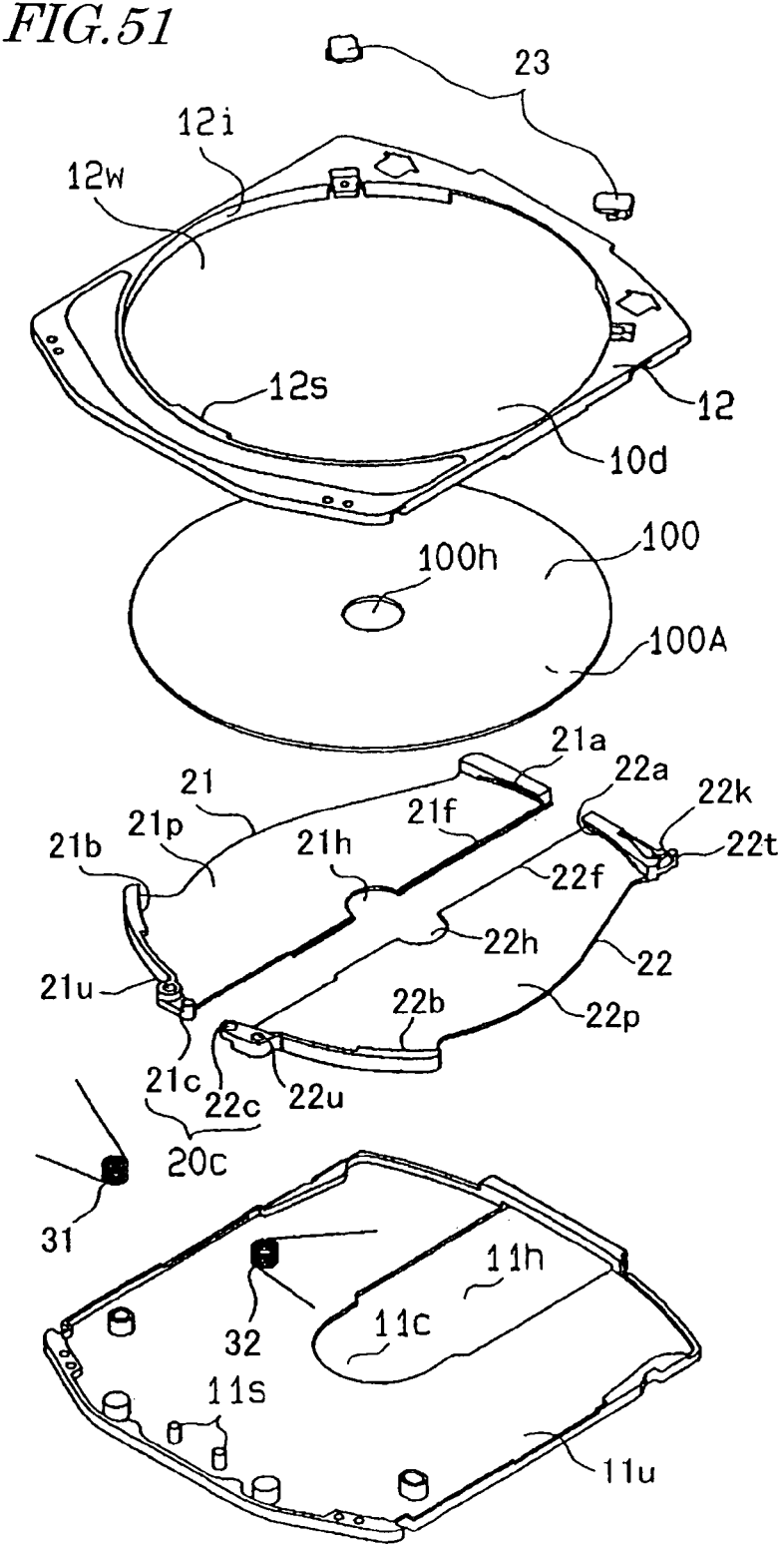
FIG. 51 is an exploded perspective view of the disc cartridge shown in FIG. 50.
Figure 52:
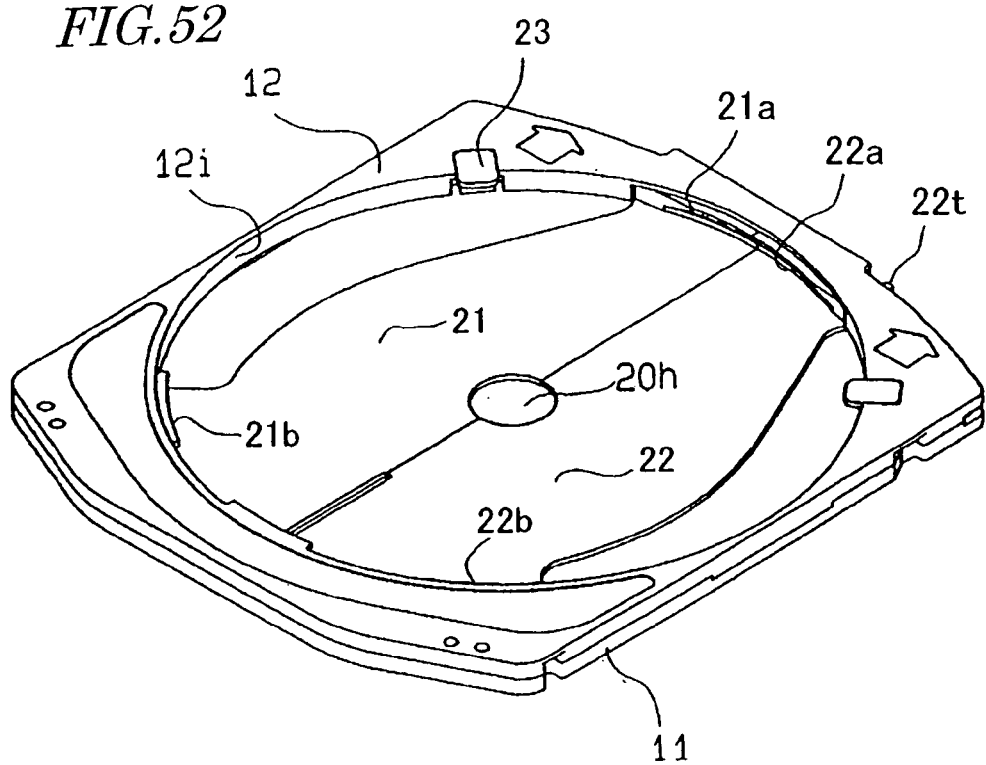
FIG. 52 is a perspective view illustrating the disc cartridge shown in FIG. 50 with the disc removed to show a state where its shutters are closed.
Figure 53:
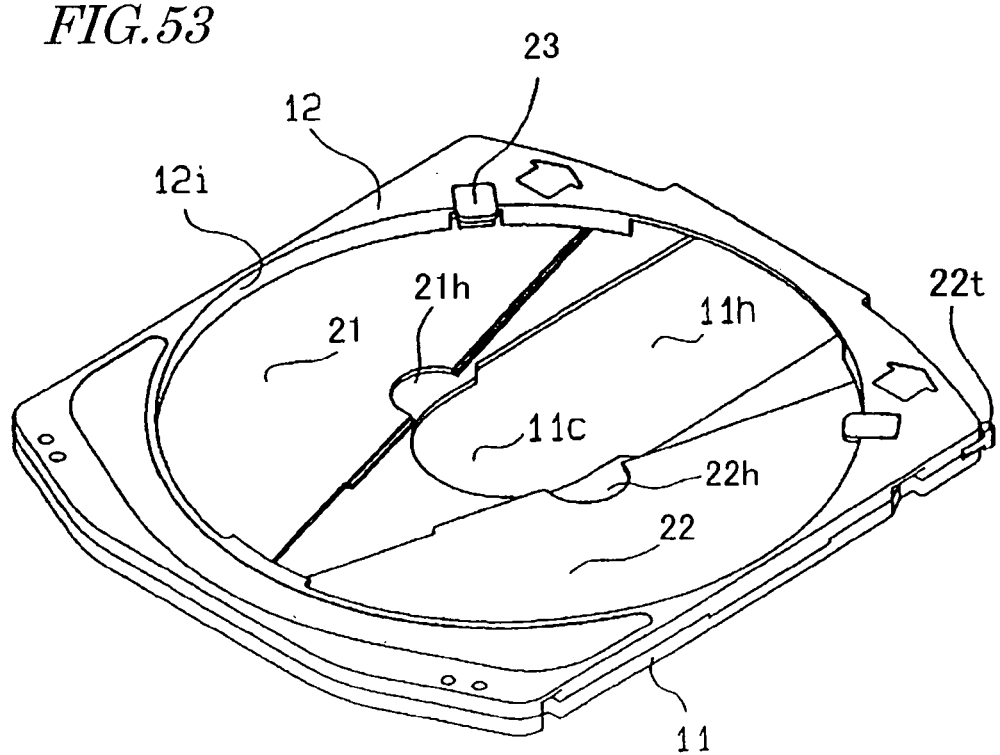
FIG. 53 is a perspective view illustrating the disc cartridge shown in FIG. 50 with the disc removed to show a state where its shutters are opened.
Figure 54:
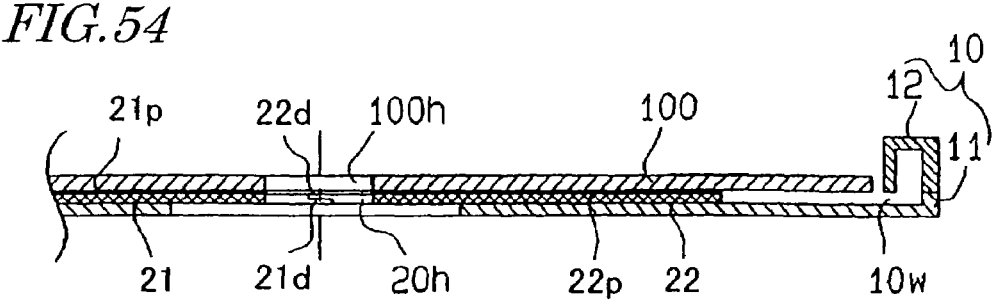
FIG. 54 is a partial cross-sectional view of the disc cartridge shown in FIG. 50, which is viewed along a plane that passes the center of the disc to show a state where its shutters are closed.
Figure 55:
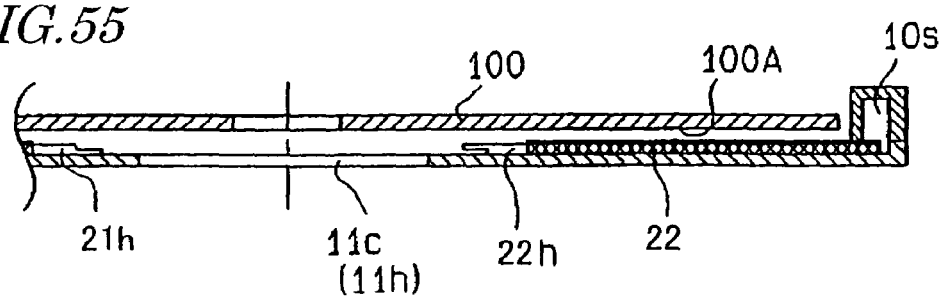
FIG. 55 is a partial cross-sectional view of the disc cartridge shown in FIG. 50, which is viewed along a plane that passes the center of the disc to show a state where its shutters are opened.
Figure 56:
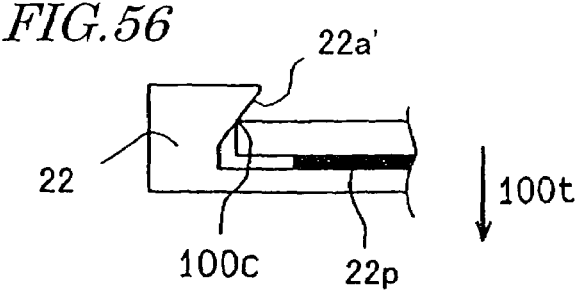
FIG. 56 is a cross-sectional view illustrating a portion of the shutter of the disc cartridge shown in FIG. 50.

As shown in FIGS. 50 and 51, the disc cartridge 311 includes a lower shell 11, an upper shell 12, a pair of shutters 21 and 22 and disc stoppers 23. As shown in FIGS. 52 through 56, the structures and functions of all of these members are the same as those already described for the eighth preferred embodiment and the detailed description thereof will be omitted herein.

Unlike the disc cartridge 308 of the eighth preferred embodiment described above, the shutters 21 and 22 of the disc cartridge 311 of the eleventh preferred embodiment have a hole 20h as shown in FIGS. 50 and 51.

More specifically, while the shutters 21 and 22 of the disc cartridge 311 are closed, the shutters 21 and 22 define the hole 20h just under the center hole 100h of the disc 100 as shown in FIG. 50. As can be seen from FIG. 51, the hole 20h is made up of two notches 21h and 22h of the shutters 21 and 22, respectively.

If the disc cartridge 311 is left with the upper side of the disc 100 exposed upward as shown in FIG. 50, dust may pass through the center hole 100h of the disc 100. Even so, in this structure, the dust should pass and go out through the hole 20h of the shutters 21 and 22 without remaining in the disc cartridge 311, or without being deposited on the shutters 21 and 22. Thus, when the shutters 21 and 22 are opened after that (i.e., when this disc cartridge 311 has been loaded into a disc drive), no dust will be deposited on the signal recording side 100A of the disc 100.

The disc cartridge 311 may be left either upside up as shown in FIG. 50 or upside down (i.e., with the lower shell 11 facing upward). In view of these two possible positions, the hole 20h preferably has a diameter that is approximately equal to that of the center hole 10h. This is because if the holes 20h and 100h have approximately equal diameters, dust will be deposited neither on the shutters 21 and 22 when the disc cartridge 311 is left upside up nor on the signal recording side 100A of the disc 100 when the disc cartridge 311 is left upside down.

Figure 57:
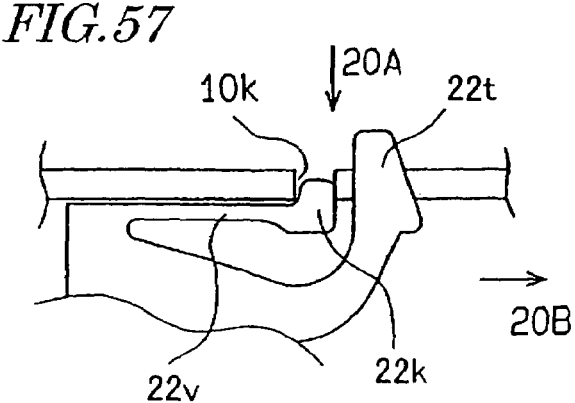
FIG. 57 is a partial plan view illustrating a shutter opener/closer and its surrounding portion of the disc cartridge shown in FIG. 50.

In this disc cartridge 311, the opener/closer 22t for use to open and close the shutters 21 and 22 is provided for the shutter 22 unlike the eighth preferred embodiment described above. More specifically, as shown in FIGS. 51 and 57, the opener/closer 22t, elastic portion 22v and locking protrusion 22k are provided as integral parts of the shutter 22. The locking protrusion 22k is connected to the shutter 22 by way of the elastic portion 22v as shown in FIG. 57. Accordingly, unlike the eighth preferred embodiment described above, the opener/closer 22t is located on the right-hand side of the head opening 11h with respect to the disc 100. The opener/closer 22t operates in the same way as the counterpart of the eighth preferred embodiment described above.

Embodiment 12

Hereinafter, a disc cartridge 312 according to a twelfth specific preferred embodiment of the present invention will be described with reference to the accompanying drawings.

Unlike the disc cartridge 311 of the eleventh preferred embodiment described above, the disc cartridge 312 of this twelfth preferred embodiment includes a rim 12t around the inner side surface 12i of the cartridge body 10 and a ring 20w around the hole 20h defined by the shutters 21 and 22. These features will be described below.

Figure 58:
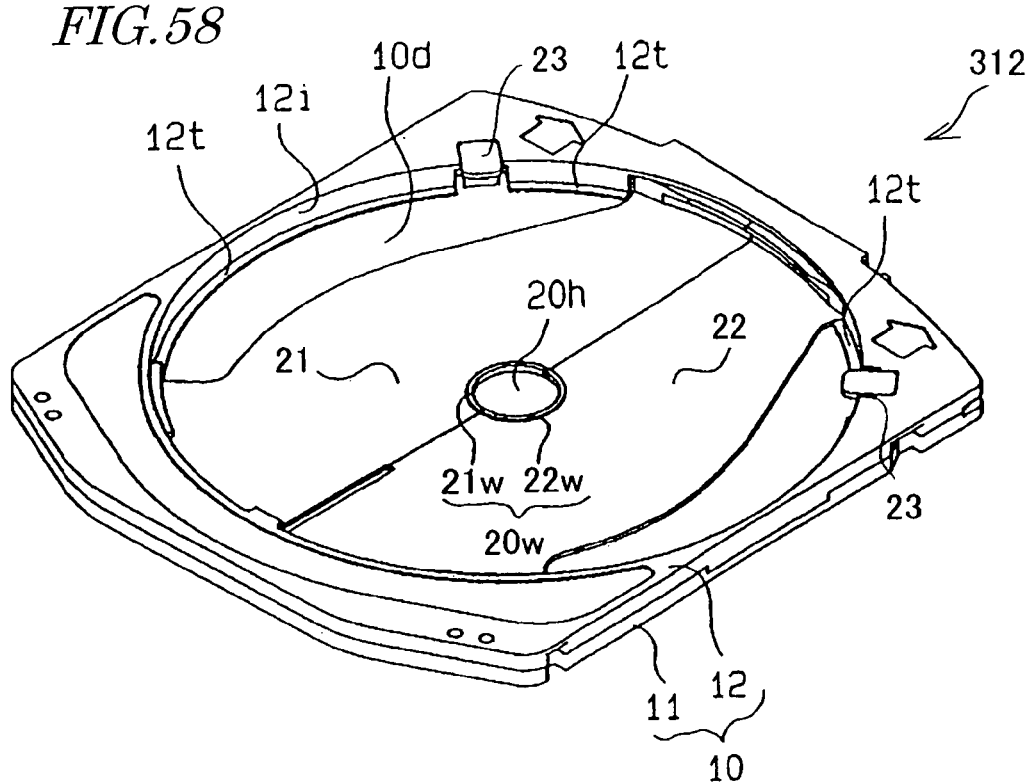
FIG. 58 is a perspective view illustrating a disc cartridge according to a twelfth specific preferred embodiment of the present invention with the disc removed to show a state where its shutters are closed.
Figure 59:
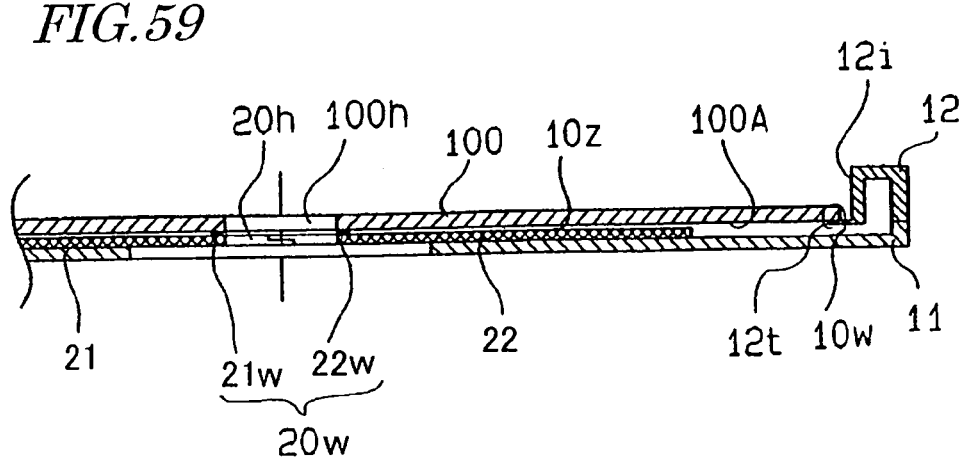
FIG. 59 is a partial cross-sectional view of the disc cartridge shown in FIG. 58, which is viewed along a plane that passes the center of the disc to show a state where its shutters are closed.

As shown in FIG. 58, the rim 12t protrudes from the inner side surface 12i of the upper shell 12 toward the inner periphery of the disc 100 and substantially surrounds the outer periphery of the disc storage portion 10d. FIG. 59 shows a cross section of the disc cartridge 312 in a state where the disc 100 is stored in the disc storage portion 10d. While the shutters 21 and 22 are closed, the outer edge of the signal recording side 100A of the disc 100 contacts with the rim 12t as shown in FIG. 59. As a result, the gap between the outer periphery of the disc 100 and the cartridge body 10 is closed, thereby preventing dust from reaching the signal recording side 100A of the disc 100.

Figure 60:
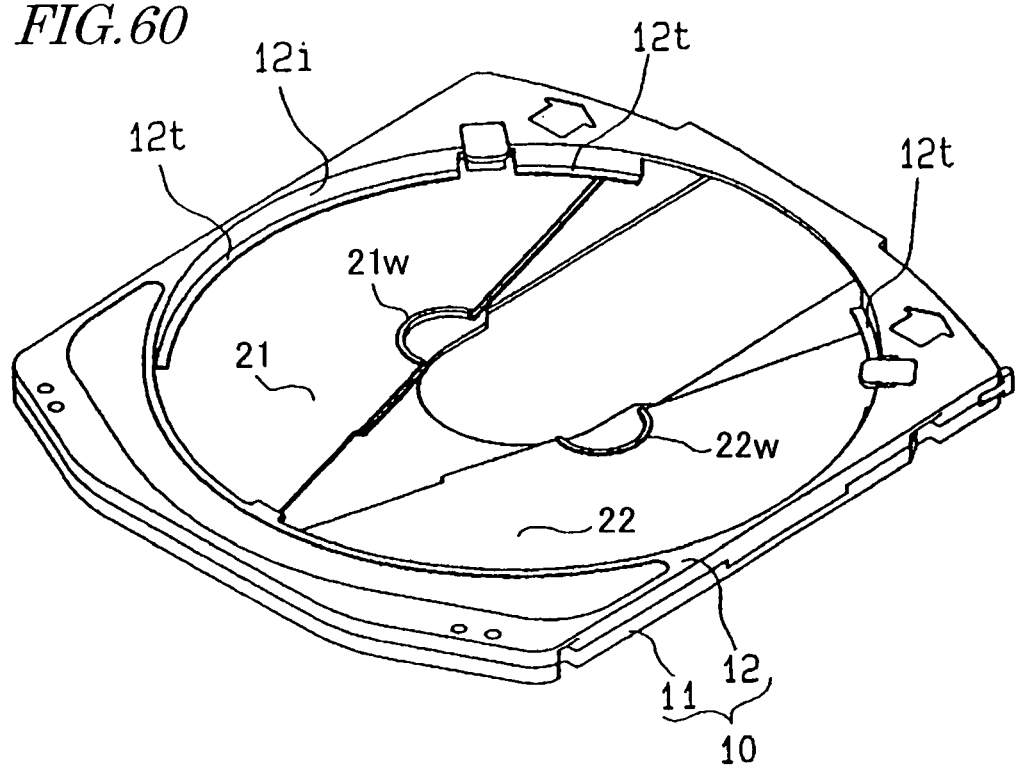
FIG. 60 is a perspective view illustrating the disc cartridge shown in FIG. 58 with the disc removed to show a state where its shutters are opened.
Figure 61:
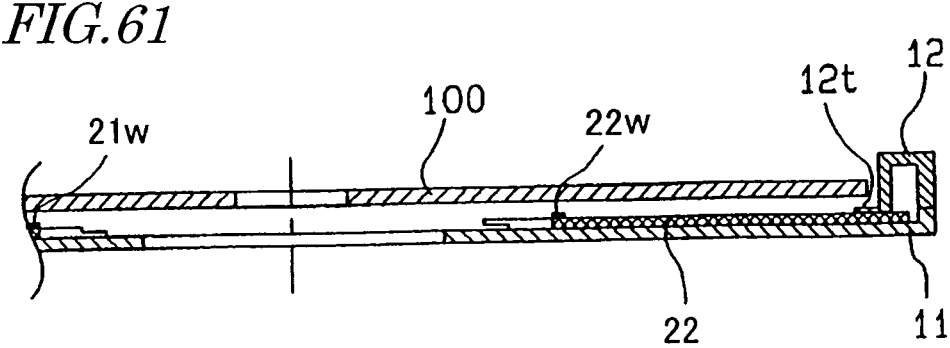
FIG. 61 is a partial cross-sectional view of the disc cartridge shown in FIG. 58, which is viewed along a plane that passes the center of the disc to show a state where its shutters are opened.

Also, a gap 10w is provided between the rim 12t of the cartridge body 10 and the lower shell 11. Thus, when the shutters 21 and 22 are opened, respective portions of the shutters 21 and 22 enter the gap 10w as shown in FIGS. 60 and 61, thereby preventing the shutters 21 and 22 from interfering with the cartridge body 10.

In such a structure, however, while the shutters 21 and 22 are closed, another gap 10z that leads to the open air is also created between the disc 100 and the shutters 21 and 22 as shown in FIG. 59. To close this gap 10z, the shutters 21 and 22 include convex portions 21w and 22w, respectively, around the center hole 100h of the disc 100. As shown in FIG. 58, when the shutters 21 and 22 are closed, these two convex portions 21w and 22w are in tight contact with each other, thereby forming the ring 20w that closes the gap 10z around the disc center hole 100h. As a result, no dust will reach the signal recording side 100A of the disc 100 through the disc center hole 100h.

However, the top of these convex portions 21w and 22w might contact with the signal recording side 100A of the disc 100. Accordingly, the edge of the convex portions 21w and 22w should preferably be round so as not to scratch the signal recording side 100A of the disc 100. Optionally, the convex portions 21w and 22w may form integral parts of the shutters 21 and 22, respectively. In that case, an anti-scratching nonwoven fabric is preferably adhered or ultrasonic welded to that portion of the ring 20w that contacts with the signal recording side 100A of the disc 100 or an anti-scratching coating is preferably formed on that portion. Alternatively, the convex portions 21w and 22w themselves may be made of an anti-scratching nonwoven fabric or an anti-scratching coating and directly adhered or ultrasonic welded to the shutters 21 and 22, respectively.

Also, as shown in FIG. 59, while the shutters 21 and 22 are closed, the disc 100 is lifted by the ring 20w and the rim 12t over the shutters 21 and 22 with the gap 10z left between them. That is to say, most of the signal recording side 100A of the disc 100 is not in contact with the shutters 21 and 22. Accordingly, even if the surface of the shutters 21 and 22 is not covered with an anti-scratching nonwoven fabric, for example, the signal recording side 100A still will not get scratched.

Figure 62:
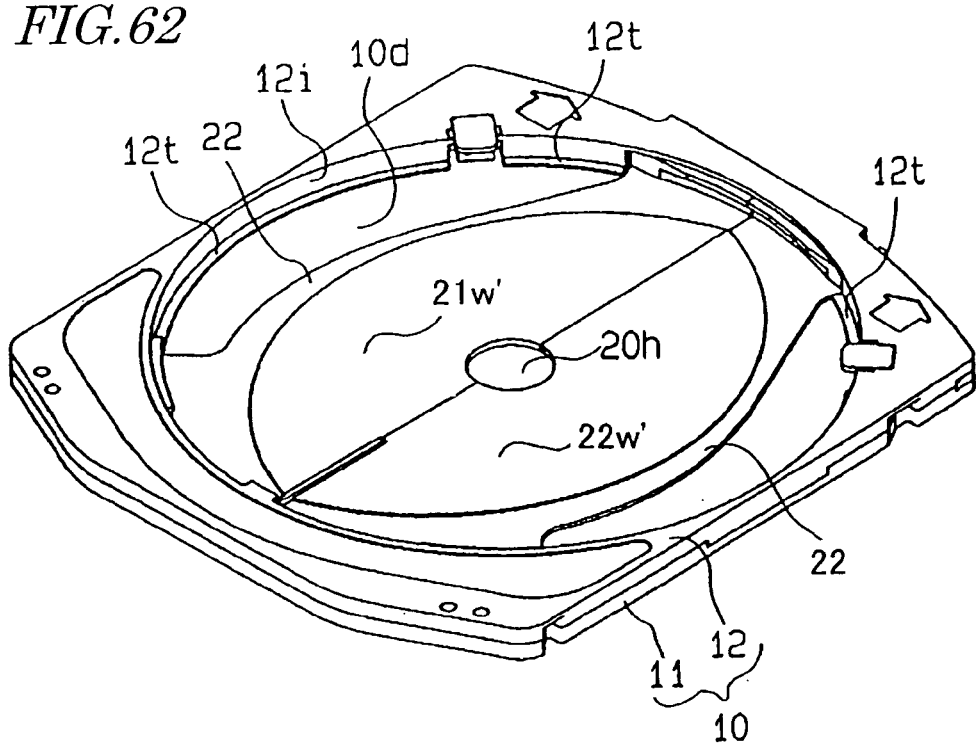
FIG. 62 is a perspective view illustrating a modified example of the disc cartridge shown in FIG. 58 with the disc removed to show a state where its shutters are closed.
Figure 63:
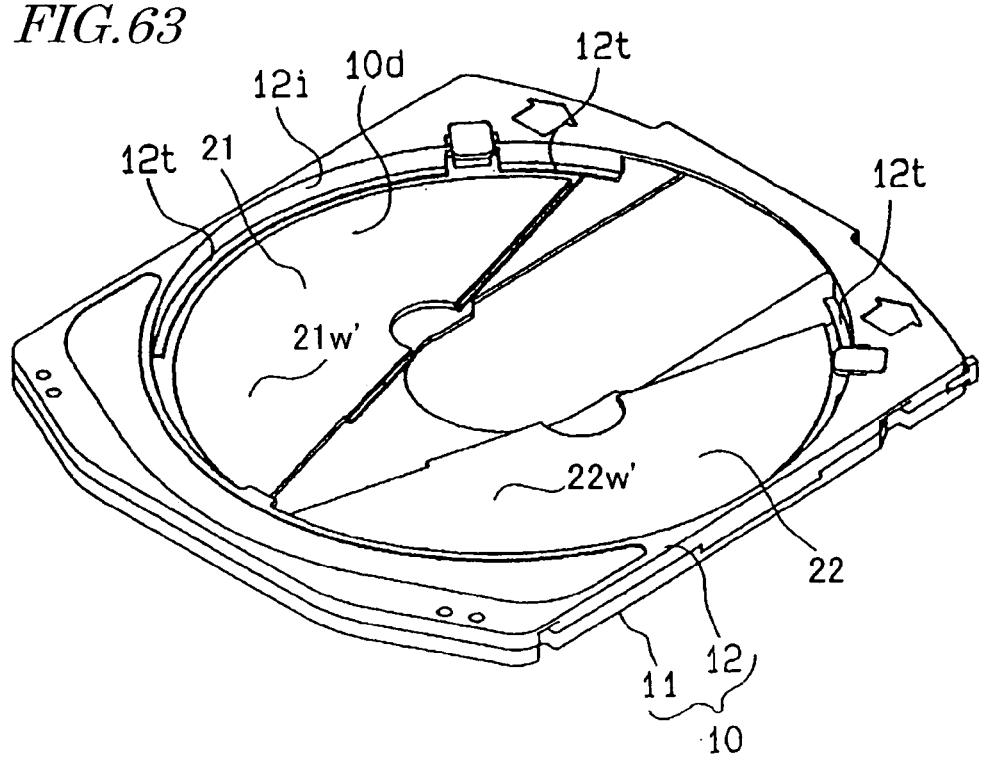
FIG. 63 is a perspective view illustrating a modified example of the disc cartridge shown in FIG. 58 with the disc removed to show a state where its shutters are opened.

FIGS. 62 and 63 illustrate a disc cartridge including alternative convex portions 21w' and 22w' that have been expanded toward the outer periphery of the disc 100. Specifically, FIG. 62 illustrates a state in which the shutters 21 and 22 are closed, while FIG. 63 illustrates a state in which the shutters 21 and 22 are opened.

As shown in FIGS. 62 and 63, while the shutters 21 and 22 are opened, the convex portions 21w' and 22w' are preferably located inside the rim 12t of the disc storage portion 10d (i.e., closer to the center of the disc storage portion 10d). Then, the convex portions 21w' and 22w' will not contact with, or interfere with, the rim 12t.

Optionally, the convex portions 21w' and 22w' may form integral parts of the shutters 21 and 22, respectively. In that case, an anti-scratching nonwoven fabric is preferably adhered or ultrasonic welded to those portions of the convex portions 21w' and 22w' that contact with the disc 100 or an anti-scratching coating is preferably formed thereon. Alternatively, the convex portions 21w' and 22w' themselves may be made of an anti-scratching nonwoven fabric or an anti-scratching coating and directly adhered or ultrasonic welded to the shutters 21 and 22, respectively.

Embodiment 13

Hereinafter, a disc cartridge 313 according to a thirteenth specific preferred embodiment of the present invention will be described with reference to the accompanying drawings.

Figure 64:
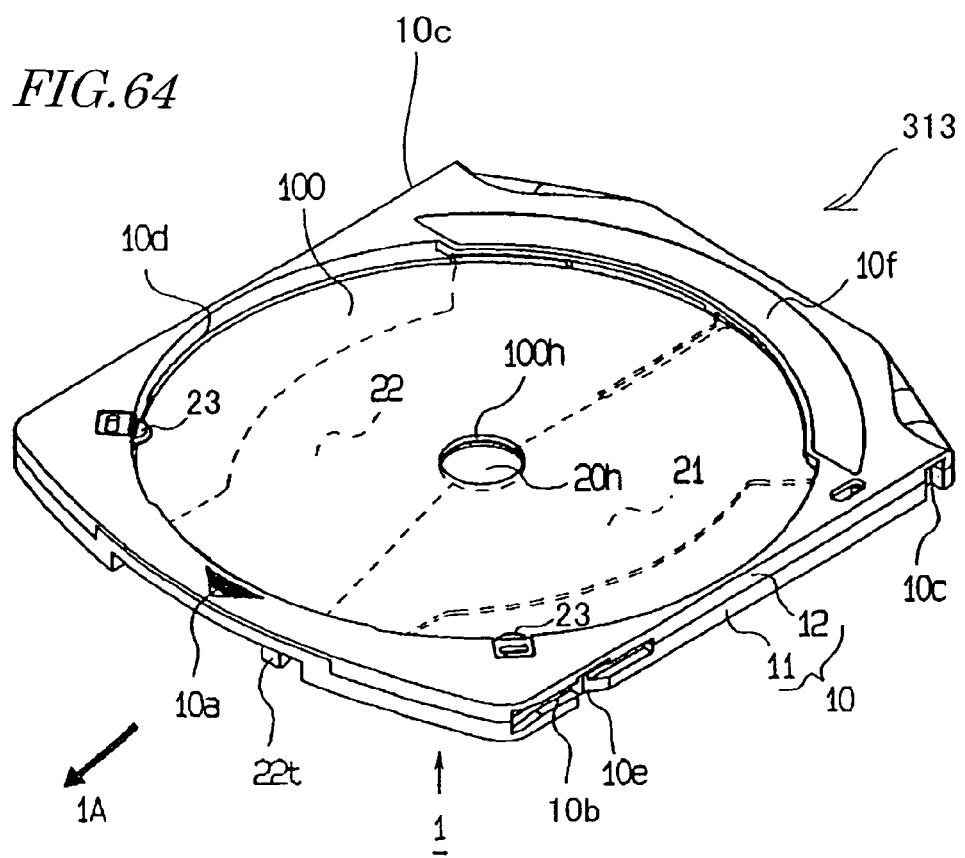
FIG. 64 is a perspective view illustrating an overall configuration for a disc cartridge according to a thirteenth specific preferred embodiment of the present invention.
Figure 65:
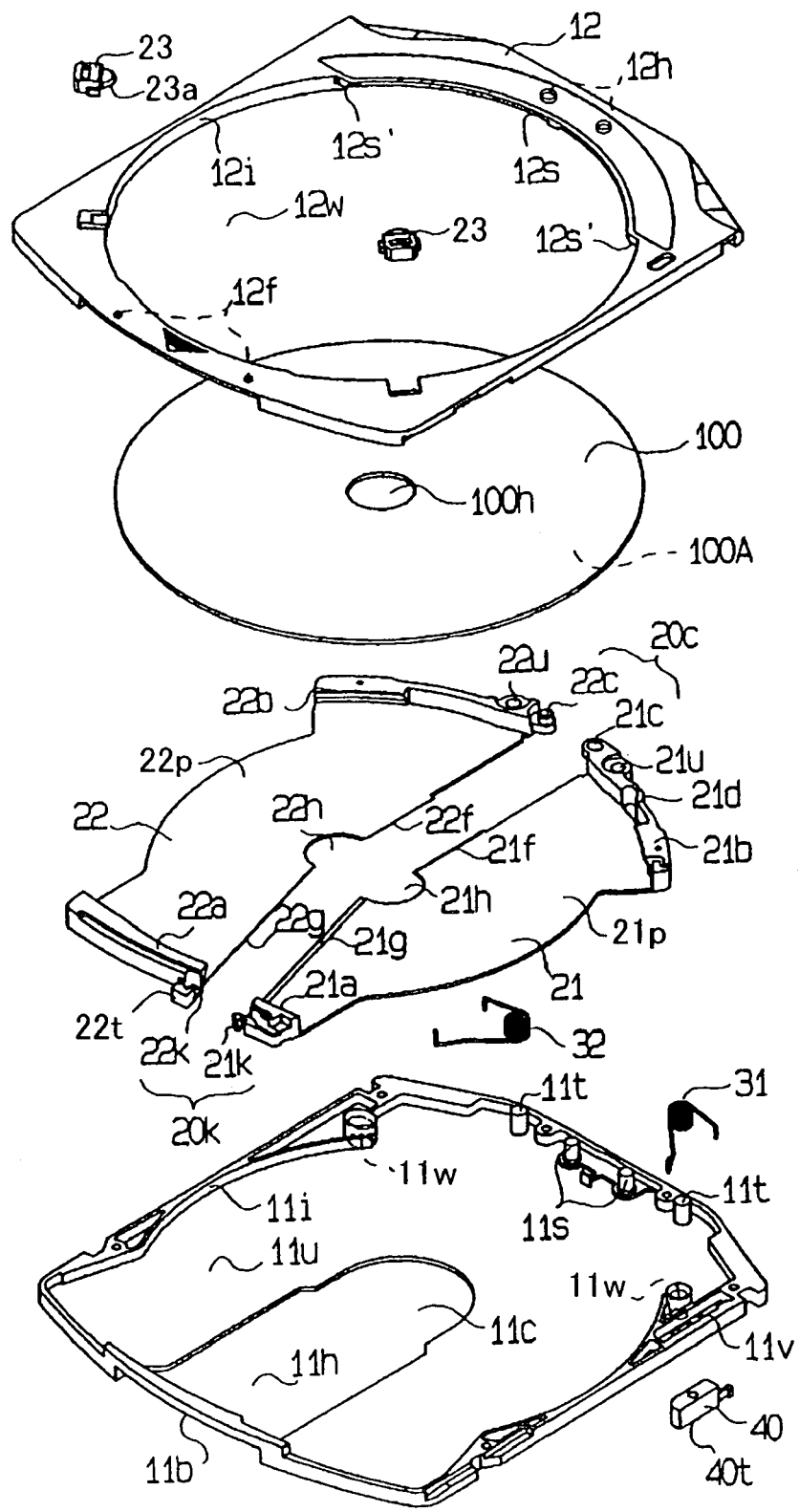
FIG. 65 is an exploded perspective view of the disc cartridge shown in FIG. 64.

First, the structure of the disc cartridge 313 will be outlined with reference to FIGS. 64 and 65. As in the eighth preferred embodiment, the disc 100 shown in FIGS. 64 and 65 also includes first and second sides. The first side of the disc 100, on which its label is normally printed, is illustrated in FIG. 64, while the second side thereof, i.e., the signal recording side 100A, is illustrated as the backside in FIG. 65.

As shown in FIGS. 64 and 65, the disc cartridge 313 includes a lower shell 11, an upper shell 12, a pair of shutters 21 and 22 and disc stoppers 23.

As shown in FIG. 65, the lower shell 11 includes a chucking opening 11c and a head opening 11h. The chucking opening 11c allows a chucking member (e.g., a spindle motor for rotating the disc 100) to enter the disc cartridge 313 externally. The head opening 11h allows a head, which reads and/or writes a signal from/on the signal recording side 100A of the disc 100, to enter the disc cartridge 313 and access a target location on the disc 100. The lower shell 11 faces the signal recording side 100A of the disc 100. The lower shell 11 is formed by molding a synthetic resin into a predetermined shape.

The head opening 11h reaches one side surface of the lower shell 11. To minimize a decrease in rigidity of the lower shell 11 due to the presence of the head opening 11h, the lower shell 11 includes a bridge 11b that links both ends of the head opening 11h together. The lower shell 11 further includes two positioning holes 11w that engage with cartridge positioning pins (not shown) of a disc drive.

The upper shell 12 includes a circular disc window 12w, through which the disc 100 can be introduced and removed into/from the disc cartridge 313 and which expands over the entire projection area of the disc 100 to expose the upper side of the disc 100. The upper and lower shells 12 and 11 are adhered or welded together at their outer periphery, thereby forming a cartridge body 10. The upper shell 12 is also made of a synthetic resin.

A disc storage portion 10d for storing the disc 100 therein is defined by an inner lower surface 11u and an inner side surface 12i of the cartridge body 10. The inner lower surface 11u is opposed to the signal recording side 100A of the disc 100, while the inner side surface 12i has a substantially cylindrical shape and defines the disc window 12w inside. That is to say, the inner lower surface 11u is the bottom of the disc storage portion 10d.

In the disc storage portion 10d, a gap, which is wide enough to allow the disc 100 to rotate freely, is provided between the inner side surface 12i and the outer periphery of the disc 100. Also, the top of the disc storage portion 10d is the disc window 12w so that the disc 100 stored in the disc storage portion 10d has one of its sides exposed inside the disc window 12w.

Two removable disc stoppers 23 are provided for the upper shell 12 so as to partially protrude into the disc window 12w as shown in FIGS. 64 and 65. A third disc stopper 12s is further provided for the upper shell 12 so as to protrude into the disc window 12w. The third disc stopper 12s forms an integral part of the upper shell 12. These three disc stoppers 23 and 12s are arranged substantially at regular intervals around the circumference of the disc window 12w for the purpose of preventing the disc 100 from dropping down from the disc window 12w. Also, two convex disc contact portions 12s' are formed on the disc stopper 12s. For the disc 100, these disc contact portions 12s' are almost as high as the disc contact portions 23a of the disc stoppers 23.

According to this structure, even if the disc cartridge 313 is mounted vertically or upside down, the disc cartridge 313 still can hold the disc 100 without dropping it. That is to say, when the disc cartridge 313 is inserted vertically or upside down into a disc drive, this disc cartridge 313 can particularly effectively prevent the disc 100 from dropping down. It should be noted that the disc stoppers 23 do not have to be removable from the cartridge body 10. Alternatively, as long as the disc stoppers 23 can be rotated or bent inside the disc storage portion 10d to such an extent as to allow the user to remove the disc 100 from the cartridge body 10, the disc stoppers 23 may also be secured to the upper shell 12.

The shutters 21 and 22 lie on a single plane between the signal recording side 100A of the disc 100 and the inner lower surface 11u of the cartridge body 10. The shutters 21 and 22 include holes 21u and 22u, respectively. These holes 21u and 22u are engaged in a freely rotatable state with shafts 11s, which are located outside of the disc storage portion 10d of the cartridge body 10 and on a deep side of the cartridge body 10 opposite to the head opening 11h thereof. Thus, the shutters 21 and 22 rotate on the shafts 11s in such a manner as to cover or expose the chucking and head openings 11c and 11h. The shutters 21 and 22 are also made of a synthetic resin.

A ring portion 21c and a pin portion 22c are provided near the holes 21u and 22u of the shutters 21 and 22, respectively. The ring portion 21c and the pin portion 22c have mutually engaging shapes and together make up an interlocking mechanism 20c for opening and closing the shutters 21 and 22 while interlocking them with each other. The interlocking mechanism 20c may also be implemented as a cam mechanism or a gear mechanism.

The respective upper surfaces of the shutters 21 and 22, which are opposed to the signal recording side 100A of the disc 100, are covered with protective layers 21p and 22p for the purpose of preventing the signal recording side 100A of the disc 100 from getting scratched or attracting dust.

The protective layers 21p and 22p may be appropriately selected from the group consisting of anti-scratching nonwoven fabric, dustproof nonwoven fabric, anti-scratching coating and dustproof coating. In this preferred embodiment, sheets of a dustproof nonwoven fabric are adhered or ultrasonic welded as the protective layers 21p and 22p to the shutters 21 and 22, respectively.

A locking protrusion 21k is provided for the shutter 21, while a locking engaging portion 22k, which engages with the locking protrusion 21k, is provided for the shutter 22.

The locking protrusion 21k and locking engaging portion 22k together make up a locking mechanism 20k for locking and unlocking the shutters 21 and 22 to/from each other. By using this mechanism 20k, the shutters 21 and 22 can be locked and unlocked automatically, thus preventing the user from opening the shutters 21 and 22 accidentally. In addition, the signal recording side 100A of the disc 100 can be protected from dust, finger marks or scratches. The locking protrusion 21k and the locking engaging portion 22k form integral parts of the shutters 21 and 22, respectively.

Furthermore, the shutters 21 and 22 are provided with notches 21h and 22h, respectively. When the shutters 21 and 22 are closed, these notches 21h and 22h contact with each other to form a hole 20h just under the center hole 100h of the disc 100. In this case, the diameter of the hole 20h is approximately equal to that of the center hole 100h of the disc 100. In such a structure, even if this disc cartridge 313 is left with the upper side of the disc 100 exposed upward, no dust will be deposited on the shutters 21 and 22. Also, even if the disc cartridge 313 is left upside down, no dust will be directly deposited on the signal recording side 100A of the disc 100, either.

As already described for the eighth preferred embodiment, the shutters 21 and 22 each include two disc holders 21a, 21b and 22a, 22b at both ends thereof. These disc holders 21a, 21b, 22a and 22b are arranged substantially at regular intervals around the circumference of the disc 100. The disc holders 21a, 21b, 22a and 22b form integral parts of the shutters 21 and 22. Each of these disc holders 21a, 21b, 22a and 22b has a downwardly tapered cross-sectional shape (or slope) to grip the outer edge of the disc 100 thereon when the shutters 21 and 22 are closed. By providing these slopes, the disc 100 can be held firmly and pressed against the shutters 21 and 22 while the shutters 21 and 22 are closed.

In this preferred embodiment, only the disc holder 21b is not secured to the shutter 21 but is connected thereto via an elastic portion 21d and is freely rotatable in the radial direction of the disc 100 (i.e., toward the center of the disc 100). Accordingly, the disc holders 21a, 21b, 22a and 22b can firmly hold a disc 100 having any of various diameters or thicknesses without allowing the disc 100 to move inconstantly.

A shutter opener/closer 22t for use to open and close the shutter 22 is formed as an integral part of the shutter 22 on the front side of the disc cartridge 313 opposite to the hole 22u, i.e., near the disc holder 22a. When the shutters 21 and 22 are attached to the cartridge body 10, the shutter opener/closer 22t is located under the bridge 11b and inside the head opening 11h. In opening or closing the shutters 21 and 22, the opener/closer 22t is moved along the bridge 11b inside the head opening 11h. In this arrangement, there is no need to separately provide any gap for allowing the shutter opener/closer 21t to move therein for the cartridge body 10. In other words, since there is no need to provide an extra gap for the cartridge body 10, no dust will enter the cartridge body 10 unnecessarily. Furthermore, the shutter opener/closer 22t can be disposed inside the head opening 11h of the cartridge body 10, thus providing a cartridge of a simplified good design.

Figure 66:
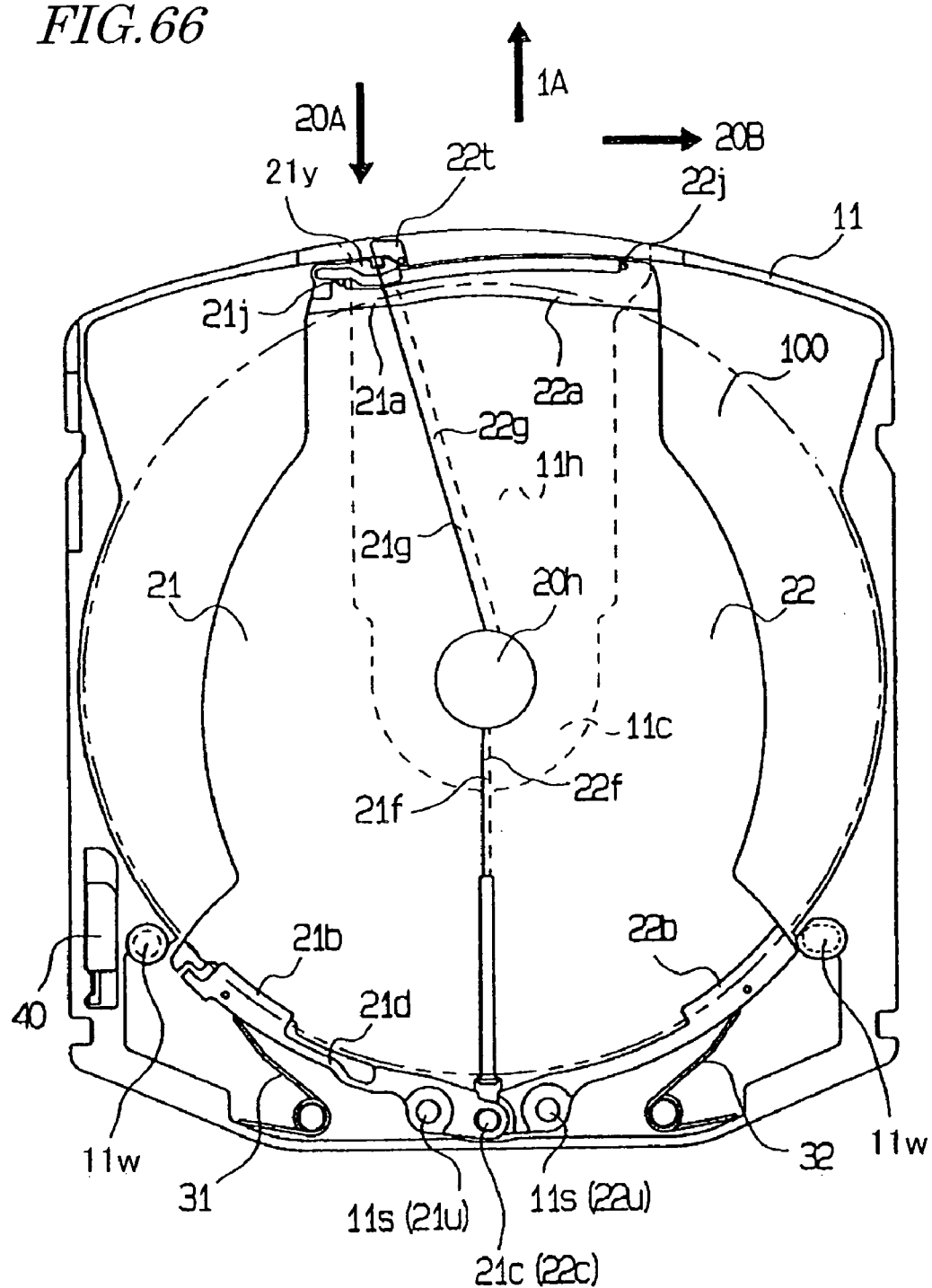
FIG. 66 is a schematic plan view illustrating a state of the disc cartridge shown in FIG. 64 in which its shutters are closed.

As shown in FIG. 66, when closed, the shutters 21 and 62 are not entirely in contact with each other along a line but have a plurality of contact portions that are not aligned with the line. More specifically, the shutters 21 and 22 have a first pair of contact portions 21f and 22f over the chucking opening 11c and a second pair of contact portions 21g and 22g over the head opening 11h, respectively. In this preferred embodiment, the contact portions 21f and 22f contact with each other along the centerline of the disc cartridge 313. On the other hand, the contact portions 21g and 22g contact with each other along a line that defines a predetermined angle (e.g., approximately 15 degrees to approximately 16 degrees) with the centerline of the disc cartridge 313. When the shutters 21 and 22 have such shapes, the shutter 22 can have an integral shape from the vicinity of the shutter opener/closer 22t and can exhibit sufficiently high rigidity.

Shutter springs 31 and 32 are provided outside of the disc storage portion 10d for the shutters 21 and 22, respectively. These springs 31 and 32 apply an elastic force to the shutters 21 and 22 in such a direction as to close the shutters 21 and 22. The shutter springs 31 and 32 are inserted into two spring poles 11t on the inner lower surface 11u of the cartridge body 10. In this preferred embodiment, torsion coil springs are used as the shutter springs 31 and 32. The torsion coil springs 31 and 32 preferably have the same shape to reduce the cost. Examples of other elastic members that may be used as the shutter springs 31 and 32 include compression springs, leaf springs and elastic resin springs.

As shown in FIG. 65, the disc cartridge 313 includes a write protector 40, which is inserted into a groove 11v of the lower shell 11 so as to slide along the groove 11v. By sliding the write protector 40, the convex portion 40t can be moved, thereby turning ON or OFF a sensor switch provided for a disc drive. In this manner, writing on the disc 100 may be either prohibited or allowed.

That is to say, this disc cartridge 313 is made up of the cartridge body 10 consisting of the lower and upper shells 11 and 12, disc stoppers 23, shutters 21 and 22, shutter springs 31 and 32, and write protector 40.

When the lower and upper shells 11 and 12 are joined together, the two shafts 11s of the lower shell 11 are engaged with two concave portions 12h of the upper shell 12. In this manner, the shafts 11s can have their rigidity increased. Thus, even when the shutters 21 and 22 are open, reduced torsion is created at the respective centers of rotation of the shutters 21 and 22 by the elastic force applied from the shutter springs 31 and 32. As a result, the shutters 21 and 22 can be opened to the intended angle.

As shown in FIG. 64, the upper surface of the cartridge body 10 (or the upper shell 12) has a label plane 10f, on which the user can note down the contents of the disc 100 stored, and an embossed arrow mark (or concave portion) 10a that indicates the direction (the arrow 1A) in which this disc cartridge 313 should be inserted into a disc drive.

The cartridge body 10 further includes two pairs of concave portions 10c and 10e on two of its side surfaces that are parallel to the direction 1A in which the disc cartridge 313 is inserted. These concave portions 10c and 10e may be engaged with convex portions provided for the disc drive or a disc changer to pull in and load, or position, the disc cartridge 313. The cartridge body 10 further includes a slit 10b on one of its side surfaces. The slit 10b may be used as a recess to identify the upside and downside of the disc cartridge 313 from each other when this disc cartridge 313 is inserted into the disc drive.

Figure 67:
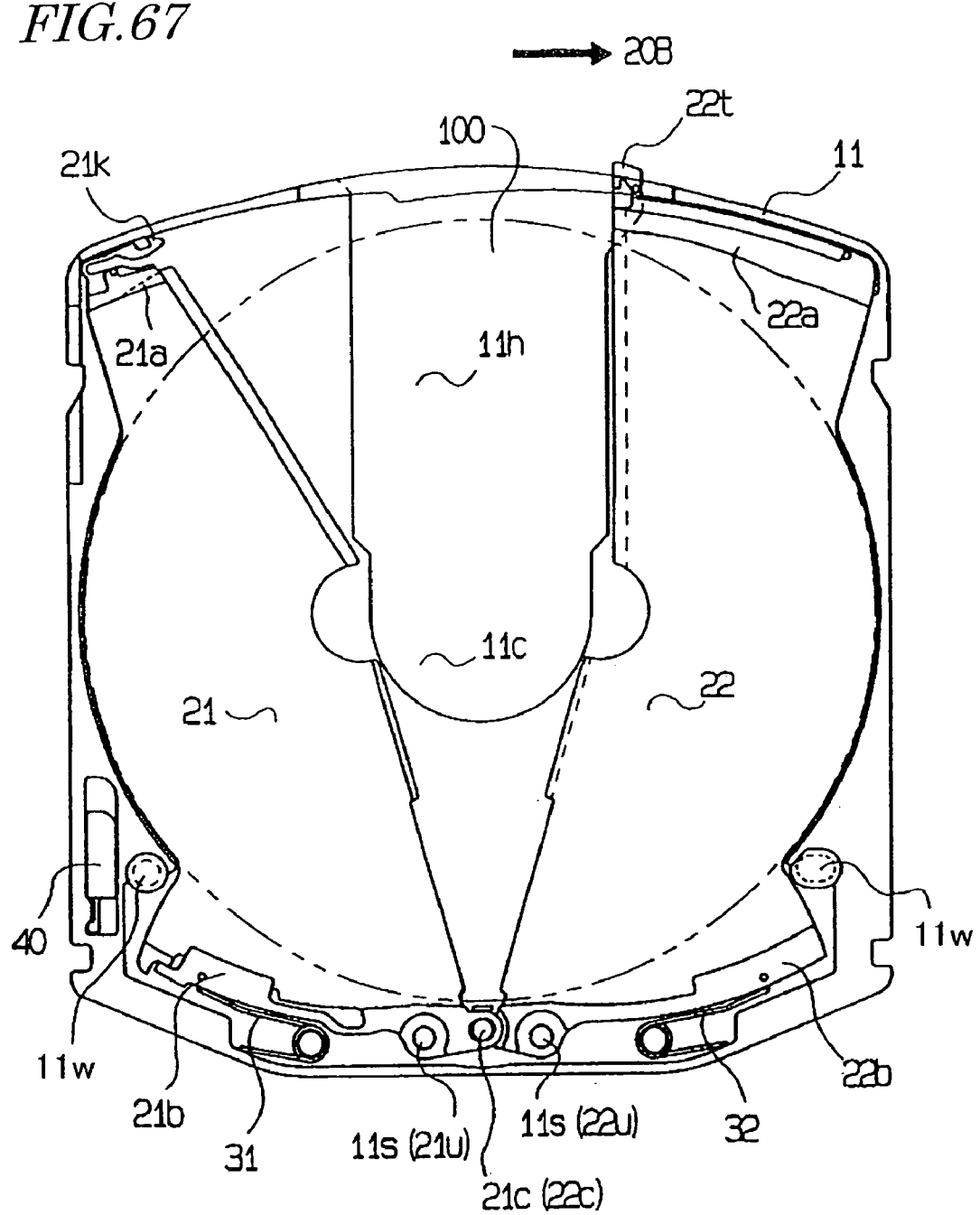
FIG. 67 is a schematic plan view illustrating a state of the disc cartridge shown in FIG. 64 in which its shutters are opened.
Figure 68:
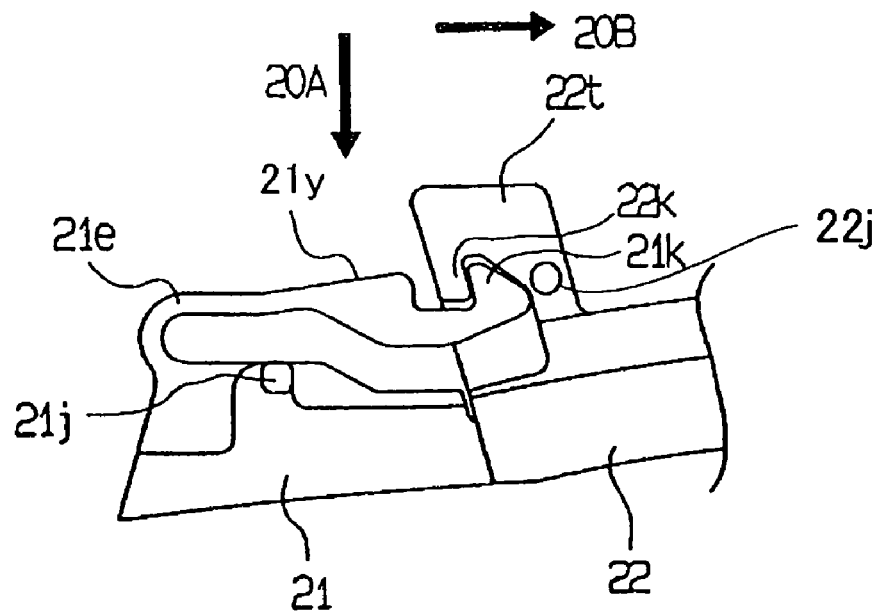
FIG. 68 is a plan view illustrating the details of the shutter locking mechanism of the disc cartridge shown in FIG. 64.
Figure 69:
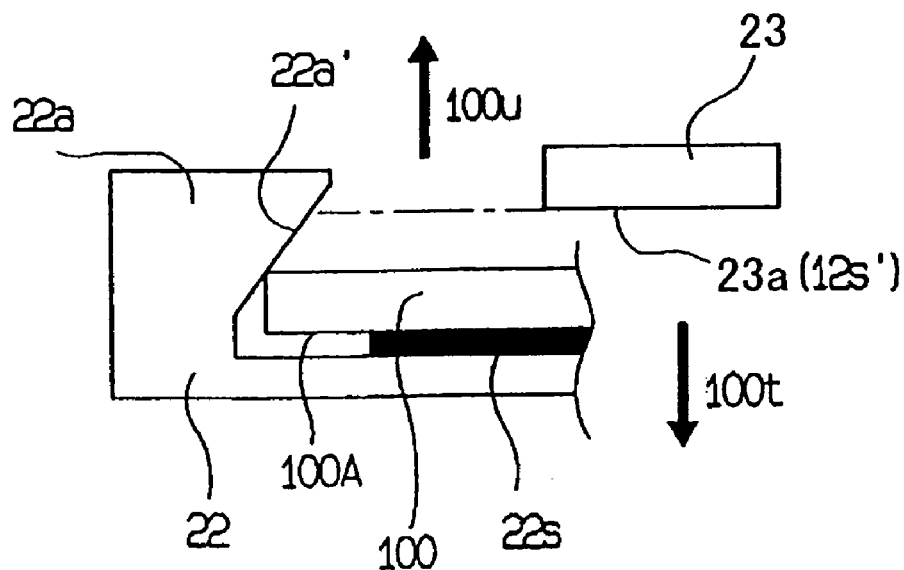
FIG. 69 is a cross-sectional view illustrating the details of the disc holder of the shutter in the disc cartridge shown in FIG. 64.

Hereinafter, it will be described with reference to FIGS. 66, 67, 68 and 69 how this disc cartridge 313 operates. FIGS. 66 and 67 are plan views illustrating the disc cartridge 313 in a state where its shutters 21 and 22 are closed and in a state where its shutters 21 and 22 are opened, respectively. FIG. 68 is a plan view illustrating the details of the shutter locking mechanism 20*k*. And FIG. 69 is a cross-sectional view illustrating the details of the disc holder 22*a* of the shutter 22.

First, a storage state of the disc cartridge 313, i.e., a state of the disc cartridge 313 that has not been loaded into a disc drive yet, will be described. In that state, the shutters 21 and 22 are closed as shown in FIG. 66. Also, as shown in FIG. 69, the slope 22*a*' of the disc holder 22*a* of the shutter 22 contacts with the outer edge of the disc 100, thereby holding the disc 100 thereon and pressing the disc 100 in the thickness direction 100*t*. As a result, the signal recording side 100A of the disc 100 is brought into contact with the sheet 22*p* of the shutter 22 and the disc 100 is fixed in the cartridge body 10. The three other disc holders 21*a*, 21*b* and 22*b* also have their own slopes 21*a*', 21*b*' and 22*b*', respectively. Thus, just like the disc holder 22*a*, these disc holders 21*a*, 21*b* and 22*b* also hold and fix the disc 100 in the cartridge body 10.

In this state, the signal recording side 100A of the disc 100 is in close contact with the sheets 21*p* and 22*p*. Thus, no dust will be deposited on the signal recording side 100A. Also, if the exposed side of the disc 100 is rotated manually or if the shutters 21 and 22 are opened or closed intentionally, then dust, finger marks or any other dirt that has adhered onto the signal recording side 100A of the disc 100 may be wiped away.

Furthermore, since the shutters 21 and 22 are locked by the locking mechanism 20*k*, the user cannot open the shutters 21 and 22 accidentally. Thus, the signal recording side 100A of the disc 100 can be protected from dust, finger marks or scratches.

Furthermore, the shutters 21 and 22 are provided with notches 21*h* and 22*h*, respectively. When the shutters 21 and 22 are closed, these notches 21 and 22 contact with each other to form a hole 20*h* just under the center hole 100*h* of the disc 100. In such a structure, even if this disc cartridge 313 is left with the upper side of the disc 100 exposed upward, dust will pass through the center hole 100*h* but will not be deposited on the shutters 21 and 22.

Figure 70:
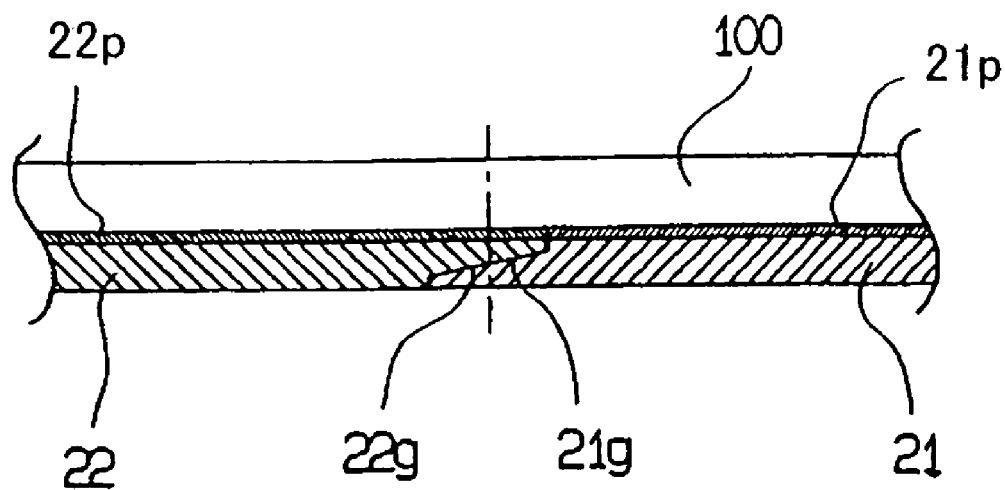
FIG. 70 is a cross-sectional view illustrating the shapes of a pair of contact portions between the two shutters of the disc cartridge shown in FIG. 64.
Figure 71:
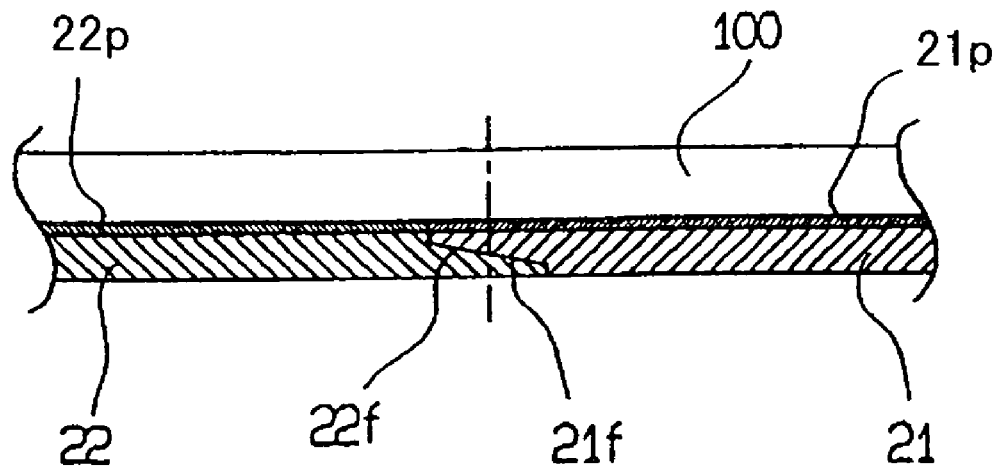
FIG. 71 is a cross-sectional view illustrating the shapes of another pair of contact portions between the two shutters of the disc cartridge shown in FIG. 64.

Also, while the shutters 21 and 22 are closed, at least the two pairs of contact portions 21*f*, 22*f* and 21*g*, 22*g* of the shutters 21 and 22, which are butted with each other over the chucking and head openings 11*h* and 11*c*, respectively, each overlap with each other in the thickness direction of the disc 100 as shown in FIGS. 70 and 71. Accordingly, even if the shutters 21 and 22 have been closed incompletely because a disc 100 having a non-regular diameter has been mounted on this disc cartridge 313 or because the shutters 21 and 22 have not been locked completely, no gap will be created between the contact portions of the shutters 21 and 22. Thus, even in such a situation, the disc 100 can also be protected from dust, finger marks or scratches.

Also, as shown in FIG. 70, the shutters 21 and 22 are in contact with each other around the head opening 11*h* so that the contact portion 22*g* of the shutter 22 is located over the contact portion 21*g* of the shutter 21. On the other hand, as shown in FIG. 71, the shutters 21 and 22 are in contact with each other around the chucking opening 11*c* so that the contact portion 21*f* of the shutter 21 is located over the contact portion 22*f* of the shutter 22. In this manner, the angle defined by one of multiple contact portions 21*f* or 21*g* or 22*f* or 22*g* of the shutter 21 or 22 may be different from the angle defined by another one of the contact portions 21*g* or 21*f* or 22*g* or 22*f* of the shutter 21 or 22. In such a structure, the two shutters 21 and 22 can be tightly engaged with each other in the thickness direction of the disc 100. Thus, neither the shutter 21 nor the shutter 22 will be raised unintentionally In addition, while the shutters 21 and 22 are closed, the contact portions of the shutters 21 and 22 can exhibit increased rigidity.

In this preferred embodiment, the shutters 21 and 22 have the contact portions 21*f*, 21*g*, 22*f* and 22*g* shown in FIGS. 70 and 71. However, the shutters 21 and 22 may also have contact portions at different locations or may contact with each other in a different manner. For example, the contact portions 21*g* and 22*g* shown in FIG. 70 may be shifted to a location around the head opening 11*h* or the contact portions 21*f* and 22*f* shown in FIG. 71 may be shifted to a location around the chucking opening 11*c*. Then, the shutters 21 and 22 can exhibit even higher rigidity when closed, and the gap between the contact portions can be further reduced, thus preventing the dust from entering the inside of the cartridge.

Also, while the shutters 21 and 22 are closed, convex portions 21*j* and 22*j*, provided for the shutters 21 and 22 as shown in FIG. 68, are in contact with two shutter stoppers 12*f* provided for the upper shell 12 as shown in FIG. 65. Accordingly, the shutters 21 and 22 have its rotation regulated and cannot move from their locked positions. As a result, the shutters 21 and 22 will not move inconstantly in their locked state. In addition, it is possible to prevent the user from breaking the shutters 21 and 22 intentionally. Furthermore, since the shutters 21 and 22 have their rotation regulated, the shutter opener/closer 22*t* is not displaced. Accordingly, when this disc cartridge 313 is loaded into a disc drive, the shutter opener/closer 22*t* can be engaged with the shutter opening/closing mechanism of the disc drive just as intended.

Hereinafter, it will be described how this disc cartridge 313 is loaded into the disc drive. As shown in FIG. 66, when the disc cartridge 313 is inserted into the disc drive in the direction 1A, the cartridge positioning pins of the disc drive engage with the positioning holes 11*w* of the disc cartridge 313, thereby determining the horizontal and vertical positions of the disc cartridge 313 inside the disc drive.

Next, a shutter opener/closer of the shutter opening/closing mechanism provided inside the disc drive engages with the shutter opener/closer 22*t* shown in FIG. 68. At the same time, an unlocking member of the shutter opening/closing mechanism presses an unlocking portion 21*y*, which is connected to the shutter 21 by way of an elastic portion 21*e*, in the direction 20A. As a result, the locking protrusion 21*k* of the locking mechanism 20*k* is disengaged from the locking engaging portion 22*k* thereof, thereby unlocking the shutters 21 and 22 from each other. In such a state, the shutter opener/closer of the shutter opening/closing mechanism moves the shutter opener/closer 22*t* in the direction indicated by the arrow 20B. Consequently, the shutter 21 rotates on the shaft 11*s* while dominating the elastic force applied from the shutter spring 31 as shown in FIG. 67. Synchronously with the movement of the shutter 21, the other shutter 22, which is interlocked with the former shutter 21 via the interlocking mechanism 20*c*, also rotates while dominating the elastic force applied from the shutter spring 32. Accordingly, when the shutter 21 has been opened, the shutter 22 will have also been opened.

By the time the shutters 21 and 22 are opened completely, the locking protrusion 21*k* and the unlocking portion 21*y* will have returned to their home positions along with the elastic portion 21*e*. Thus, the elastic portion 21*e* made of a resin is not deformed plastically. In this manner, the signal recording side 100A of the disc 100 is exposed through the chucking and head openings 11*c* and 11*h*. Also, the disc 100, which has been held by the disc holders 21*a*, 21*b*, 22*a* and

22b, is released therefrom as the shutters 21 and 22 rotate. As a result, the disc 100 is now freely rotatable inside the disc storage portion 10d.

Subsequently, the spindle motor and the turntable of the disc drive enter the chucking opening 11c and the head of the disc drive enters the head opening 11h. Consequently, the disc drive is now ready to perform a read or write operation on the disc 100 loaded.

As described above, only by getting the locking protrusion 21k pressed externally by a protrusion, for example, in the direction indicated by the arrow 20A and disengaged from the locking engaging portion 22k while pressing the shutter opener/closer 22t in the direction indicated by the arrow 20B at the same time, the shutters 21 and 22 can be rotated to expose the chucking and head openings 11c and 11h and the disc 100 can be released from the disc holders 21a, 21b, 22a and 22b. Thus, it is possible to prevent the user from opening the shutters 21 and 22 or removing the disc 100 accidentally. As a result, the disc 100 can be protected from dust, finger marks or scratches.

Hereinafter, it will be described how the disc cartridge 313 is ejected from the disc drive. When an ejecting mechanism of the disc drive starts to operate, the shutter opener/closer of the disc drive, which has been engaged with the shutter opener/closer 22t, disengages itself from the shutter opener/closer 22t. As a result, the shutters 21 and 22 cannot be kept opened and start to rotate in the opposite direction. That is to say, the shutters 21 and 22, to which an elastic force is being applied from the shutter springs 31 and 32 in such a direction as to close the shutters 21 and 22, start to close themselves. Consequently, the shutters 21 and 22 close up the head and chucking openings 11h and 11c. In this case, the shutters 21 and 22 are locked to each other by the locking mechanism 20k. In the meantime, the disc 100 gets held by the disc holders 21a, 21b, 22a and 22b again to recover its original state. Then, the disc cartridge 313 is ejected from the disc drive.

In the disc cartridge 313, the disc contact portion 23a of the disc stoppers 23 provided for the cartridge body 10 and the disc contact portion 12s' of the upper shell 12 are located at the same vertical level as shown in FIG. 69. Also, the top of the slopes 21a', 21b', 22a' and 22b' of the disc holders 21a, 21b, 22a and 22b of the shutters 21 and 22 is higher in level than the bottom of the disc contact portions 23a and 12s' in the direction 100u in which the disc 100 is movable. Accordingly, even if the disc cartridge 313 is loaded into a disc drive either vertically or upside down, the shutters 21 and 22 still can hold the disc 100 firmly thereon. For example, if the disc cartridge 313 is loaded upside down into a disc drive, the disc 100 that is no longer chucked contacts with the disc contact portions 23a and 12s' and still can maintain its horizontal position. And when the shutters 21 and 22 are closed in such a state, the disc 100 contacts with the slopes 21a', 21b', 22a' and 22b' this time. Then, the disc 100 will slide along the slopes 21a', 21b', 22a' and 22b' smoothly to be held firmly by the disc holders 21a, 21b, 22a and 22b.

In the disc cartridge of the thirteenth preferred embodiment described above, the cartridge body thereof has a disc window and covers only one side of the disc. Also, the disc cartridge includes a shutter opener/closer inside a head opening of the cartridge body, and therefore, there is no need to provide an unnecessary gap for the cartridge body. As a result no dust will enter the inside of the cartridge body.

In addition, in the disc cartridge of this thirteenth preferred embodiment, the two shutters thereof are made to contact with each other along the centerline of the disc over the chucking opening and along a line, which defines a predetermined angle with the centerline, over the head opening. Accordingly, these shutters can have an integrated structure from the vicinity of the shutter opener/closer and can exhibit sufficiently high rigidity.

Furthermore, since the two shutters are locked or unlocked to/from each other, the user cannot open or close the shutters accidentally. Thus, the disc can be protected from dust, finger marks or scratches.

Moreover, at least one of multiple disc holders of the disc cartridge is not secured to its associated shutter but is just connected thereto via an elastic portion. As an elastic force is also applied from a shutter spring to that disc holder, the disc holder can be deformed sufficiently elastically in the disc radial direction. For that reason, even if a disc of a non-regular size has been mounted on this disc cartridge, the disc cartridge can also hold such a disc firmly without allowing it to move inconstantly.

Embodiment 14

Hereinafter, a disc cartridge 314 according to a fourteenth specific preferred embodiment of the present invention will be described with reference to FIGS. 72 through 81. In FIGS. 72 through 81, each member of the disc cartridge 314 of the fourteenth preferred embodiment, having substantially the same function as the counterpart of the disc cartridge 313 of the thirteenth preferred embodiment described above, is identified by the same reference numeral.

Figure 72:
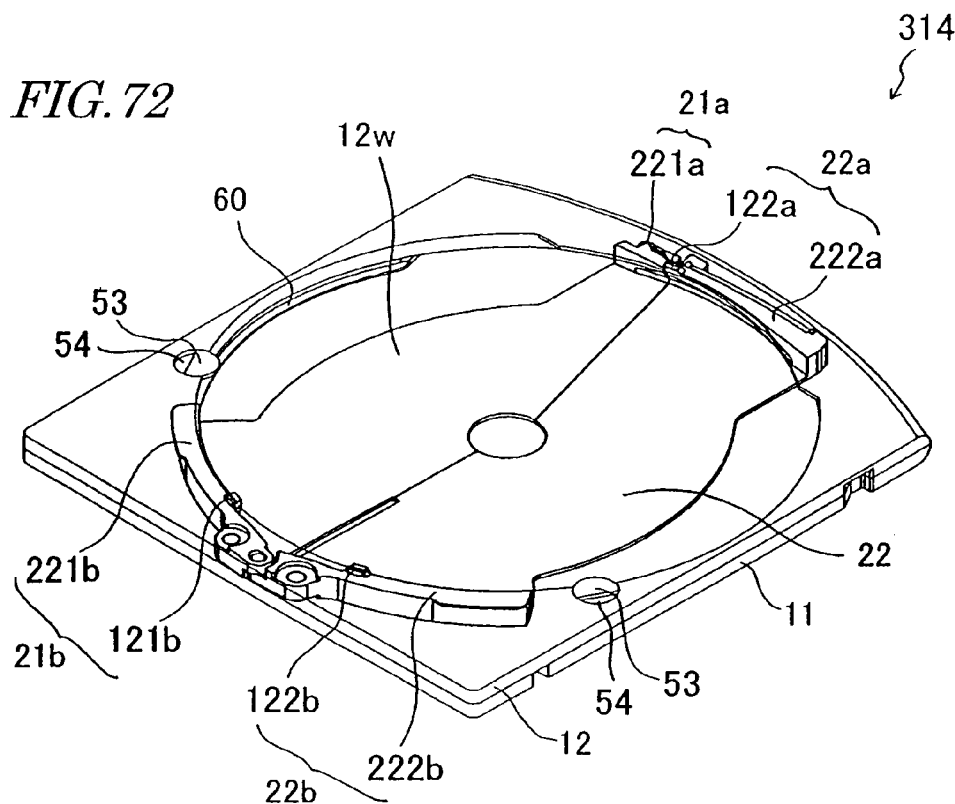
FIG. 72 is a perspective view illustrating an overall configuration for a disc cartridge according to a fourteenth specific preferred embodiment of the present invention.
Figure 76:
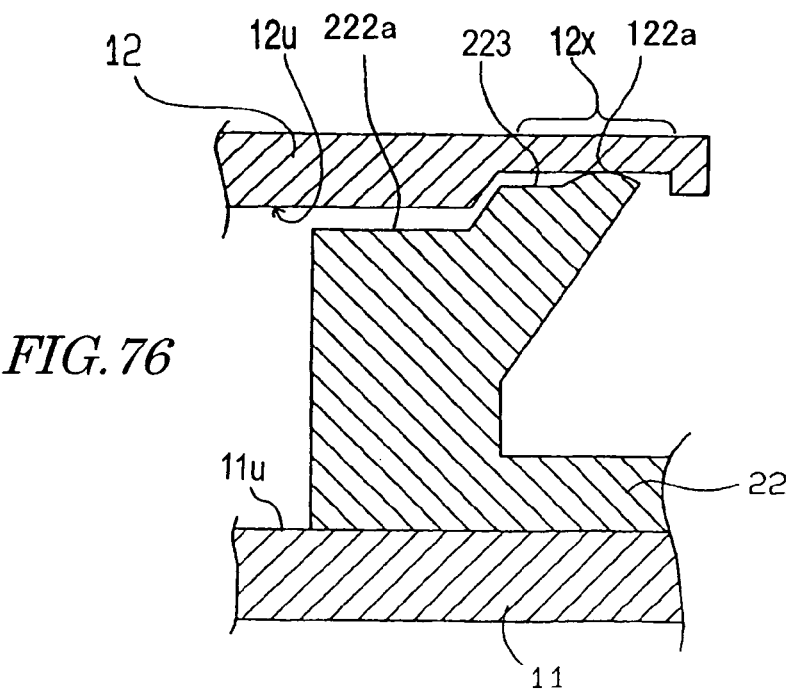
FIG. 76 is a cross-sectional view illustrating the disc holder and its surrounding members of the disc cartridge shown in FIG. 72 to a larger scale.
Figure 77:
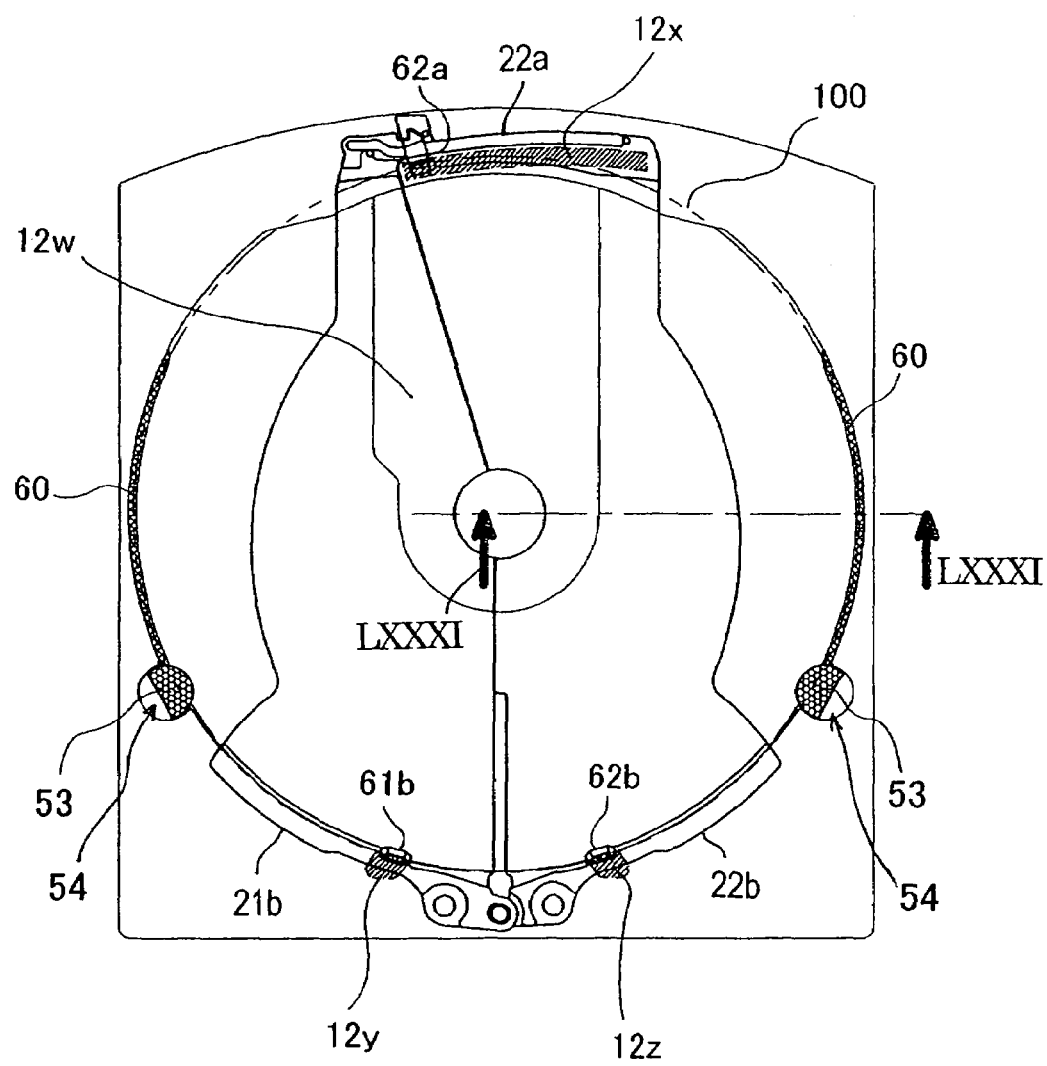
FIG. 77 is a schematic plan view illustrating a state of the disc cartridge shown in FIG. 72 in which its shutters are closed.
Figure 78:
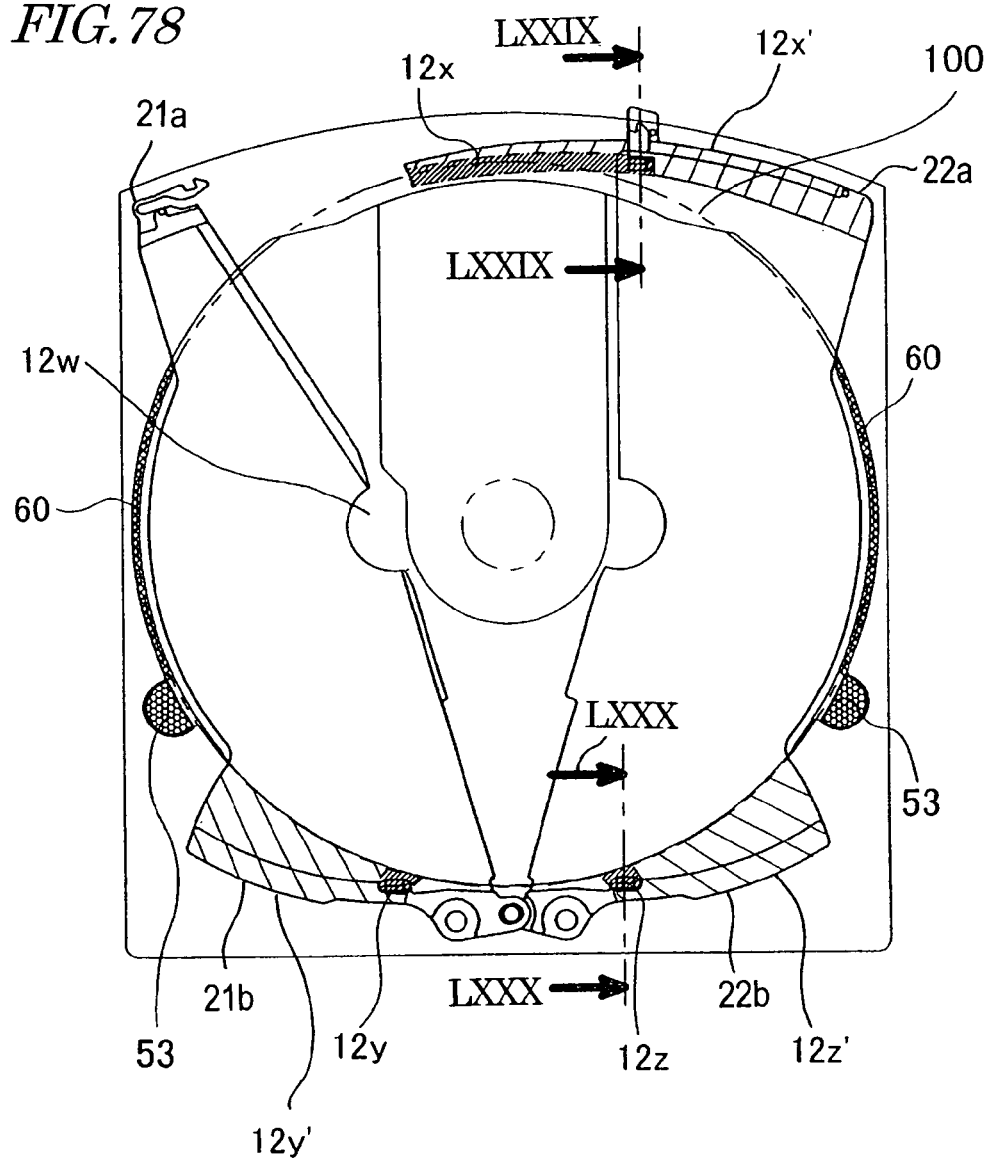
FIG. 78 is a schematic plan view illustrating a state of the disc cartridge shown in FIG. 72 in which its shutters are opened.

The disc cartridge 314 of the fourteenth preferred embodiment is different from the disc cartridge 313 of the thirteenth preferred embodiment described above in the respective shapes of the inner upper surface 12u of the cartridge body 10 (see FIG. 79), the disc holders 21a, 21b, 22a and 22b (see FIGS. 72 through 79) and the disc stoppers 53 (see FIGS. 72, 77 and 78). In addition, the disc cartridge 314 further includes a disc supporting portion 60 (see FIGS. 72 and 81). Thus, the following description of the disc cartridge 314 of the fourteenth preferred embodiment of the present invention will be focused on these differences.

Figure 73:
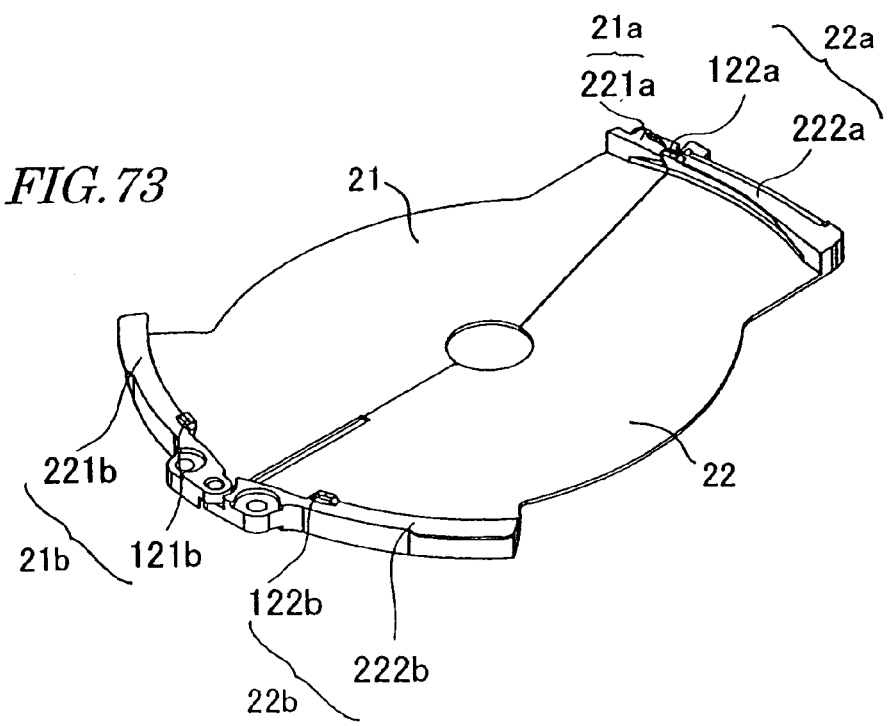
FIG. 73 is a perspective view illustrating the shutters of the disc cartridge shown in FIG. 72.
Figure 79:
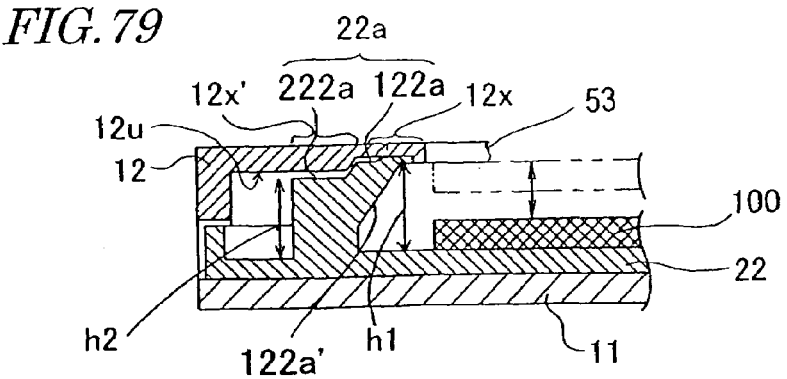
FIG. 79 is a cross-sectional view of the disc cartridge shown in FIG. 72 taken along the line LXXIX—LXXIX shown in FIG. 78.

In the disc cartridge 313 of the thirteenth preferred embodiment described above, the respective tops of the disc holders 21a, 21b, 22a and 22b thereof are located at substantially the same vertical levels along the outer periphery of the disc 100. In contrast, in the disc cartridge 314 of this fourteenth preferred embodiment, protrusions are formed on predetermined areas of the disc holders 21b, 22a and 22b as shown in FIGS. 73 and 79. More specifically, as shown in FIG. 79, each of these three disc holders 21b, 22a and 22b includes: a first portion 121b, 122a or 122b that has a protrusion thereon and has a first height h1 as measured from the upper surface of the shutters 21 and 22; and a second portion 221b, 222a or 222b that has a second height h2 as measured from the upper surface of the shutters 21 and 22. The other disc holder 21a consists of a second portion 221a that has the second height h2.

The first height h1 is greater than the second height h2 and is approximately equal to the height (i.e., the vertical level of the upper surface) of the disc holders 21a, 21b, 22a and 22b of the disc cartridge 313 of the thirteenth preferred embodiment described above. That is to say, the disc holders 21a, 21b, 22a and 22b of this fourteenth preferred embodiment are lower than the counterparts of the disc cartridge 313 of the thirteenth preferred embodiment except their first portions 121b, 122a and 122b.

Figure 74:
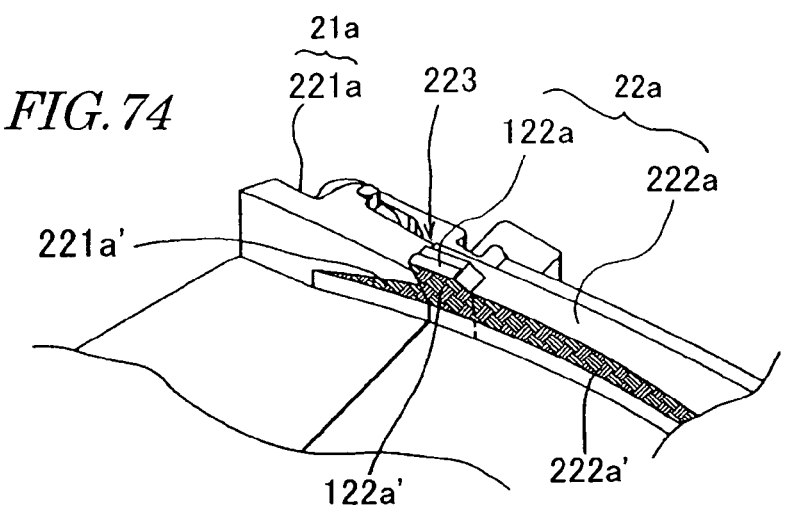
FIG. 74 is a perspective view illustrating the disc holders and their surrounding members of the disc cartridge shown in FIG. 72 to a larger scale.
Figure 75:
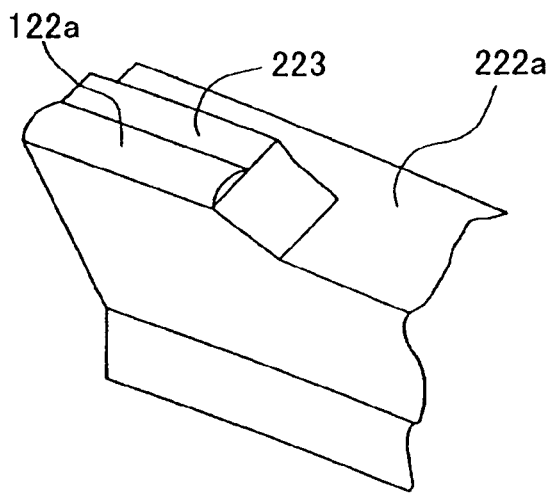
FIG. 75 is a perspective view illustrating the disc holder and its surrounding portion of the disc cartridge shown in FIG. 72 to a larger scale.

Also, as shown in FIGS. 74 and 75, a stepped protrusion 223 is formed on the upper surface of the first portion 122a of the disc holder 22a. The stepped protrusion 223 has two vertical levels, the higher one of which is closer to the disc 100 mounted. A similar stepped protrusion is also formed on the upper surface of the first portion 121b of the disc holder 21b and on the upper surface of the first portion 122b of the disc holder 22b.

As the shutter 21 or 22 is getting closed, the first portion 121b, 122a or 122b of the disc holder 21b, 22a or 22b contacts with the disc 100 earlier than any other portion thereof (i.e., earlier than the second portion 221b, 222a or 222b thereof).

Figure 80:
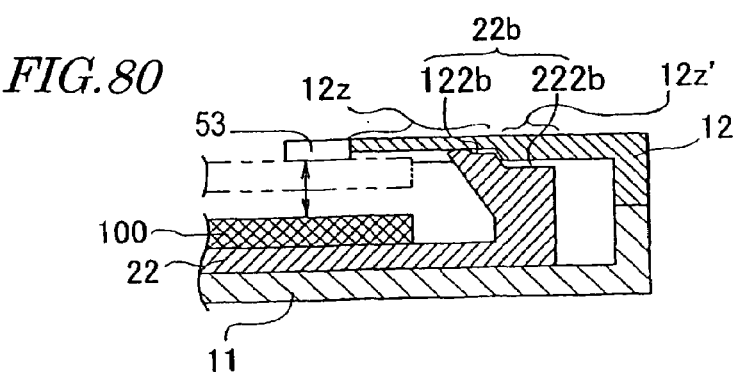
FIG. 80 is a cross-sectional view of the disc cartridge shown in FIG. 72 taken along the line LXXX—LXXX shown in FIG. 78.

The disc holders 21a, 21b, 22a and 22b move as the shutters 21 and 22 are opened or closed. FIG. 77 illustrates the respective positions of the disc holders 21a, 21b, 22a and 22b while the shutters 21 and 22 are closed. On the other hand, FIG. 78 illustrates the respective positions of the disc holders 21a, 21b, 22a and 22b while the shutters 21 and 22 are opened. FIGS. 79 and 80 are cross-sectional views illustrating portions of the disc cartridge 314 that are respectively taken along the lines LXXIX—LXXIX and LXXX—LXXX shown in FIG. 78.

As shown in FIGS. 77, 78 and 79, the regions 12y, 12× and 12z on the inner upper surface 12u of the cartridge body 10, through which the first portions 121b, 122a and 122b of the disc holders 21b, 22a and 22b pass as the shutters 21 and 22 are opened or closed, are recessed. On the other hand, the regions 12y', 12×' and 12z', through which the second portions 221b, 222a and 222b thereof pass, are not recessed. Accordingly, the upper shell 12 is thinner in the regions 12x, 12y and 12z than in the regions 12×', 12y' and 12z'.

As shown in FIGS. 76 and 79, the top of the first portion 122a of the disc holder 22a is located at a vertical level higher than the bottom of the disc stopper 53. Also, the top of the first portion 122a of the disc holder 22a is received by the recessed first region 12x on the inner upper surface 12u. Since the stepped protrusion 223 is formed at the top of the first portion 122a, just a part of the upper surface of the first portion 122a is in contact with the inner upper surface 12u. On the other hand, the second portion 222a of the disc holder 22a is not in contact with the inner upper surface 12u.

To open and close the shutters 21 and 22 smoothly, the friction caused by the contact between the top of the first portion 122a of the disc holder 22a and the inner upper surface 12u is preferably small. For that purpose, the top of the first portion 122a of the disc holder 22a has an arc-shaped cross section when taken in the radial direction of the disc 100. This stepped protrusion 223 is provided to compensate for shortage in mechanical strength, which would be caused by a sharpened top of the first portion 122a, and to make that top moldable more accurately and more easily.

As shown in FIG. 80, the top of the first portion 122b of the disc holder 22b is also located at a vertical level higher than the bottom of the disc stopper 53. And the top of the first portion 122b of the disc holder 22b is received by the recessed first region 12z on the inner upper surface 12u. Although not shown, the top of the first portion 121b of the disc holder 21b is also located at a vertical level higher than the bottom of the disc stopper 53, and is received by the recessed first region 12y on the inner upper surface 12u.

As described above, in the disc cartridge 314 of the fourteenth preferred embodiment, the regions 12x, 12y and 12z on the inner upper surface 12u are recessed to receive portions of the disc holders 22a, 21b and 22b, respectively. Thus, the thickness of the disc cartridge 314 can be reduced by the depth of those recessed regions 12x, 12y and 12z.

Even if the disc cartridge 314 having such a structure is loaded into a disc drive either vertically or upside down, the disc 100 that is no longer chucked never fails to contact with the slope 122a' of the first portion 122a of the disc holder 22a as shown in FIG. 79 as the shutters 21 and 22 are closed. Thereafter, the disc 100 will slide smoothly along the slope 122a' to contact with the slope 222a' of the second portion 222a of the disc holder 22a (see FIG. 74). At the same time, the disc 100 also contacts with the slope 221a' of the second portion 221a of the disc holder 21a. In this manner, the disc holders 21a and 22a hold the disc 100 thereon cooperatively. The two other disc holders 21b and 22b also hold the disc 100 thereon through similar operations. Accordingly, although this disc cartridge 314 has a reduced thickness, the disc cartridge 314 can close the shutters 21 and 22 in any position and can hold the disc 100 thereon just as intended.

If this disc cartridge had its thickness just reduced without changing the shapes of the disc holders (or using the disc holders of the thirteenth preferred embodiments as they are), the regions 12x, 12×', 12y, 12y', 12z and 12z' on the inner upper surface 12u, through which the disc holders 22a, 21b and 22a pass, should all be recessed as can be seen from FIG. 78. In that case, the upper shell 12 would have a reduced thickness over a rather wide area and such a disc cartridge would have a decreased mechanical strength. In contrast, the disc cartridge 314 of this fourteenth preferred embodiment can have its thickness reduced without decreasing its mechanical strength because the regions 12x, 12y and 12z with a reduced thickness are relatively narrow.

In the preferred embodiment described above, three protrusions are provided for three of the four disc holders. However, the number of protrusions to be provided is changeable with the number of disc holders or the shapes of the shutters.

The disc cartridge 314 of the fourteenth preferred embodiment is also different from the disc cartridge 313 of the thirteenth preferred embodiment in the shape of the disc stoppers 53.

As shown in FIG. 72, the disc stoppers 53 have the shape of a notched circular plate. Specifically, notches 54 having substantially the same shape as the disc stoppers 53 are provided along the disc window 12w of the upper shell 12 and the disc stoppers 53 are engaged in a rotatable state with the notches 54. As shown in FIG. 77, the disc stoppers 53 are held in such a manner as to partially protrude into the disc window 12w of the upper shell 12 when rotated. Also, as shown in FIG. 78, by rotating the disc stoppers 53, the disc stoppers 53 may also be held in such a manner as to be stored inside the upper shell 12 and not to protrude into the disc window 12w. If the disc stoppers 53 are easily disengaged from the notches 54 unintentionally, then the side surfaces of the disc stoppers 53 and the notches 54 of the upper shell 12 may have mutually engaging concave and convex portions, for example.

In such a structure, the thickness of the disc stoppers 53 may be substantially equal to that of the upper part of the upper shell 12. Thus, the disc cartridge 314 can have a reduced overall thickness.

Figure 81:
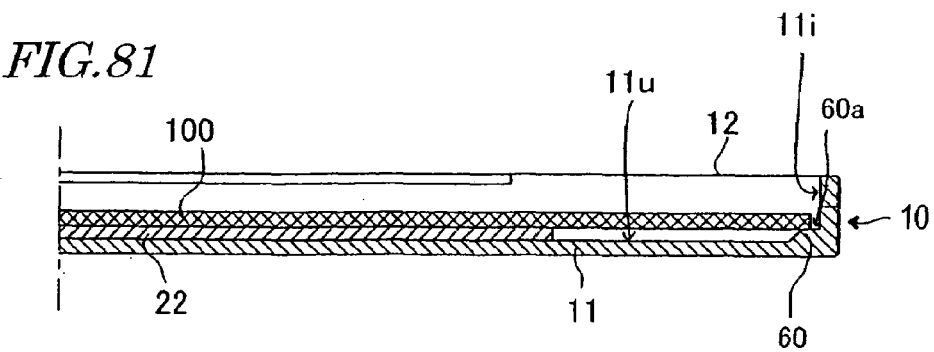
FIG. 81 is a cross-sectional view of the disc cartridge shown in FIG. 72 taken along the line LXXXI—LXXXI shown in FIG. 77.

The disc cartridge 314 of this fourteenth preferred embodiment is also characterized by including a disc supporting portion 60 at the bottom of the inner periphery of the disc storage portion. The disc supporting portion 60 is located between the inner lower surface 11u and the inner side surface 11i of the cartridge body 10 as shown in FIGS. 72, 77, 78 and 81. As shown in FIG. 81, the disc supporting portion 60 has an upper surface 60a, which is parallel to the inner lower surface 11u of the cartridge body 10.

As also shown in FIG. 81, while the shutters 21 and 22 are closed and the disc 100 is held by the disc holders, the outer edge and its surrounding portion of the signal recording side 100A of the disc 100 are in contact with the upper surface 60a of the disc supporting portion 60. Thus, no dust will be deposited on the signal recording side 100A of the disc 100 or accumulated on the inner lower surface 11u of the cartridge body 10.

Figure 82:
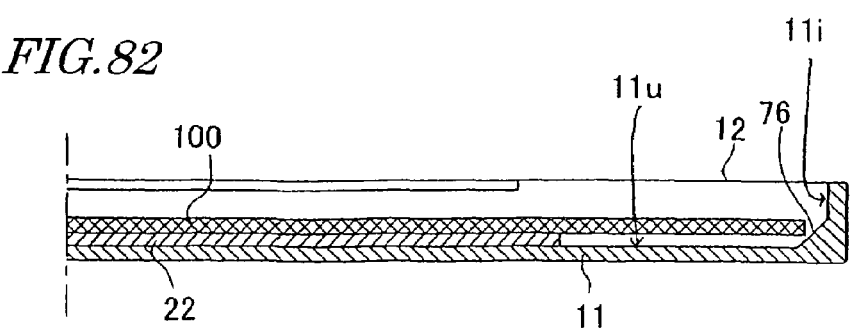
FIG. 82 is a cross-sectional view illustrating a modified example of the disc supporting portion.

Alternatively, the disc supporting portion 60 may have any shape other than that shown in FIG. 81. For example, as shown in FIG. 82, a disc supporting portion 76 having an upwardly tapered cross section may be formed between the inner lower surface 11u and the inner side surface 11i of the cartridge body 10. In that case, while the shutters 21 and 22 are closed and the disc 100 is held by the disc holders, the outer edge of the signal recording side 100A of the disc 100 is in contact with the disc supporting portion 76.

Embodiment 15

Hereinafter, a disc cartridge 315 according to a fifteenth specific preferred embodiment of the present invention will be described with reference to FIGS. 83 through 87. In FIGS. 83 through 87, each member of the disc cartridge 315 of the fifteenth preferred embodiment, having substantially the same function as the counterpart of the disc cartridge 314 of the fourteenth preferred embodiment described above, is identified by the same reference numeral.

Figure 83:
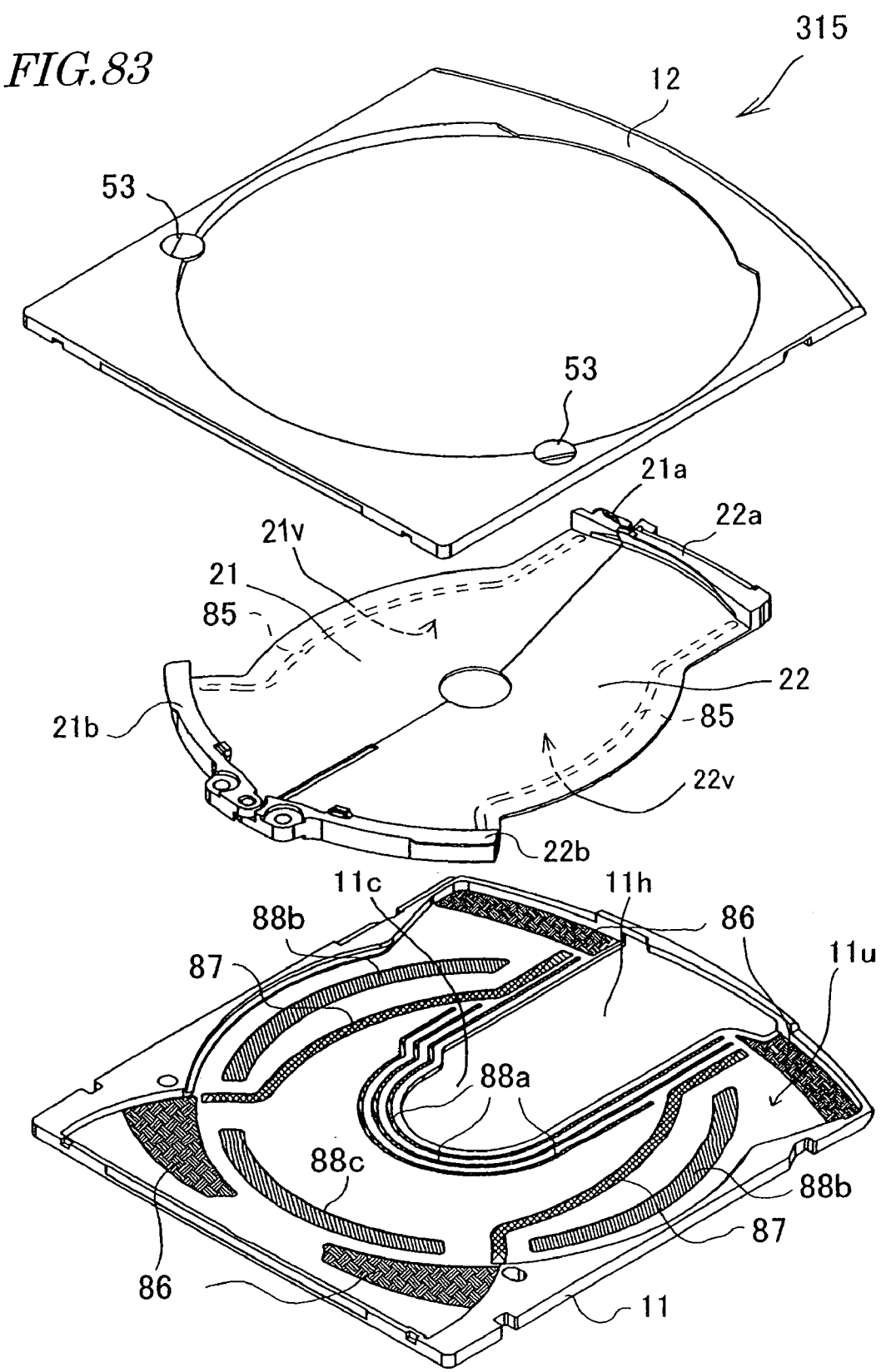
FIG. 83 is an exploded perspective view of a disc cartridge according to a fifteenth specific preferred embodiment of the present invention.

As shown in FIG. 83, unlike the disc cartridge 314 of the fourteenth preferred embodiment described above, the disc cartridge 315 of this fifteenth preferred embodiment includes four types of recesses 85, 86, 87 and 88a through 88c. The recesses 85 are formed on the respective lower surfaces 21v and 22v of the shutters 21 and 22. The other three types of recesses 86, 87 and 88a through 88c are formed on the inner lower surface 11u of the cartridge body 10 that contacts with the shutters 21 and 22. These four types of recesses will be described below one by one. Where the disc cartridge 315 is supposed to hold a disc having a diameter of about 12 cm, these recesses may have a depth of about 0.1 mm to about 0.3 mm, for example.

Figure 84:
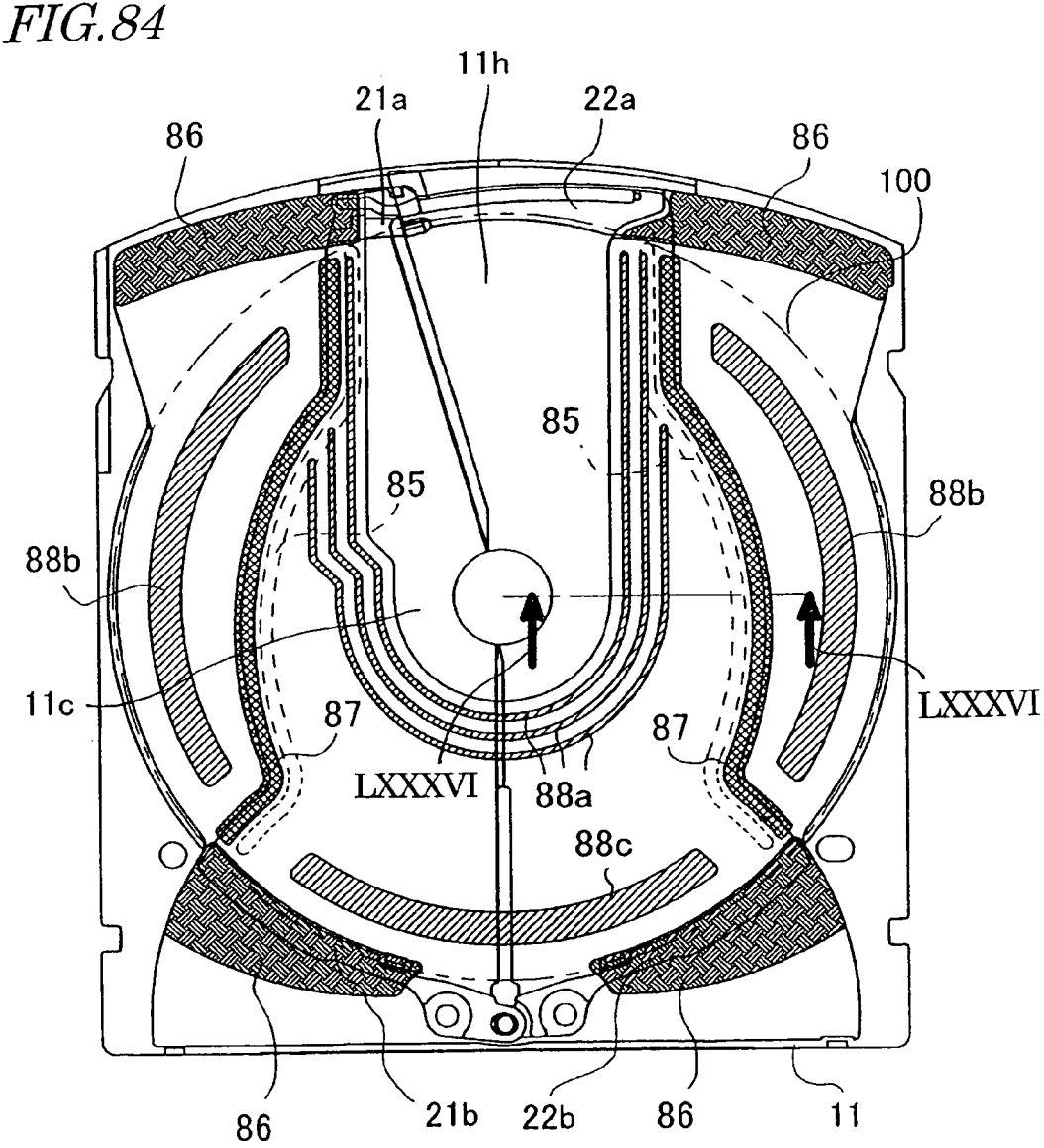
FIG. 84 is a schematic plan view illustrating a state of the disc cartridge shown in FIG. 83 in which its shutters are closed.
Figure 85:
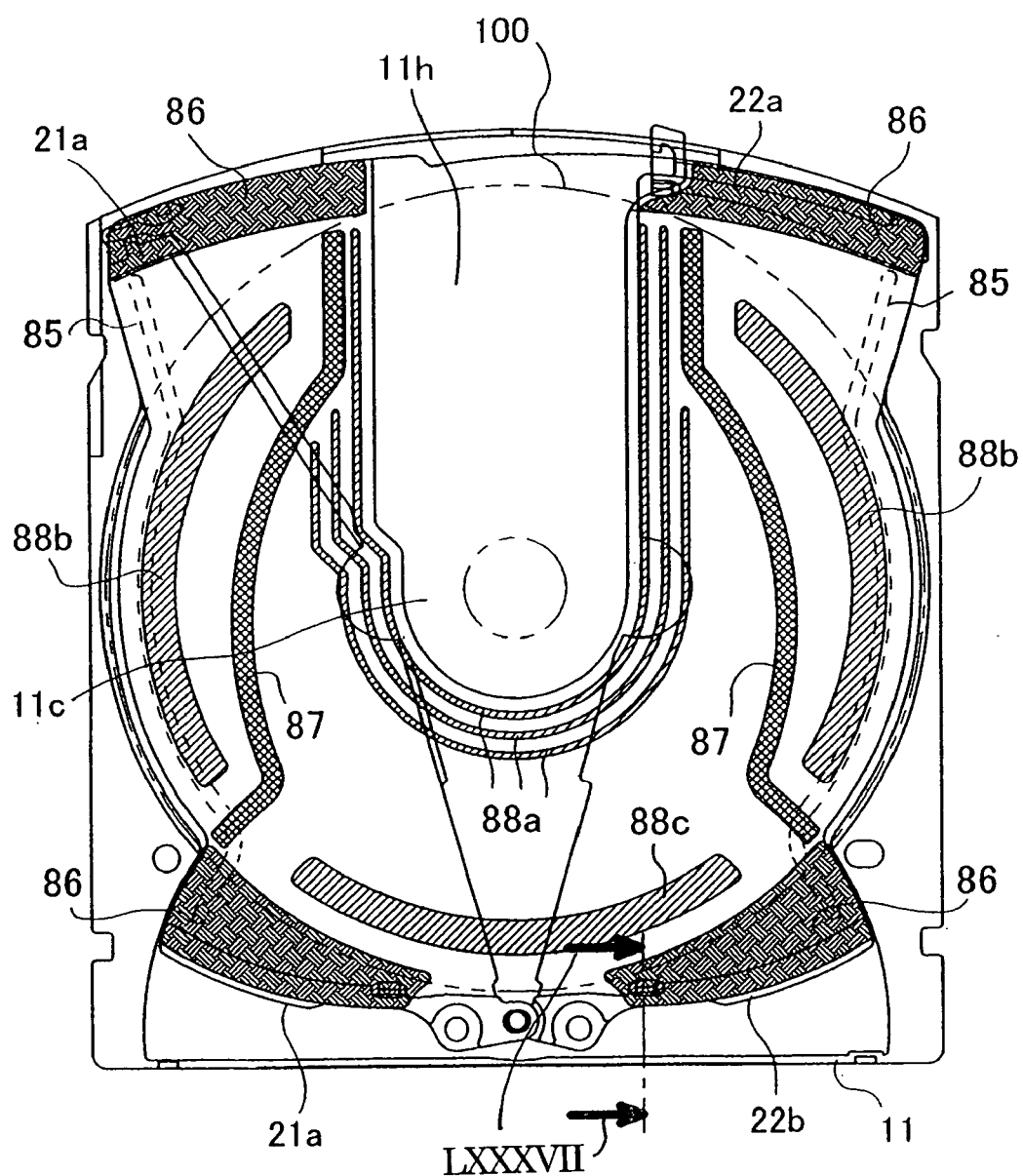
FIG. 85 is a schematic plan view illustrating a state of the disc cartridge shown in FIG. 83 in which its shutters are opened.

As can be seen from FIGS. 84 and 85 illustrating two states of the disc cartridge 315 in which its shutters 21 and 22 are closed and opened, respectively, the first type of recesses 86 are formed in respective regions of the inner lower surface 11u that contact with the disc holders 21a, 21b, 22a and 22b of the shutters 21 and 22 when the shutters 21 and 22 are opened or closed.

The disc holders 21a, 21b, 22a and 22b are sandwiched between the upper and lower shells 12 and 11 with almost no gap left between them. Accordingly, when respective members of the disc cartridge 315 are assembled together or if any of those members of the disc cartridge 315 has a size that is greatly different from the designed one, the disc holders 21a, 21b, 22a and 22b might contact with the upper and lower shells 12 and 11. In that case, excessive friction would be created between the disc holders 21a, 21b, 22a and 22b and the upper or lower shell 12 or 11. As a result, the shutters 21 and 22 might be unable to be opened or closed so easily or dust might be stirred up due to the excessive friction.

However, by providing the first type of recesses 86, gaps are provided under the disc holders 21a, 21b, 22a and 22b, thus reducing such unwanted friction. Then, the shutters 21 and 22 can always be opened or closed smoothly and no dust will be stirred up due to the friction.

Figure 86:
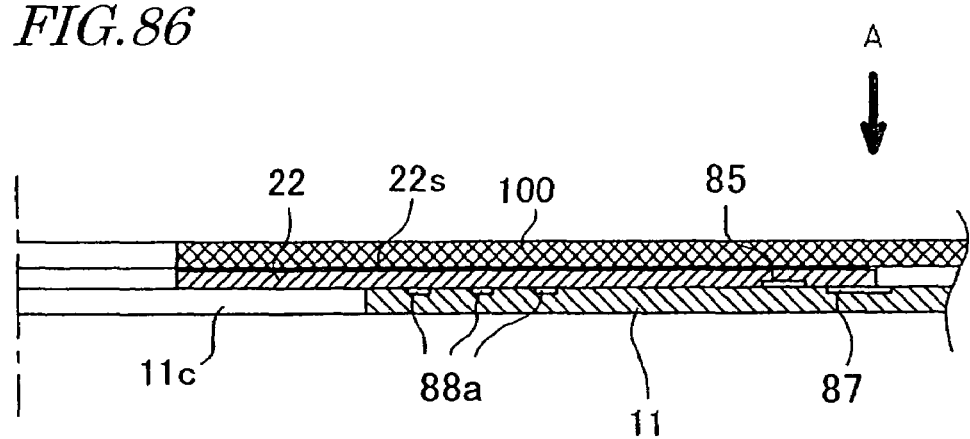
FIG. 86 is a cross-sectional view of the disc cartridge shown in FIG. 83 taken along the line LXXXVI—LXXXVI shown in FIG. 84.
Figure 87:
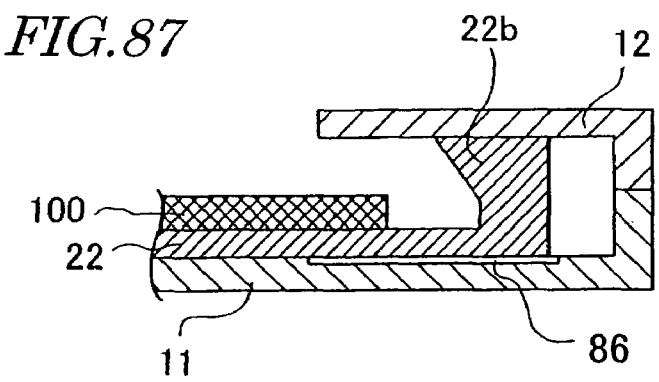
FIG. 87 is a cross-sectional view of the disc cartridge shown in FIG. 83 taken along the line LXXXVII—LXXXVII shown in FIG. 85.

The second type of recesses 87 are formed in those regions of the inner lower surface 11u where the respective outer edges of the shutters 21 and 22 are located while the shutters 21 and 22 are closed. As shown in FIGS. 84 and 86, these recesses 87 preferably extend along the boundary that defines the outer edges of the shutters 21 and 22 on the inner lower surface 11u and are preferably present both inside and outside of the boundary.

This disc cartridge 315 is supposed to store the disc 100 therein with one side thereof exposed, and the user can press the disc 100 in the direction indicated by the arrow A in FIG. 86. To protect the signal recording side 100A of the disc 100, the respective upper surfaces of the shutters 21 and 22 are covered with the nonwoven fabrics 21s and 22s but their outer edges are not completely covered with the nonwoven fabrics 21s and 22s. Accordingly, if the disc 100 is pressed in the direction A, then the outer edges of the shutters 21 and 22 contact with the signal recording side 100A of the disc 100, thus possibly scratching the signal recording side 100A as shown in FIG. 86.

However, if the second type of recesses 87 are provided, the shutters 21 and 22 may be deformed in such a manner that the outer edges thereof are partially forced into the second type of recesses 87. Then, the pressing force can be dispersed, and the outer edges of the shutters 21 and 22 will not be pressed against the signal recording side 100A of the disc 100 too strongly.

The third type of recesses include: recesses 88a that are formed on the inner lower surface 11u so as to surround the chucking and head openings 11c and 11h; recesses 88b that are formed in those regions of the inner lower surface 11u that are not overlapped by the shutters 21 and 22 when the shutters 21 and 22 are closed; and a recess 88c that is located in a region of the inner lower surface 11u that is overlapped by the shutters 21 and 22 when the shutters 21 and 22 are closed. The recesses 88b and 88c are provided so as to draw a circle along the circumference of the disc storage portion 10d. In this preferred embodiment, the number of the recesses 88a of the third type is three.

This disc cartridge 315 is also provided with various types of structures (e.g., a disc supporting portion) for preventing dust from entering the disc cartridge 315 or being deposited on the signal recording side 100A of the disc 100. However, it is actually difficult to totally eliminate the dust that enters the disc cartridge 315 or is deposited on the signal recording side 100A.

Thus, the third type of recesses 88a, 88b and 88c are provided to accumulate the dust that has entered the disc cartridge 315. Specifically, as the shutters 21 and 22 are opened or closed, the dust is collected in these recesses 88a, 88b and 88c of the third type. Once collected in the recesses 88a, 88b and 88c, the dust never contacts with the shutters 21 and 22 and remains in the recesses 88a, 88b and 88c without going out of the recesses 88a, 88b and 88c. Accordingly, by accumulating the dust in the third type of recesses 88a, 88b and 88c in this manner, the dust will not interfere with opening or closing of the shutters 21 and 22 or will be stirred up due to an excessive friction.

It should be noted that these effects are also achievable by the first type of recesses 86 or the second type of recesses 87. Accordingly, the disc cartridge 315 does not have to include all of these recesses 86, 87, 88a, 88b and 88c but may include just one type of recesses. Even so, the shutters 21 and 22 will not be interfered with their opening or closing by the dust and almost no dust will be stirred up due to a friction.

Also, to remove the dust from the gap between the shutters 21 and 22 and the inner lower surface 11u and accumulate it in the second type of recesses 87, for example, even more effectively, the respective lower surfaces 21v and 22v of the shutters 21 and 22 may be provided with the recesses 85 along the outer edges thereof. In that case, when the shutters 21 and 22 are closed, these recesses 85 are preferably located inside the second type of recesses 87 (i.e., closer to the centerline of the cartridge 315) as shown in FIG. 84. Also, as shown in FIG. 86, when the shutters 21 and 22 are closed, the recesses 85 of the shutters 21 and 22 are preferably discontinuous with the second type of recesses 87 on the inner lower surface 11u.

When the shutters 21 and 22 have the recesses 85, the outer edges of the shutters 21 and 22 are deformed more easily. Accordingly, even when a force is externally applied to the disc 100 in the direction A, the outer edges of the shutters 21 and 22 are deformed easily and will much less likely press the signal recording side 100A of the disc 100 so strongly as to scratch it. Optionally, these recesses 86, 87, 88a, 88b and 88c may have their inner faces covered with a nonwoven fabric that has been adhered or welded thereto. Then, the gaps created by these recesses inside the cartridge body can be filled and dust will enter this disc cartridge 315 even less easily.

In the fifteenth preferred embodiment described above, the various types of recesses are provided for the disc cartridge 314 of the fourteenth preferred embodiment. Alternatively, these recesses may also be provided for the disc cartridge according to any of the eighth through thirteenth preferred embodiments of the present invention described above.

Embodiment 16

Hereinafter, a disc cartridge 316 according to a sixteenth specific preferred embodiment of the present invention will be described with reference to FIGS. 88 through 93. In FIGS. 88 through 93, each member of the disc cartridge 316 of the sixteenth preferred embodiment, having substantially the same function as the counterpart of the disc cartridge 313 of the thirteenth preferred embodiment described above, is identified by the same reference numeral.

Figure 88:
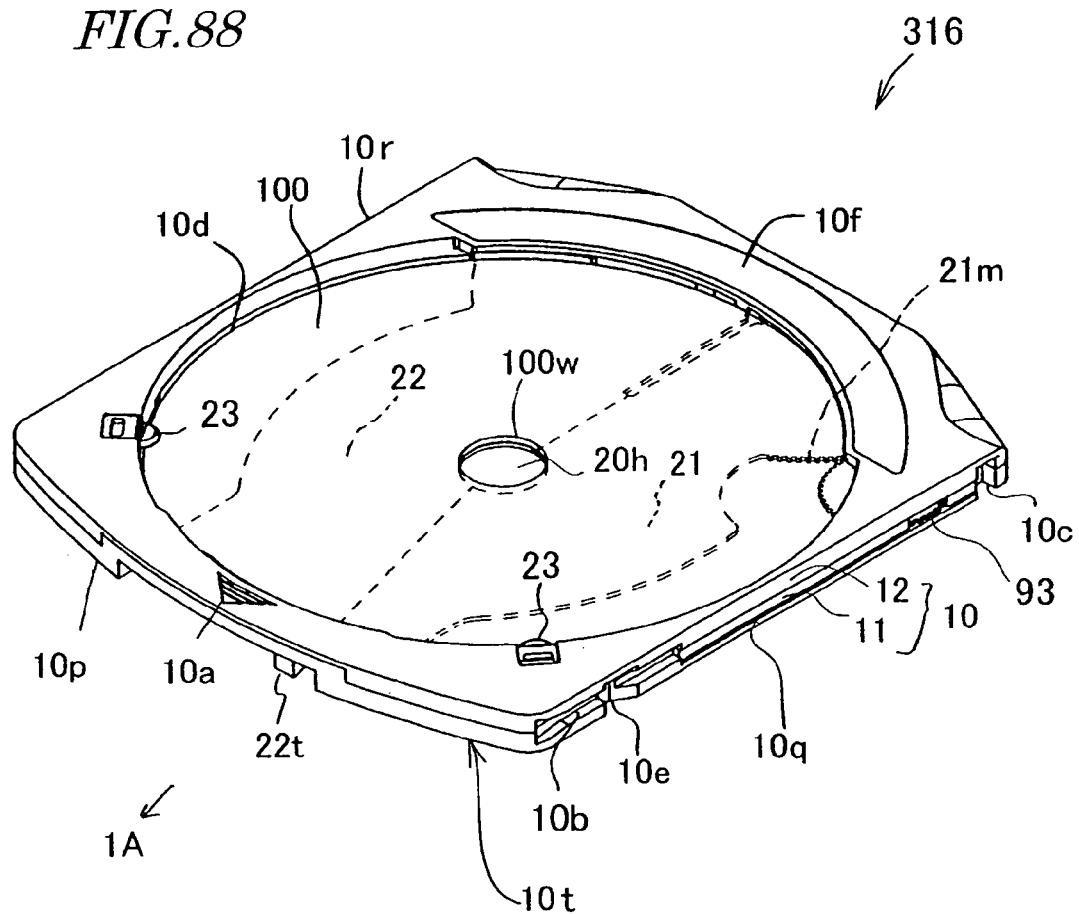
FIG. 88 is a perspective view illustrating an overall configuration for a disc cartridge according to a sixteenth specific preferred embodiment of the present invention.

As shown in FIG. 88, the disc cartridge 316 of this preferred embodiment includes first and second opener/closers 22t and 93 on first and second side surfaces 10p and 10q of the cartridge body 10, respectively. The first opener/closer 22t is formed on the first side surface 10p that extends substantially vertically to the direction 1A in which this disc cartridge 316 is inserted into a disc drive, while the second opener/closer 93 is formed on the second side surface 10q that extends substantially parallelly to the direction 1A. The first opener/closer 22t has the same structure as the shutter opener/closer 22t of the disc cartridge 313 of the thirteenth preferred embodiment.

Figure 89:
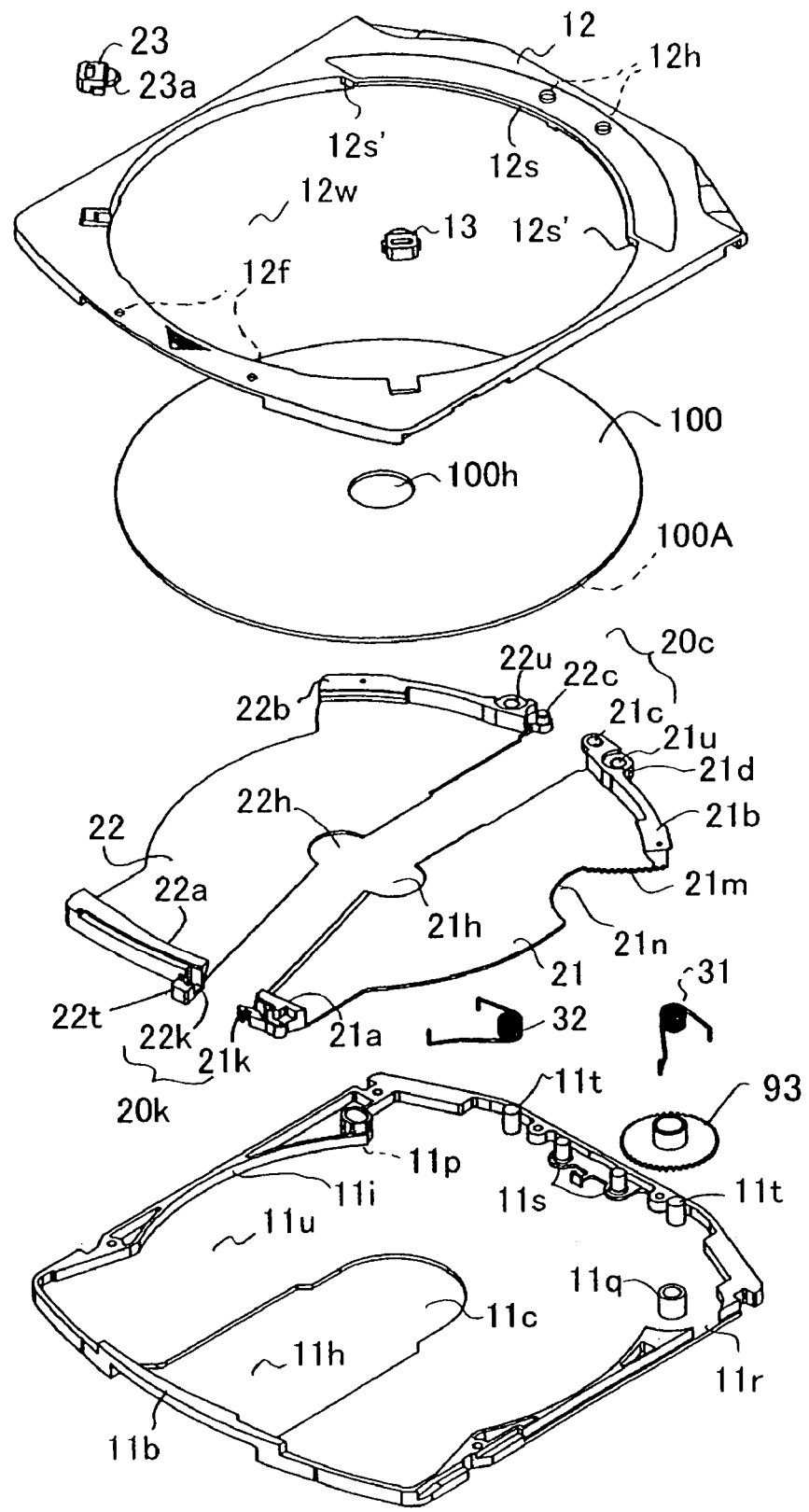
FIG. 89 is an exploded perspective view of the disc cartridge shown in FIG. 88.

As shown in FIG. 89, the second opener/closer 93 is formed in the shape of a gear having a hole that can be inserted into a shaft 11q provided for the lower shell 11. A side surface of the lower shell 11 has an opening 11r to expose a portion of the second opener/closer 93 through the second side surface 10q of the cartridge body 10 when the second opener/closer 93 is inserted into the shaft 11q. Alternatively, the shaft 11q may be provided for the upper shell 12.

The shutters 21 and 22 are also provided to expose or cover the head and chucking openings 11h and 11c of the lower shell 11. The shutters 21 and 22 are equivalent to the second and first shutters as defined in the appended claims. The first opener/closer 22t forms an integral part of the shutter 22. On the other hand, a sector gear 21m, which engages with the second opener/closer 93, is formed on the outer side surface of the shutter 21 and is located near the disc holder 21b. The center of rotation of the sector gear 21m is the hole 21u of the shutter 21. The outer side surface of the shutter 21 also has a concave portion 21n, which is adjacent to the sector gear 21m. This concave portion 21n is formed to define a space in which the second opener/closer 93 engages with the sector gear 21m.

Figure 90:
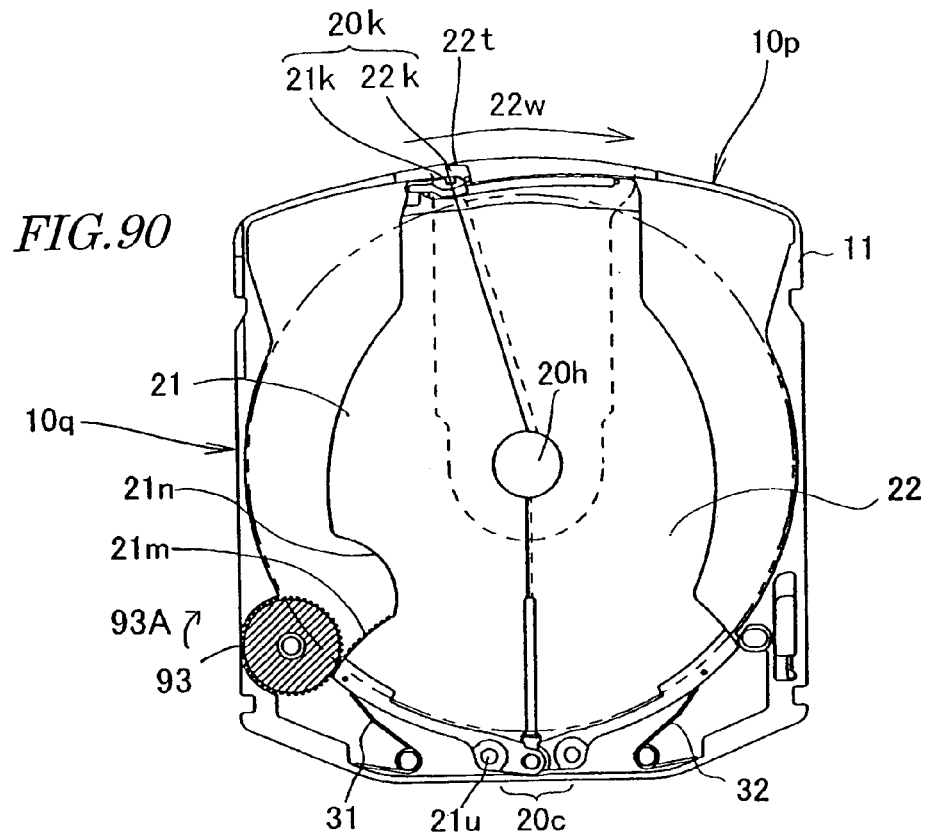
FIG. 90 is a schematic plan view illustrating a state of the disc cartridge shown in FIG. 88 in which its shutters are closed.
Figure 91:
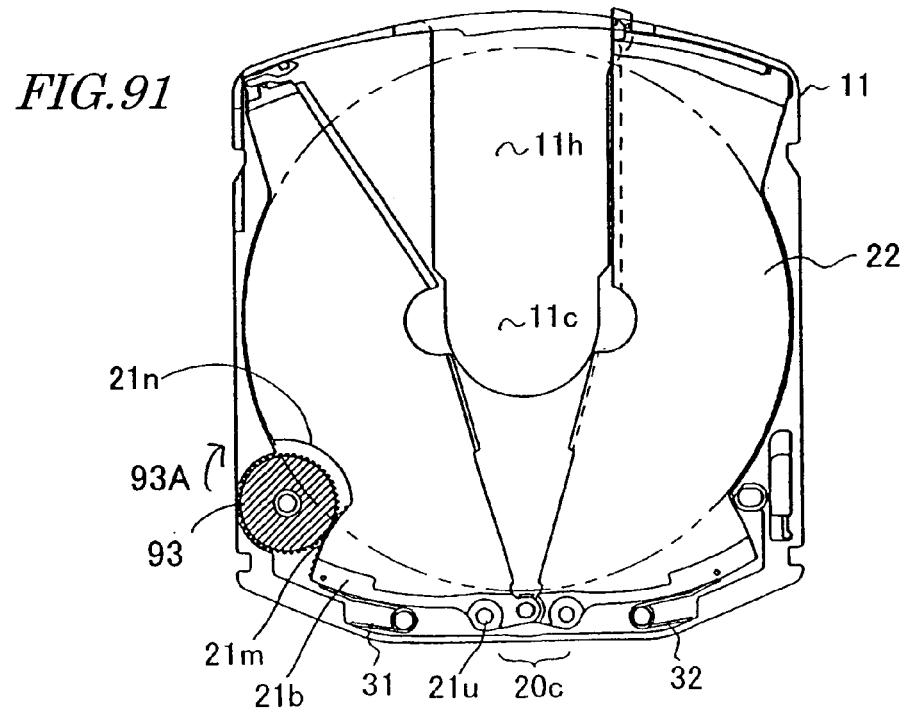
FIG. 91 is a schematic plan view illustrating a state of the disc cartridge shown in FIG. 88 in which its shutters are opened.

The shutters 21 and 22 may be opened or closed by using the first opener/closer 22t in the following manner. First, as shown in FIG. 90, the locking protrusion 21k and the locking engaging portion 22k, which together make up the locking mechanism 20k, are disengaged from each other. Then, the first opener/closer 22t is slid along the first side surface 10p of the cartridge body 10 as indicated by the arrow 22W in FIG. 90. As a result, the other shutter 21 is also moved synchronously with the shutter 22 by way of the interlocking mechanism 20c, and these two shutters 21 and 22 expose the head and chucking openings 11h and 11c as shown in FIG. 91.

The shutters 21 and 22 may also be opened by using the second opener/closer 93 in the following manner. First, the locking mechanism 20k is unlocked as shown in FIG. 90. Next, the second opener/closer 93 is rotated to the direction indicated by the arrow 93A. Then, the sector gear 21m gets engaged with the second opener/closer 93 and starts to rotate on the hole 21u, thereby opening the shutter 21. Since the other shutter 22 is also moved synchronously with the shutter 21 by way of the interlocking mechanism 20c, these two shutters 21 and 22 expose the head and chucking openings 11h and 11c. When the head and chucking openings 11h and 11c are completely exposed by the shutters 21 and 22 as shown in FIG. 91, a portion of the second opener/closer 93 is located inside the concave portion 21n of the shutter 21.

To close the shutters 21 and 22, the first opener/closer 22t may be slid in the direction opposite to the direction 22W or the second opener/closer 93 may be rotated to the direction opposite to the direction 93A. In this preferred embodiment, the disc cartridge 316 includes the shutter springs 31 and 32 that apply an elastic force to the shutters 21 and 22 in such a direction as to close the shutters 21 and 22. Accordingly, unless a force that is strong enough to open, or keep opened, the shutters 21 and 22 against the elastic force of the shutter springs 31 and 32 is applied to the first or second opener/closer 22t or 93, the shutters 21 and 22 close themselves automatically.

In the disc cartridge 316 of the sixteenth preferred embodiment, the opener/closers are provided for the shutters 21 and 22 both on a side surface that is perpendicular to the direction in which this disc cartridge 316 is inserted into a disc drive and on a side surface that is parallel to the disc cartridge inserting direction. Accordingly, no matter whether the disc drive used is compatible with only a disc cartridge including a shutter opener/closer on a side surface that extends perpendicularly to the disc cartridge inserting direction or only a disc cartridge including a shutter opener/closer on a side surface that extends parallelly to the disc cartridge inserting direction, the disc drive can always read or write a signal from/on the disc stored in the disc cartridge of this preferred embodiment.

Also, in the disc cartridge 316 of this sixteenth preferred embodiment, the second opener/closer 93, provided for the side surface parallel to the direction in which the disc cartridge 316 is inserted, has a gear shape. Accordingly, a shutter opening/closing mechanism to be provided for the disc drive may also be any of various shapes of gears that can engage with the second opener/closer 93. Thus, the disc drive may use a relatively simple mechanism to open or close the shutters 21 and 22 of the disc cartridge 316.

Figure 92:
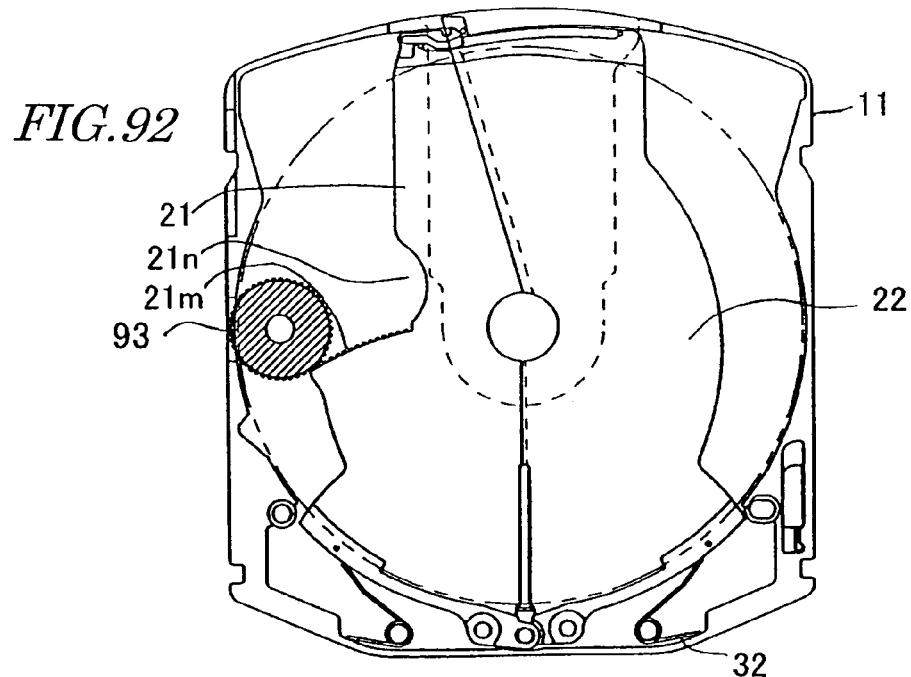
FIG. 92 is a schematic plan view illustrating a modified example of the disc cartridge shown in FIG. 88 in which its shutters are closed.
Figure 93:
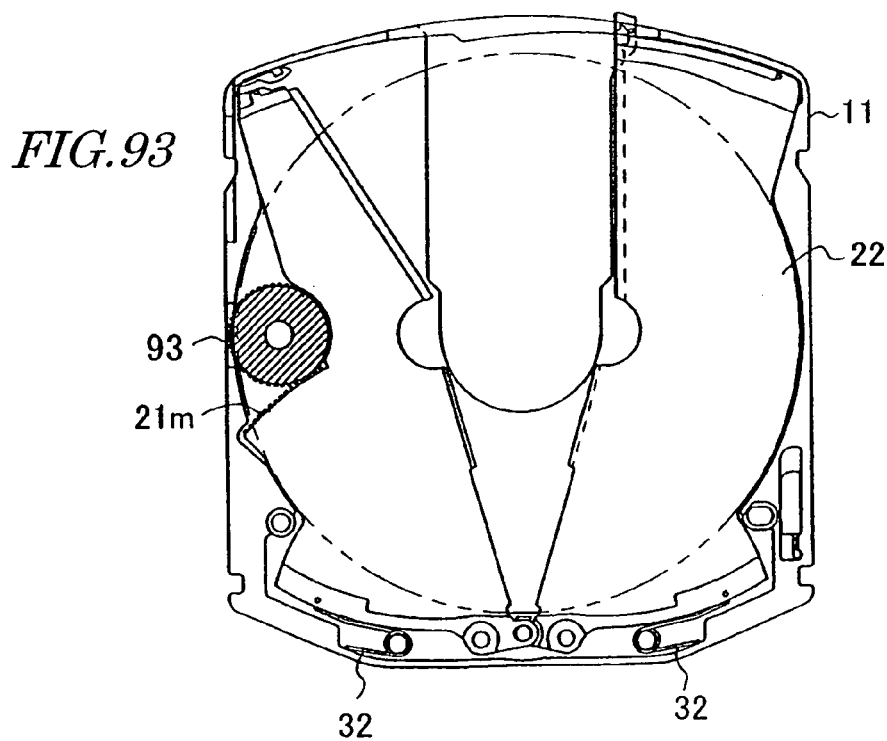
FIG. 93 is a schematic plan view illustrating a state of the disc cartridge shown in FIG. 92 in which its shutters are opened.

In the preferred embodiment described above, the sector gear 21*m* is provided near the disc holder 21*b*. This is because the distance between the sector gear 21*m* at such a position and the hole 21*u* of the shutter 21 is relatively short and because the sector gear 21*m* needs to have a relatively short length to open the shutter 21 fully. However, the sector gear 21*m* does not have to be provided at this position. Alternatively, the sector gear 21*m* and the second opener/closer 93 may also be provided at such positions as shown in FIGS. 92 and 93. In the alternative preferred embodiment shown in FIGS. 92 and 93, the sector gear 21*m* may be located at such a position that when extended, a circular trace drawn by the sector gear 21*m* will substantially intersect with the center of the disc 100, while the second opener/closer 93 may be provided at such a position as to engage with the sector gear 21*m*. When the second opener/closer 93 is provided at such a position, the sector gear 21*m* should be relatively long to open the shutter 21 fully, but the distance between the sector gear 21*m* and the hole 21*u* may also be relatively long. That is to say, since there is a long distance between the fulcrum and the application point in that case, a lighter force is needed to rotate the second opener/closer 93 and open or close the shutters 21 and 22.

Embodiment 17

Hereinafter, a disc cartridge 317 according to a seventeenth specific preferred embodiment of the present invention will be described with reference to FIGS. 94 through 97. In FIGS. 94 through 97, each member of the disc cartridge 317 of the seventeenth preferred embodiment, having substantially the same function as the counterpart of the disc cartridge 316 of the sixteenth preferred embodiment described above, is identified by the same reference numeral.

Figure 94:
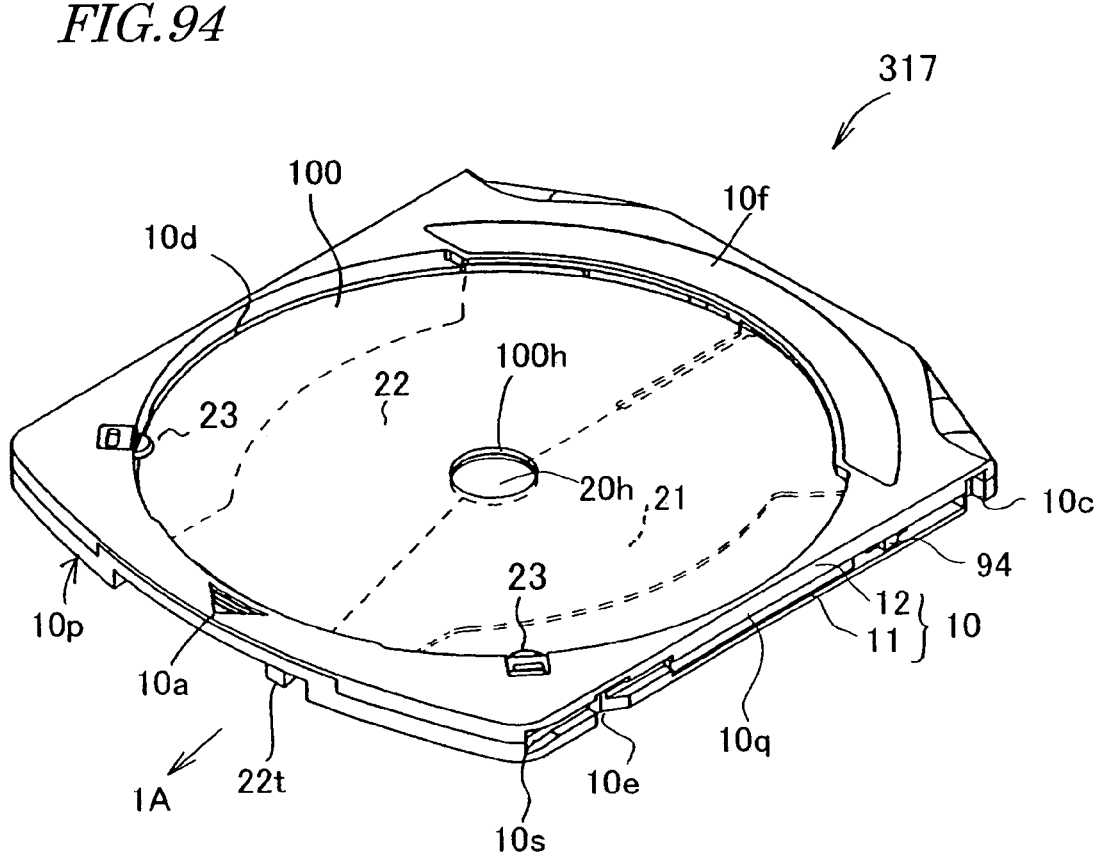
FIG. 94 is a perspective view illustrating an overall configuration for a disc cartridge according to a seventeenth specific preferred embodiment of the present invention.

As shown in FIG. 94, the disc cartridge 317 of this seventeenth preferred embodiment includes a second opener/closer 94 on its second side surface 10*q* instead of the second opener/closer 93 of the disc cartridge 316 of the sixteenth preferred embodiment described above.

Figure 95:
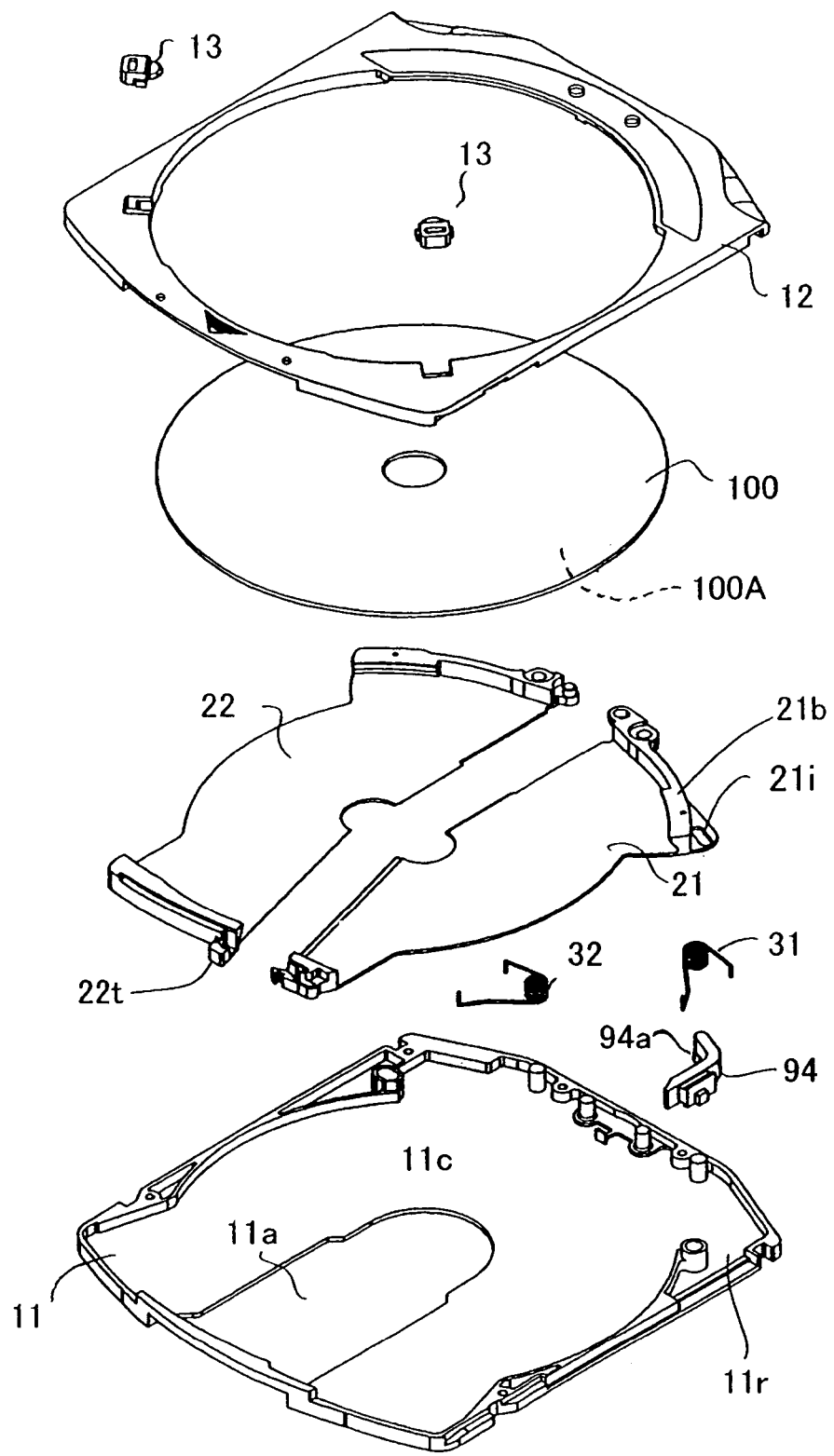
FIG. 95 is an exploded perspective view of the disc cartridge shown in FIG. 94.

As can be seen from FIG. 95, the second opener/closer 94 is a link member that can slide along the opening 11*r* of the lower shell 11 and that is bent approximately at the center thereof. Also, the second opener/closer 94 includes a protrusion 94*a* at one end thereof. This protrusion 94*a* engages with a groove 21*i* that is provided on the upper surface of the shutter 21 near the disc holder 21*b*.

Figure 96:
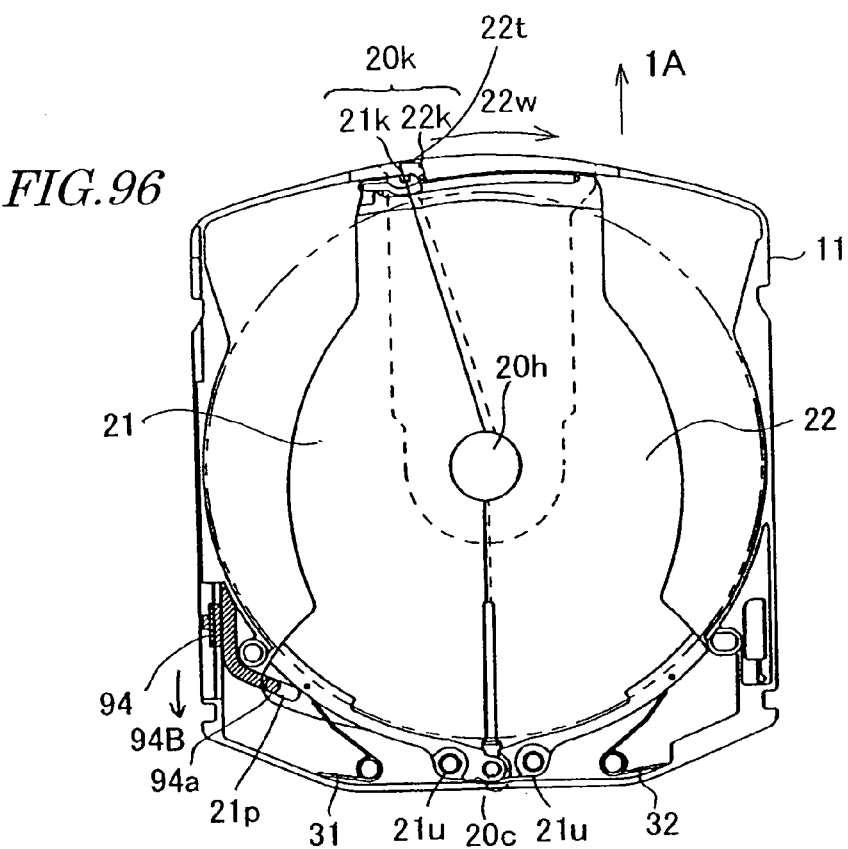
FIG. 96 is a schematic plan view illustrating a state of the disc cartridge shown in FIG. 94 in which its shutters are closed.
Figure 97:
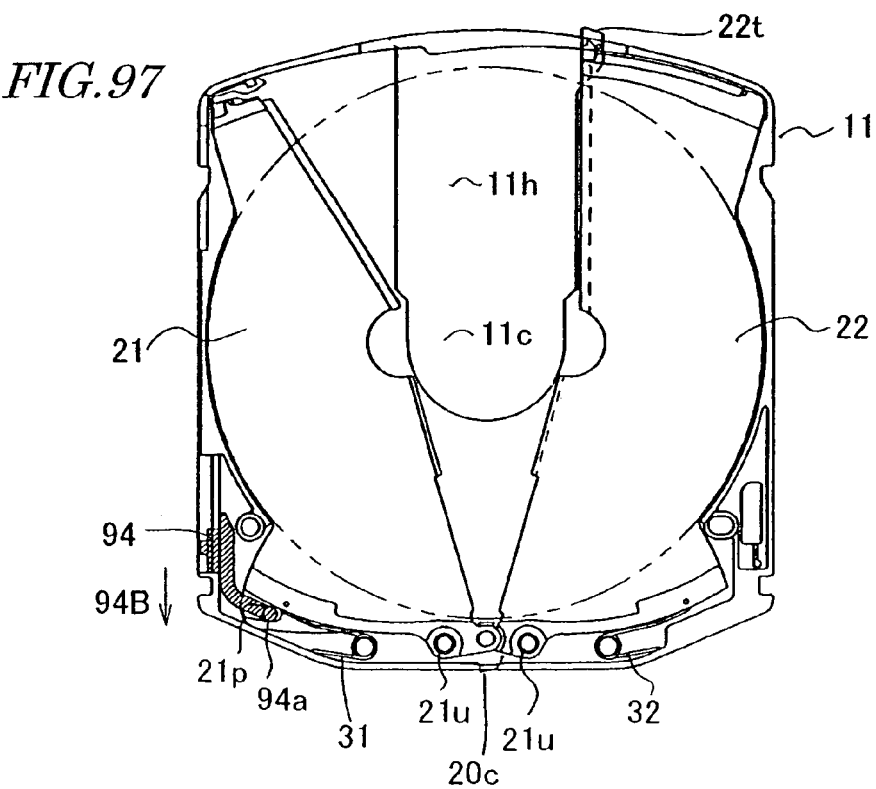
FIG. 97 is a schematic plan view illustrating a state of the disc cartridge shown in FIG. 94 in which its shutters are opened.

FIGS. 96 and 97 illustrate two states of the disc cartridge 317 in which the shutters 21 and 22 thereof are closed and opened, respectively. As already described for the thirteenth and sixteenth preferred embodiments, the shutters 21 and 22 can be opened or closed by sliding the first opener/closer 22*t* in the direction 22*w* or in the opposite direction.

The shutters 21 and 22 may also be opened by using the second opener/closer 94 in the following manner. First, the locking mechanism 20*k* is unlocked as shown in FIG. 96. Next, the second opener/closer 94 is slid in the direction indicated by the arrow 94B. As a result of this operation, a force is applied to the second opener/closer 94 in such a direction as to move the protrusion 94*a* of the second opener/closer 94 in the direction indicated by the arrow 94B. Thus, the shutter 21 is rotated on the hole 21*u* and opened. Since the other shutter 22 is also moved synchronously with the shutter 21 by way of the interlocking mechanism 20*c*, these two shutters 21 and 22 expose the head and chucking openings 11*h* and 11*c*. As in the sixteenth preferred embodiment described above, the shutters 21 and 22 can also be closed by sliding the second opener/closer 94 in the direction opposite to the direction 94B, and the shutter springs 31 and 32 also apply an elastic force to the shutters 21 and 22 in such a direction as to close the shutters 21 and 22.

Just like the disc cartridge 316 of the sixteenth preferred embodiment described above, no matter whether the disc drive used is compatible with only a disc cartridge including a shutter opener/closer on a side surface that extends perpendicularly to the disc cartridge inserting direction or only a disc cartridge including a shutter opener/closer on a side surface that extends parallelly to the disc cartridge inserting direction, the disc drive can always read or write a signal from/on the disc stored in the disc cartridge 317 of this preferred embodiment.

Also, as shown in FIGS. 96 and 97, the direction 94B in which the second opener/closer 94 is slid to open the shutters 21 and 22 is antiparallel to the disc cartridge inserting direction 1A. Accordingly, if a protrusion that engages with the second opener/closer 94 is provided for a disc drive, that protrusion engages with the second opener/closer 94 and opens the shutters 21 and 22 of the disc cartridge 317 while this disc cartridge 317 is going to be inserted into the disc drive. Thus, a simplified shutter opening/closing mechanism may be provided for the disc drive.

Embodiment 18

Hereinafter, a disc cartridge 318 according to an eighteenth specific preferred embodiment of the present invention will be described with reference to FIGS. 98 through 101. In FIGS. 98 through 101, each member of the disc cartridge 318 of the eighteenth preferred embodiment, having substantially the same function as the counterpart of the disc cartridge 316 of the sixteenth preferred embodiment described above, is identified by the same reference numeral.

Figure 98:
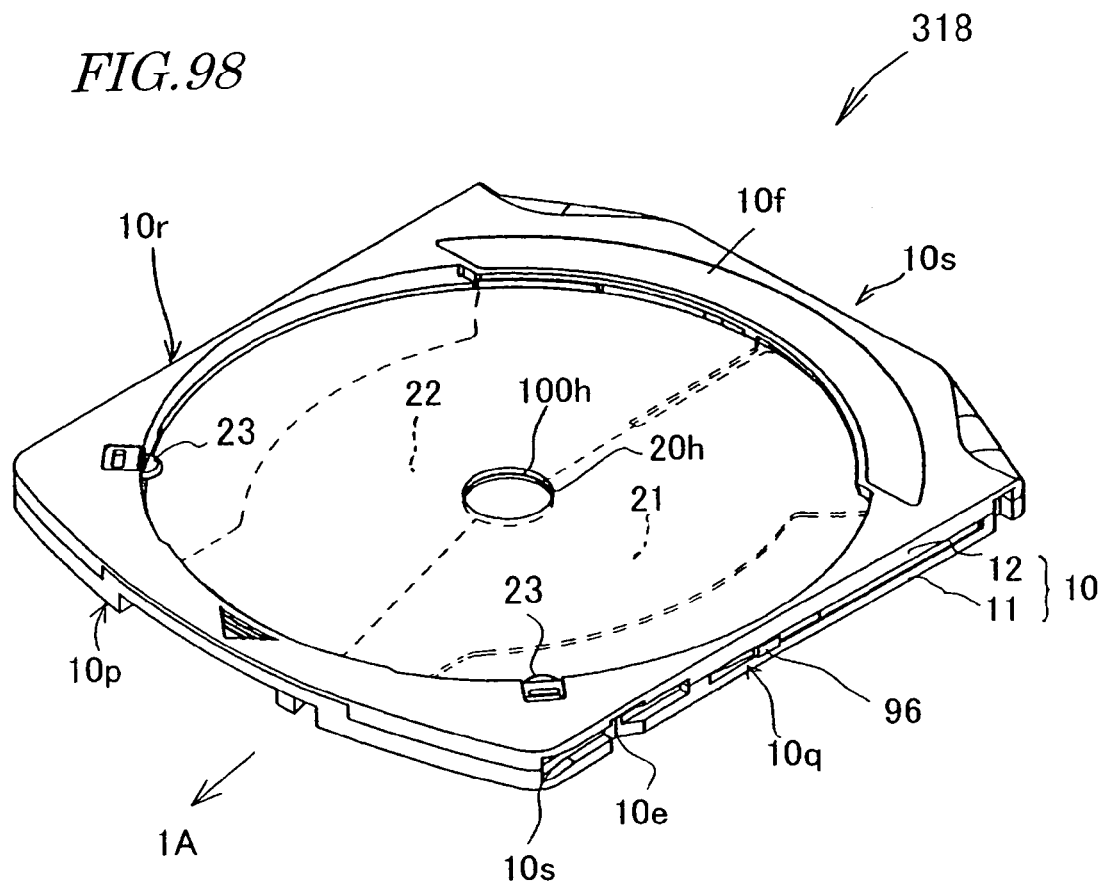
FIG. 98 is a perspective view illustrating an overall configuration for a disc cartridge according to an eighteenth specific preferred embodiment of the present invention.

As shown in FIG. 98, the disc cartridge 318 of this eighteenth preferred embodiment includes a second opener/closer 96 on its second side surface 10*q* instead of the second opener/closer 93 of the disc cartridge 316 of the sixteenth preferred embodiment described above.

As can be seen from FIG. 99, the second opener/closer 96 is a belt member that is connected to the disc holder 21*a* of the shutter 21. This belt member 96 has a protrusion 96*a* at one end thereof. And the protrusion 96*a* can slide along the opening 11*r* of the lower shell 11. Alternatively, the second opener/closer 96 may form an integral part of the shutter 21.

Figure 100:
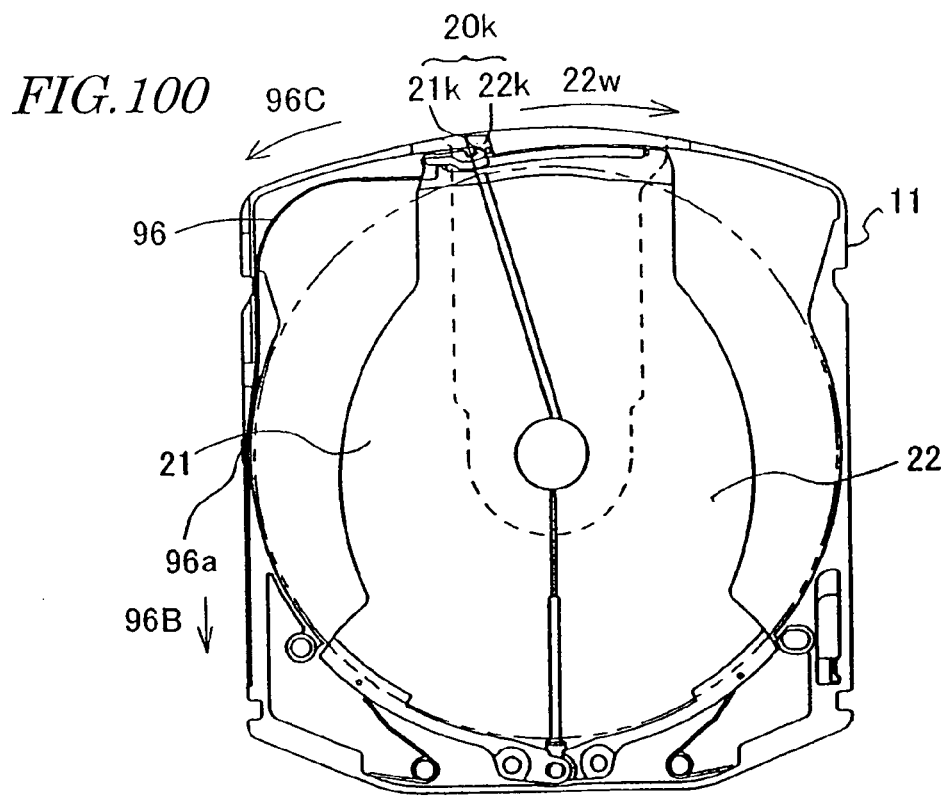
FIG. 100 is a schematic plan view illustrating a state of the disc cartridge shown in FIG. 98 in which its shutters are closed.
Figure 101:
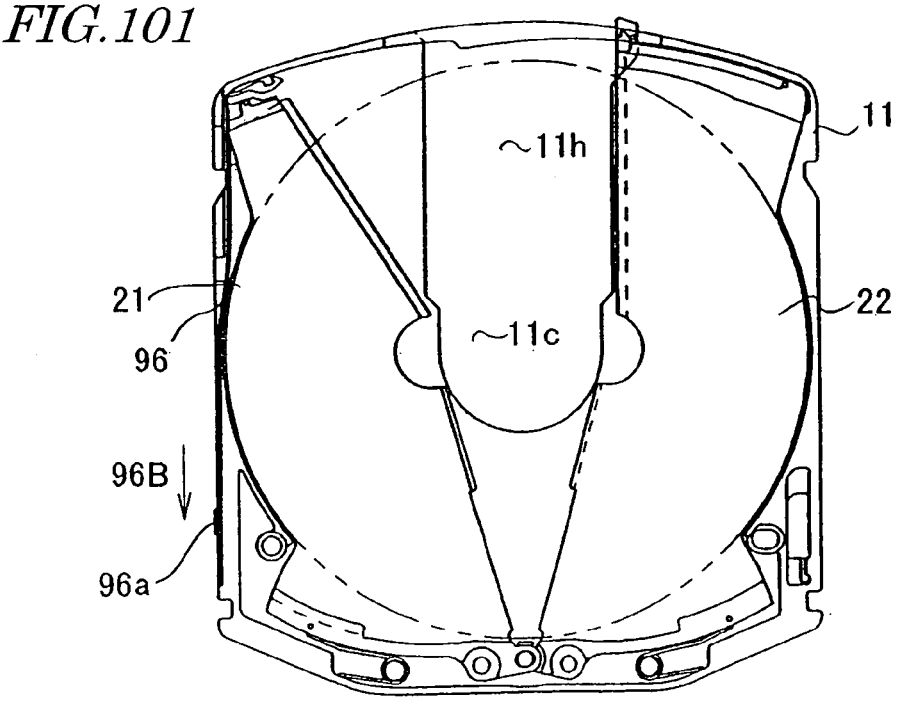
FIG. 101 is a schematic plan view illustrating a state of the disc cartridge shown in FIG. 98 in which its shutters are opened.

FIGS. 100 and 101 illustrate two states of the disc cartridge 318 in which the shutters 21 and 22 thereof are closed and opened, respectively. As already described for the sixteenth and seventeenth preferred embodiments, the shutters 21 and 22 can be opened or closed by sliding the first opener/closer 22*t* in the direction 22*w* or in the opposite direction.

The shutters 21 and 22 may also be opened by using the second opener/closer 96 in the following manner. First, the locking mechanism 20*k* is unlocked as shown in FIG. 100. Next, the protrusion 96*a* of the second opener/closer 96 is slid in the direction indicated by the arrow 96B. As a result of this operation, a force is applied to the shutter 21 in such a direction as to rotate the end of the shutter 21 on the hole 21*u*, i.e., to the direction indicated by the arrow 96C. Since the other shutter 22 is also moved synchronously with the shutter 21 by way of the interlocking mechanism 20*c*, these two shutters 21 and 22 expose the head and chucking openings 11*h* and 11*c*. To close the shutters 21 and 22, the protrusion 96*a* of the second opener/closer 96 may be slid in the opposite direction.

Just like the disc cartridge 316 of the sixteenth preferred embodiment described above, no matter whether the disc drive used is compatible with only a disc cartridge including a shutter opener/closer on a side surface that extends perpendicularly to the disc cartridge inserting direction or only a disc cartridge including a shutter opener/closer on a side surface that extends parallelly to the disc cartridge inserting direction, the disc drive can always read or write a signal from/on the disc stored in the disc cartridge 318 of this preferred embodiment.

If the second opener/closer 96 forms an integral part of the shutter 21, the number of members that make up the disc cartridge 318 can be reduced. As a result, the disc cartridge can be manufactured at a lower cost or the manufacturing process thereof can be simplified.

In the sixteenth through eighteenth preferred embodiments of the present invention described above, the second opener/closer is provided on the left-hand side with respect to the disc cartridge inserting direction. However, the location of the second opener/closer is not limited to the left-hand side. Alternatively, the second opener/closer may be provided on the right-hand side 10r of the disc cartridge 316 with respect to the disc cartridge inserting direction as shown in FIG. 88. As another alternative, the second opener/closer may also be provided on the backside 10t of the disc cartridge 316 as shown in FIG. 88. In that case, the belt-shaped second opener/closer 96 of this eighteenth preferred embodiment is preferably used because the disc cartridge 318 can have the protrusion 96a of the second opener/closer 96 on its backside without changing its details so much.

Embodiment 19

Figure 102:
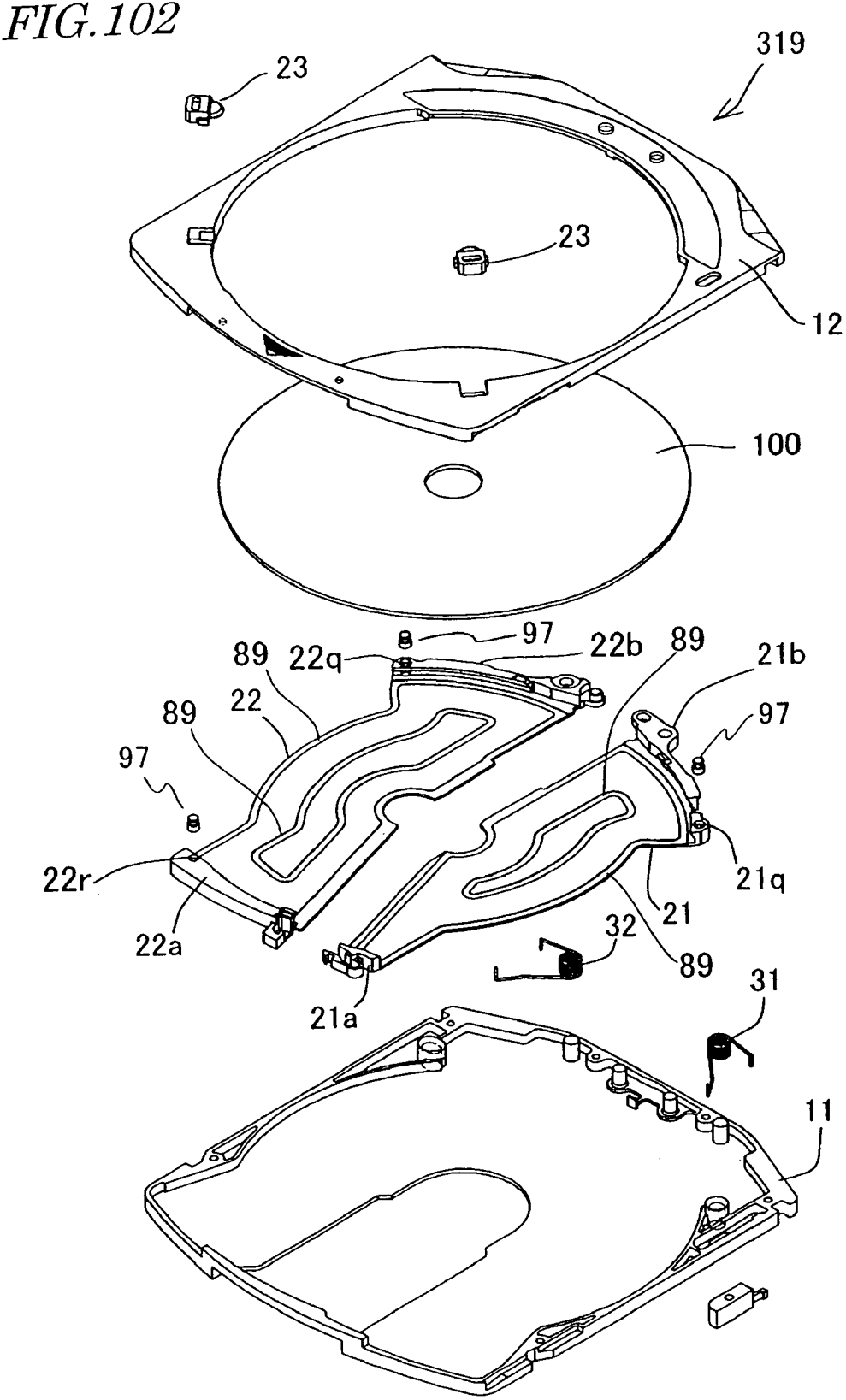
FIG. 102 is an exploded perspective view of a disc cartridge according to a nineteenth specific preferred embodiment of the present invention.
Figure 103:
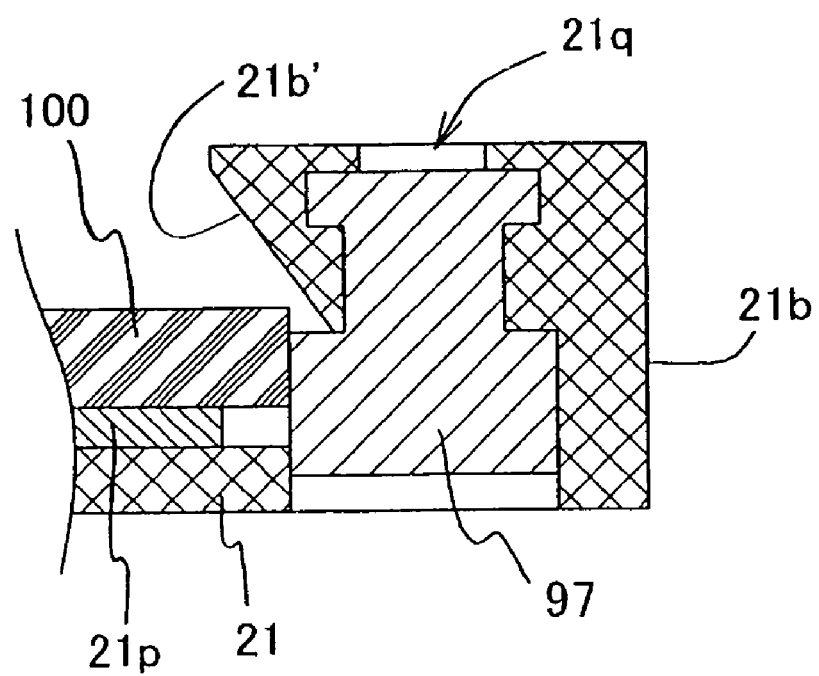
FIG. 103 is a cross-sectional view illustrating a disc holder and its surrounding members of the disc cartridge shown in FIG. 102 to a larger scale.

Hereinafter, a disc cartridge 319 according to a nineteenth specific preferred embodiment of the present invention will be described with reference to FIGS. 102 and 103. In FIGS. 102 through 103, each member of the disc cartridge 319 of the nineteenth preferred embodiment, having substantially the same function as the counterpart of the disc cartridge 313 of the thirteenth preferred embodiment described above, is identified by the same reference numeral.

The disc cartridge 319 of this preferred embodiment is characterized by providing rotation stoppers 97 for the disc holders 21b, 22a and 22b and concave portions 89 for the shutters 21 and 22, respectively. The concave portions 89 are used to ultrasonic weld a nonwoven fabric to the shutters 21 and 22.

More specifically, the disc holders 21b, 22a and 22b include holes 21q, 22r and 22q that engage with the rotation stoppers 97. As shown in FIG. 103, the rotation stoppers 97 partially protrude from the slopes 21b', 22a' and 22b' of the disc holders 21b, 22a and 22b and contact with the outer edge of the disc 100 while the disc 100 is held by the disc holders 21a, 21b, 22a and 22b. The rotation stoppers 97 are preferably made of an elastic material that has a large coefficient of friction, e.g., rubber.

It should be noted that at least one of the disc holders 21a, 21b, 22a and 22b should include the rotation stopper 97 to stop the unwanted rotation of the disc 100 sufficiently. However, to prevent the unintentional rotation of the disc 100 with more certainty, the three rotation stoppers 97 are preferably provided as shown in FIG. 102.

In this structure, while the disc 100 is held by the disc holders 21a, 21b, 22a and 22b, the rotation stoppers 97 that are in tight contact with the disc 100 do not allow the user to rotate the disc 100 so easily. Accordingly, in such a state, even if the user tries to rotate the disc 100 intentionally while pressing the disc 100 against the shutters 21 and 22, the disc 100 will not rotate so easily. Thus, even if relatively stiff dust has adhered to the nonwoven fabric that covers the shutters 21 and 22, the disc 100 will not get scratched by such dust because the user cannot rotate the disc 100 accidentally.

In addition, by providing the rotation stoppers 97, it is possible to prevent the disc 100 from moving inconstantly inside the disc storage portion.

As shown in FIG. 102, the shutters 21 and 22 include the concave portions 89 to which a nonwoven fabric is ultrasonic welded to partially cover the shutter surfaces that contact with the signal recording side 100A of the disc 100. In the preferred embodiment illustrated in FIG. 102, the concave portions 89 are formed so as to surround the outer periphery of those portions of the shutters 21 and 22 that contact with the signal recording side 100A. The concave portions 89 are also formed inside the outer periphery. However, the concave portions 89 may be formed in any regions other than those illustrated in FIG. 102 as long as the nonwoven fabric can be adhered to the shutters 21 and 22 just as intended. At these concave portions 89, the nonwoven fabric is ultrasonic welded to the shutters 21 and 22. When the nonwoven fabric is ultrasonic welded to the shutters 21 and 22, the nonwoven fabric might be partially cured or the resin material of the shutters 21 and 22 might partially protrude from the nonwoven fabric. Even so, those cured or protruding portions are received by the concave portions 89 and do not scratch the signal recording side 100A of the disc 100. When a nonwoven fabric is attached to the shutters 21 and 22, these concave portions 89 are preferably formed on the shutters 21 and 22 in any of the disc cartridges according to the first through eighteenth preferred embodiments of the present invention described above.

Embodiment 20

Hereinafter, a disc drive according to a twentieth specific preferred embodiment of the present invention will be described with reference to FIG. 104.

Figure 104:
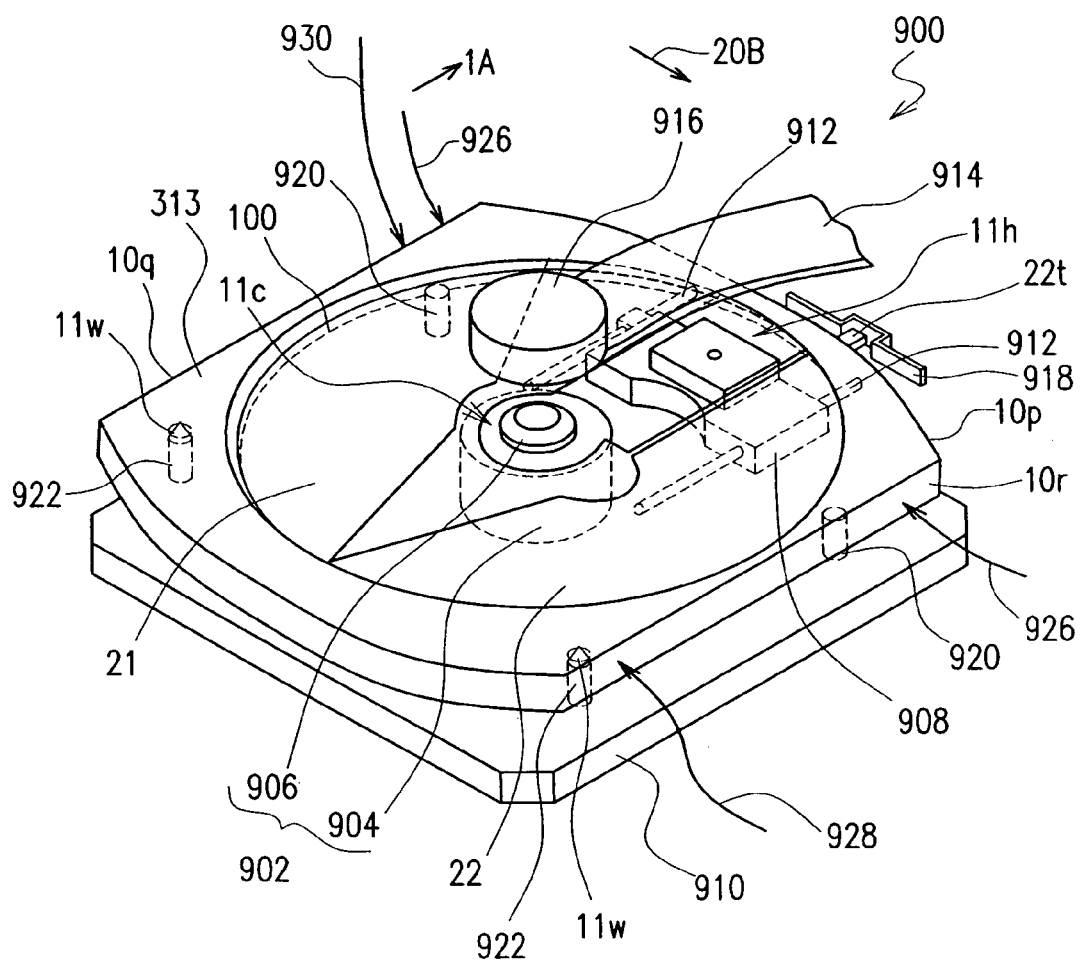
FIG. 104 is a perspective view illustrating a main portion of a disc drive according to a twentieth specific preferred embodiment of the present invention.

FIG. 104 is perspective view schematically illustrating a main portion of a disc drive 900 according to the thirtieth preferred embodiment. Any of the disc cartridges 301 through 319 according to the first through nineteenth preferred embodiments of the present invention described above may be loaded into this disc drive 900. In the specific example illustrated in FIG. 104, the disc cartridge 313 according to the thirteenth preferred embodiment is loaded into this disc drive 900. In FIG. 104, the disc 100 is indicated by the dashed line.

As shown in FIG. 104, the disc drive 900 includes: a driver 902 for rotating the disc 100 that is stored inside the disc cartridge 313; and a head 908 for reading and/or writing a signal (or information) from/on the disc 100.

The driver 902 includes a spindle motor 904 and a turntable 906 that is fitted with the shaft of the spindle motor 904. The spindle motor 904 is supported by a base 910. The head 908 is moved by an actuator (not shown) along a guide 912.

The disc drive 900 further includes a damper 916 that is supported by an arm 914. The damper 916 is located over the turntable 906. As will be described later, the disc 100 is sandwiched and held between the damper 916 and the turntable 906 and thereby mounted onto the turntable 906. In this manner, the driving force of the spindle motor 904 can be transmitted to the disc 100 just as intended and the disc 100 can be rotated without fluttering.

The disc cartridge 313 includes the opener/closer 22t for opening and closing the first and second shutters 21 and 22 on its side surface 10p including the head opening 11h. To operate this opener/closer 22t, the disc drive 900 includes a shutter opening/closing mechanism 918 that engages with the opener/closer 22t to open and close the shutters 21 and 22. The shutter opening/closing mechanism 918 is provided near the side surface 10p of the disc cartridge 313 that has been loaded into the disc drive 900. In FIG. 104, to illustrate the opener/closer 22t clearly, the shutter opening/closing mechanism 918 is illustrated as being separated from the opener/closer 22t. An actuator for use to move the shutter opening/closing mechanism 918 is not illustrated in FIG. 104, either.

It should be noted that the shutter opening/closing mechanism 918 needs to be located beside the shutter opener/closer of the disc cartridge to be inserted into this disc drive 900. For example, when the disc cartridge according to any of the sixteenth through eighteenth preferred embodiments described above is loaded into the disc drive 900, the shutter opening/closing mechanism 918 may be provided near the side surface 10q.

Also, two or more shutter opening/closing mechanisms 918 may be provided for the same disc drive 900. For example, a second shutter opening/closing mechanism 918 may be additionally provided near the side surface 10q of the disc cartridge 313 shown in FIG. 104 so that either the disc cartridge 313 of the thirteenth preferred embodiment or the disc cartridge 316 of the sixteenth preferred embodiment may be loaded into this disc drive 900.

The shutter opening/closing mechanism 918 has such a structure as to engage with the opener/closer 22t of the disc cartridge. In the disc cartridge 313, the first and second shutters 21 and 22 are opened or closed by sliding the opener/closer 22t. Accordingly, the shutter opening/closing mechanism 918 should engage with the opener/closer 22t and slide in the direction indicated by the arrow 20B. Where a disc cartridge having a geared opener/closer is loaded as in the sixteenth preferred embodiment, the shutter opening/closing mechanism 918 also needs to have a gear shape.

Posts 920 are formed on the base 910 to define a vertical level at which the disc cartridge 313 is supported. That is to say, the disc cartridge 313 is supported on the posts 920. Also, positioning pins 922 are further formed on the base 910 so as to engage with the positioning holes 11w of the disc cartridge 313.

The posts 920 and the positioning pins 922 function as a supporting structure for disposing the disc cartridge 313 at a predetermined position with respect to the driver 902. Optionally, instead of the posts 920 and the positioning pins 922, a tray may be provided as an alternative supporting structure for the disc drive 900b. In that case, the tray may be drawn out to mount the disc cartridge 313 thereon and then inserted into the disc drive 900 to load the disc 100 into the disc drive 900 and to dispose the disc cartridge 313 at a predetermined position with respect to the driver 902 and the head 908. As another alternative, the tray and the positioning pins 922 may be used in combination as the supporting structure.

Hereinafter, it will be described how this disc drive 900 operates.

First, the disc cartridge 313 that stores the disc 100 therein is loaded into the disc drive 900. The disc cartridge 313 may be loaded either manually by the user or automatically by a loading mechanism (not shown). In the latter case, the loading mechanism may transport the disc cartridge 313 from a disc cartridge insert hole (not shown) of the disc drive 900 to the position illustrated in FIG. 104. Then, the concave portions 10c or 10e as described above for the thirteenth or sixteenth preferred embodiment may be provided at the positions indicated by the arrows 926 in FIG. 104 and may be engaged with the loading mechanism. Alternatively, the tray may also be used as described above. In one of these methods, the disc cartridge 313 is disposed at a predetermined position with respect to the driver 902 and the head 908.

As another alternative, the concave portion 10e as described above for the thirteenth preferred embodiment or the slit 10b as described above for the sixteenth preferred embodiment may be provided at the position of the disc cartridge 313 as indicated by the arrow 928 or 930 in FIG. 104. In that case, the disc drive 900 may have a convex portion (not shown) that engages with the concave portion 10e or the slit 10b. Then, even if the user tries to insert the disc cartridge 313 upside down or the wrong way round into this disc drive 900, the disc cartridge 313 is ejected because interference should occur between the disc cartridge 313 and the disc drive 900. In this manner, it is possible to prevent the user from inserting the disc cartridge 313 into the disc drive 900 erroneously.

When the disc cartridge 313 is disposed at the position shown in FIG. 104, the shutter opening/closing mechanism 918 engages with the opener/closer 22t, thereby sliding the opener/closer 22t in the direction opposite to that indicated by the arrow 20B. As a result, the first and second shutters 21 and 22 start to open to expose the head and chucking openings 11h and 11c in the end. Also, as already described for the thirteenth preferred embodiment, the shutter opening/closing mechanism 918 makes the disc holders 21b, 22a and 22b release the disc 100 by way of the first and second shutters 21 and 22. Thus, the disc 100 is released from the disc holders 21b, 22a and 22b. Subsequently, the arm 914 holding the damper 916 thereon descends, thereby holding the disc 100 between the damper 916 and the turntable 906. Consequently, the disc 100 is mounted on the turntable 906 so as to be rotatable inside the disc storage portion of the disc cartridge 313.

Next, the disc 100 starts being rotated by the spindle motor 904. Then, the head 908 accesses the signal recording area of the disc 100 to read or write a signal from/on the disc 100.

To unload the disc cartridge 313 from the disc drive 900, first, the arm 914 is raised, thereby disengaging the damper 916 from the disc 100. Next, the shutter opening/closing mechanism 918 is moved in the direction indicated by the arrow 20B to slide the opener/closer 22t. As a result, the first and second shutters 21 and 22 are closed. As already described in detail for the thirteenth preferred embodiment, while the first and second shutters 21 and 22 are going to be closed, the disc holders grip the disc 100 thereon. And when the first and second shutters 21 and 22 are completely closed, the disc holders hold the disc 100 thereon. Thereafter, an unloading mechanism (not shown) ejects the disc cartridge 313 from the disc drive 900.

Into the disc drive 900 shown in FIG. 104, the disc cartridge 313 is loaded horizontally. Alternatively, as already described for the first or eighth preferred embodiment, the disc drive 900 may also be mounted vertically so that the disc cartridge is loaded thereto vertically. This is because even when the disc cartridge is loaded vertically into the disc drive 900, the disc stoppers can prevent the disc 100 from dropping down from the disc storage portion.

In the first through nineteenth preferred embodiments described above, a nonwoven fabric is ultrasonic welded or adhered to the shutters. However, if the disc has some anti-scratching structure (e.g., if the signal recording side of the disc is covered with a stiff hard coating), then the nonwoven fabric does not have to be attached thereto, but the shutters may directly contact with the disc. Also, not the entire surface of the shutters has to contact with the signal recording side of the disc, but the shutters may have such a structure that at least portion of the shutters contacts with the signal recording side of the disc. That is to say, not the entire surface but just a portion of the surface of the shutters may be in contact with the disc. In that case, some anti-scratching structure (e.g., a nonwoven fabric) may be provided for only that portion contacting with the disc.

In the first through twentieth preferred embodiments of the present invention described above, the disc 100 to be stored in the disc cartridge has just one signal recording side 100A. However, a single-sided disc like this is used for illustrative purposes only. This is because the disc cartridge of the present invention has such a structure as to expose one side of the disc stored therein and because a single-sided disc is best suited to the disc cartridge of that type. Thus, even a disc having two signal recording sides (i.e., a double-sided disc) may be appropriately stored in the disc cartridge of the present invention and may be loaded into a disc drive to read or write a signal therefrom/thereon. It should be noted, however, that where a double-sided disc is stored in the disc cartridge of the present invention, dust may be deposited on the exposed one of the two signal recording sides. Accordingly, in that case, some mechanism for preventing the unwanted dust deposition should be provided for the disc cartridge.

Also, in the first through twentieth preferred embodiments described above, the size of the disc 100 is not particularly specified. This is because the disc cartridge of the present invention may accommodate a disc having a size of 12 cm or any of various other sizes.

Furthermore, in the first through twentieth preferred embodiments described above, the disc cartridge is illustrated as having an outer dimension that is slightly greater than the size of the disc. However, the size relationship between the disc and the disc cartridge is not limited to the illustrated one. For example, even when the disc cartridge has an outer dimension that is large enough to store a 12 cm disc therein, the disc storage portion and the disc holders of the disc cartridge may have their sizes and structures defined in such a manner as to store an 8 cm disc. Such a disc cartridge may be used as an adapter for getting read and write operations performed on an 8 cm disc by a disc drive for a 12 cm disc.

The various features of the present invention as described for the first through twentieth preferred embodiments may be combined appropriately. For example, the rotation stoppers as described for the nineteenth preferred embodiment may be provided for the disc cartridge of the sixteenth preferred embodiment. Also, the recesses for use to collect dust therein as described for the fifteenth preferred embodiment may be provided for the disc cartridge of the sixteenth preferred embodiment. As can be seen, the first through twentieth preferred embodiments of the present invention may be modified or combined in numerous other ways and not all of those possible combinations or alternatives have been described herein. However, it is quite possible for those skilled in the art to conceive and carry out those various alternatives or combinations by reference to the description of the present application. Thus, it is intended by the appended claims to cover all of those modifications or combinations of the present invention that fall within the true spirit and scope of the present invention.

The disc cartridge according to various preferred embodiments of the present invention described above can be used particularly effectively to store a disc having only one signal recording side. The cartridge body of the disc cartridge has such a structure as to cover only the signal recording side of the disc and expose the other side thereof. Thus, the disc cartridge can have a reduced thickness. Also, the shutters of the disc cartridge are formed in such a shape as to cover the openings on just one side of the disc cartridge. Accordingly, the shutters can have a simplified structure and can be formed at a lower cost. In addition, the disc holders of the disc cartridge hold a disc thereon by pressing the disc against the shutters or the cartridge body. Thus, the disc will not move inconstantly inside the cartridge body and no dust will be deposited on the signal recording side of the disc. Furthermore, since the label side of the disc is displayed inside the disc window, the disc cartridge can also have a good design.

Thus, the present invention provides a thinner and highly dustproof disc cartridge of a good design that is applicable for use in various types of disc drives.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A disc cartridge comprising:
    a cartridge body including a disc storage portion, a chucking opening and a head opening, wherein the disc storage portion has a disc window and a bottom and stores a disc, having first and second sides, therein so that the disc is rotatable in the disc storage portion and that the first side of the disc is exposed through the disc window; the chucking opening is formed on the bottom of the disc storage portion so as to get the disc chucked externally; and the head opening is also formed on the bottom of the disc storage portion so as to allow a head, which reads and/or writes a signal from/on the second side of the disc, to access the second side of the disc;
    a shutter, which is supported, and movable with respect to the cartridge body, between the second side of the disc and the bottom of the disc storage portion so as to expose or cover the chucking and head openings;
    a disc holder, which is provided for the shutter, presses the disc against the shutter, and holds the disc thereon while the chucking and head openings are covered with the shutter; and
    a rim, which expands from a side surface of the disc storage portion toward the center of the disc and which contacts with an outer edge of the disc while the shutter is closed.

2. The disc cartridge of claim 1, wherein the shutter defines a hole in an area corresponding to a center hole of the disc while the shutter is closed.

3. The disc cartridge of claim 2, further comprising a convex portion around the hole of the shutter, the convex portion contacting with the second side of the disc while the chucking and head openings are covered with the shutter.

4. The disc cartridge of claim 3, wherein the convex portion forms an integral part of the shutter.

5. The disc cartridge of claim 1, wherein the rim contacts with the second side of the disc.

6. The disc cartridge of claim 1, wherein the cartridge body has a gap between the rim and the bottom of the disc storage portion so that a portion of the shutter is stored in the gap while the chucking and head openings are exposed by the shutter.

7. The disc cartridge of claim 6, wherein the shutter includes a convex portion that closes a gap between the second side of the disc and the shutter while the shutter is closed.

8. The disc cartridge of claim 7, wherein the convex portion is located closer to the center of the disc storage portion than the rim is while the chucking and head openings are exposed by the shutter.

9. The disc cartridge of claim 7, wherein the convex portion is a protective layer that is provided to prevent the second side of the disc from getting scratched.

10. The disc cartridge of claim 9, wherein the protective layer is selected from the group consisting of an anti-scratching nonwoven fabric, a dustproof nonwoven fabric, an anti-scratching coating layer and a dustproof coating layer.

11. The disc cartridge of claim 1, wherein a protective layer is provided on the rim to prevent the second side of the disc from getting scratched.

* * * * *